(12) United States Patent
Liu et al.

(10) Patent No.: US 12,543,993 B2
(45) Date of Patent: Feb. 10, 2026

(54) MEDICAL DEVICE AND METHOD FOR DETECTING TACHY ARRHYTHMIA

(71) Applicant: Medtronic, Inc., Minneapolis, MN (US)

(72) Inventors: Yuanzhen Liu, Minneapolis, MN (US); Alfonso Aranda Hernandez, Maastricht (NL); Timothy A. Ebeling, Circle Pines, MN (US); Saul E. Greenhut, Denver, CO (US); Michael W. Heinks, New Brighton, MN (US); Jean E. Hudson, Blaine, MN (US); Troy E. Jackson, Rogers, MN (US); Irving J. Sanchez, Blaine, MN (US); James A. Vander Heyden, Delano, MN (US); Xusheng Zhang, Shoreview, MN (US)

(73) Assignee: Medtronic, Inc., Minneapolis, MN (US)

( * ) Notice: Subject to any disclaimer, the term of this patent is extended or adjusted under 35 U.S.C. 154(b) by 708 days.

(21) Appl. No.: 17/823,055

(22) Filed: Aug. 29, 2022

(65) Prior Publication Data
US 2023/0100431 A1     Mar. 30, 2023

Related U.S. Application Data

(60) Provisional application No. 63/250,535, filed on Sep. 30, 2021.

(51) Int. Cl.
*A61B 5/363* (2021.01)
*A61B 5/35* (2021.01)
*A61N 1/39* (2006.01)

(52) U.S. Cl.
CPC ............. *A61B 5/363* (2021.01); *A61B 5/35* (2021.01); *A61N 1/3956* (2013.01)

(58) Field of Classification Search
None
See application file for complete search history.

(56) References Cited

U.S. PATENT DOCUMENTS

| | | |
|---|---|---|
| 6,430,435 B1 | 8/2002 | Hsu et al. |
| 7,248,921 B2 | 7/2007 | Palreddy et al. |
| 7,333,855 B2 | 2/2008 | Gunderson et al. |
| 7,392,085 B2 | 6/2008 | Warren et al. |
| 7,496,409 B2 | 2/2009 | Greenhut et al. |
| 7,650,182 B2 | 1/2010 | Kim et al. |
| 7,761,142 B2 | 7/2010 | Ghanem et al. |

(Continued)

OTHER PUBLICATIONS (PCT/IB2022/058661) PCT Notification of Transmittal of the International Search Report and the Written Opinion of the International Searching Authority, Mailed Dec. 7, 2022, 14 pages.

*Primary Examiner* — Michael T. Holtzclaw

(57) ABSTRACT

A medical device is configured to sense first ventricular event signals from a first cardiac electrical signal and sense second ventricular event signals from a second cardiac electrical signal. The medical device is configured to determine sensed event data in response to the first ventricular event signals and the second ventricular event signals. The medical device may select one of the first cardiac electrical signal or the second cardiac electrical signal for providing input for tachyarrhythmia detection based on the sensed event data.

25 Claims, 17 Drawing Sheets

(56) References Cited

U.S. PATENT DOCUMENTS

| | | |
|---|---|---|
| 7,783,340 B2 | 8/2010 | Sanghera et al. |
| 7,907,993 B2 | 3/2011 | Ghanem et al. |
| 7,991,471 B2 | 8/2011 | Ghanem et al. |
| 8,027,720 B2 | 9/2011 | Bardy et al. |
| 8,050,754 B2 | 11/2011 | Ostroff et al. |
| 8,116,867 B2 | 2/2012 | Ostroff |
| 8,265,749 B2 | 9/2012 | Allavatam et al. |
| 8,521,268 B2 | 8/2013 | Zhang et al. |
| 8,781,585 B2 | 7/2014 | Gunderson et al. |
| 8,825,157 B2 | 9/2014 | Warren et al. |
| 8,909,331 B2 | 12/2014 | Sanghera et al. |
| 8,965,530 B2 | 2/2015 | Sanghera et al. |
| 8,983,586 B2 | 3/2015 | Zhang |
| 9,155,485 B2 | 10/2015 | Ostroff et al. |
| 9,179,853 B2 | 11/2015 | Sanghera et al. |
| 9,364,677 B2 | 6/2016 | Sanghera et al. |
| 9,579,065 B2 | 2/2017 | Allavatam et al. |
| 9,764,152 B2 | 9/2017 | Warren et al. |
| 9,802,056 B2 | 10/2017 | Allavatam et al. |
| 9,849,291 B2 | 12/2017 | Keefe et al. |
| 10,252,071 B2 | 4/2019 | Cao et al. |
| 10,299,688 B2 | 5/2019 | Brisben et al. |
| 10,321,834 B2 | 6/2019 | Brisben et al. |
| 10,362,948 B2 | 7/2019 | Brisben et al. |
| 10,470,681 B2 | 11/2019 | Greenhut et al. |
| 10,507,332 B2 | 12/2019 | Zhang et al. |
| 10,555,684 B2 | 2/2020 | Zhang et al. |
| 10,561,332 B2 | 2/2020 | Zhang et al. |
| 10,675,478 B2 | 6/2020 | Marshall et al. |
| 10,709,379 B2 | 7/2020 | Warren et al. |
| 10,850,113 B2 | 12/2020 | Cao et al. |
| 2012/0004515 A1* | 1/2012 | Cao .............. A61N 1/3704 600/300 |
| 2014/0276160 A1 | 9/2014 | Zhang et al. |
| 2016/0106989 A1 | 4/2016 | Stadler et al. |
| 2016/0113536 A1 | 4/2016 | Greenhut et al. |
| 2017/0312532 A1 | 11/2017 | Zhang et al. |
| 2017/0354827 A1 | 12/2017 | Zhang et al. |
| 2018/0028083 A1* | 2/2018 | Greenhut .......... A61N 1/3956 |
| 2018/0028085 A1* | 2/2018 | Zhang ............. A61B 5/7203 |
| 2018/0028087 A1 | 2/2018 | Zhang et al. |
| 2018/0177425 A1 | 6/2018 | Stadler et al. |
| 2018/0207437 A1* | 7/2018 | Zhang ............. A61N 1/3987 |
| 2019/0336026 A1* | 11/2019 | Dawoud ........... A61B 5/7225 |
| 2021/0138243 A1 | 5/2021 | Zhang et al. |
| 2021/0170170 A1 | 6/2021 | Mischler et al. |

* cited by examiner

MEDICAL DEVICE AND METHOD FOR DETECTING TACHY ARRHYTHMIA

REFERENCE TO RELATED APPLICATION

This application claims the benefit of provisional U.S. Patent Application No. 63/250,535, filed on Sep. 30, 2021, incorporated herein by reference in its entirety.

TECHNICAL FIELD

The disclosure relates generally to a medical device and method for sensing cardiac signals and detecting tachyarrhythmia.

BACKGROUND

Medical devices may sense electrophysiological signals from the heart, brain, nerve, muscle or other tissue. Such devices may be implantable, wearable or external devices using implantable and/or surface (skin) electrodes for sensing the electrophysiological signals. In some cases, such devices may be configured to deliver a therapy based on the sensed electrophysiological signals. For example, implantable or external cardiac pacemakers, cardioverter defibrillators, cardiac monitors and the like, sense cardiac electrical signals from a patient's heart. The medical device may sense cardiac electrical signals from a heart chamber and deliver electrical stimulation therapies to the heart chamber using electrodes carried by a transvenous medical electrical lead that positions electrodes within the patient's heart.

A cardiac pacemaker or cardioverter defibrillator may deliver therapeutic electrical stimulation to the heart via electrodes carried by one or more medical electrical leads coupled to the medical device. The electrical stimulation may include signals such as pacing pulses and/or cardioversion or defibrillation shocks. In some cases, a medical device may sense cardiac electrical signals attendant to the intrinsic depolarizations of the myocardium and control delivery of stimulation signals to the heart based on sensed cardiac electrical signals. Cardiac signals sensed within a heart chamber using endocardial electrodes carried by transvenous leads, for example, generally have a high signal strength and quality for reliably sensing near-field cardiac electrical events, such as ventricular R-waves sensed from within a ventricle. Upon detection of an abnormal rhythm, such as bradycardia, tachycardia or fibrillation, an appropriate electrical stimulation signal or signals may be delivered to restore or maintain a more normal rhythm of the heart. For example, an implantable cardioverter defibrillator (ICD) may deliver pacing pulses to the heart of the patient upon detecting bradycardia or tachycardia or deliver cardioversion or defibrillation (CV/DF) shocks to the heart upon detecting tachycardia or fibrillation.

SUMMARY

In general, this disclosure is directed to a medical device and techniques for sensing cardiac electrical signals and detecting tachyarrhythmia. In some examples, the medical device may be coupled to extracardiac medical leads carrying electrodes for sensing cardiac electrical signals and delivering electrical stimulation pulses, including pacing pulses and/or cardioversion and defibrillation (CV/DF) shocks. A medical device operating according to the techniques disclosed herein is configured to receive at least two cardiac electrical signals via two different sensing electrode vectors for sensing ventricular event signals, e.g., R-waves attendant to ventricular depolarizations. The medical device may determine sensed ventricular event intervals (e.g., RR intervals) between consecutively sensed ventricular event signals and compare the sensed ventricular event intervals to one or more tachyarrhythmia detection interval thresholds for detecting tachyarrhythmia intervals. The medical device may track the number of tachyarrhythmia intervals for detecting a tachyarrhythmia based on a count of tachyarrhythmia intervals.

The medical device may process and analyze the sensed cardiac electrical signals for determining sensed event data associated with ventricular event signals sensed from each of the cardiac electrical signals. Determining the sensed event data may include identifying time-based matched ventricular event signals, identifying noisy cycles, determining peak amplitudes of sensed ventricular event signals, determining RR intervals, or other sensed event characteristics. The medical device may analyze the sensed event data for verifying the reliability of one of the sensed cardiac electrical signals for providing input for detecting tachyarrhythmia based on the input. In some examples, when a threshold number of tachyarrhythmia intervals are detected from at least one of the cardiac electrical signals, the medical device may select, based on an analysis of the sensed event data, one of the sensed cardiac electrical signals for providing input for tachyarrhythmia detection.

In one example, the disclosure provides a medical device including a sensing circuit configured to receive multiple cardiac electrical signals, sense first ventricular event signals from a first cardiac electrical signal of the multiple cardiac electrical signals and sense second ventricular event signals from a second cardiac electrical signal of the plurality of cardiac electrical signals. The medical device includes a control circuit configured to determine sensed event data in response to each one of the first ventricular event signals and the second ventricular event signals sensed by the sensing circuit and detect a threshold number of tachyarrhythmia intervals from one of the first ventricular event signals sensed from the first cardiac electrical signal or the second ventricular event signals sensed from the second cardiac electrical signal. In response to detecting the threshold number of tachyarrhythmia intervals, the control circuit may be configured to determine that reliability criteria are met based on the sensed event data and select one of the first cardiac electrical signal or the second cardiac electrical signal for providing input for tachyarrhythmia detection in response to the reliability criteria being met. The control circuit may be configured to detect a tachyarrhythmia based on the selected one of the first cardiac electrical signal or the second cardiac electrical signal.

In another example, the disclosure provides a method that includes receiving multiple cardiac electrical signals, sensing first ventricular event signals from a first cardiac electrical signal of the multiple cardiac electrical signals, sensing second ventricular event signals from a second cardiac electrical signal of the multiple cardiac electrical signals and determining sensed event data in response to each one of the first ventricular event signals and the second ventricular event signals. The method may further include detecting a threshold number of tachyarrhythmia intervals from one of the first ventricular event signals sensed from the first cardiac electrical signal or the second ventricular event signals sensed from the second cardiac electrical signal. In response to detecting the threshold number of tachyarrhythmia intervals, the method may include determining that reliability criteria are met based on the sensed event data and selecting one of the first cardiac electrical signal or the second cardiac electrical signal for providing input for tachyarrhythmia detection in response to the reliability criteria being met. The method may further include detecting a tachyarrhythmia based on the input from the selected one of the first cardiac electrical signal or the second cardiac electrical signal.

In another example, the disclosure provides a non-transitory computer-readable medium storing a set of instructions which, when executed by a control circuit of a medical device, cause the medical device to receive multiple cardiac electrical signals, sense first ventricular event signals from a first cardiac electrical signal of the multiple cardiac electrical signals, sense second ventricular event signals from a second cardiac electrical signal of the multiple cardiac electrical signals, and determine sensed event data in response to each one of the first ventricular event signals and the second ventricular event signals. The instructions may further cause the medical device to detect a threshold number of tachyarrhythmia intervals from one of the first ventricular event signals or the second ventricular event signals and, in response to detecting the threshold number of tachyarrhythmia intervals, determine that reliability criteria are met based on the sensed event data. The instructions may further cause the device to select one of the first cardiac electrical signal or the second cardiac electrical signal for providing input for tachyarrhythmia detection in response to the reliability criteria being met and detect a tachyarrhythmia based on the input from the selected one of the first cardiac electrical signal or the second cardiac electrical signal.

Further disclosed herein is the subject matter of the following examples:

Example 1. A medical device including a sensing circuit configured to receive a plurality of cardiac electrical signals, sense first ventricular event signals from a first cardiac electrical signal of the plurality of cardiac electrical signals and sense second ventricular event signals from a second cardiac electrical signal of the plurality of cardiac electrical signals. The medical device further including a control circuit configured to determine sensed event data in response to each one of the first ventricular event signals and the second ventricular event signals sensed by the sensing circuit, detect a threshold number of tachyarrhythmia intervals from one of the first ventricular event signals sensed from the first cardiac electrical signal or the second ventricular event signals sensed from the second cardiac electrical signal and, in response to detecting the threshold number of tachyarrhythmia intervals, determine that reliability criteria are met based on the sensed event data. The control circuit is further configured to select one of the first cardiac electrical signal or the second cardiac electrical signal for providing input for tachyarrhythmia detection in response to the reliability criteria being met and detect a tachyarrhythmia based on the selected one of the first cardiac electrical signal or the second cardiac electrical signal.

Example 2. The medical device of example 1 further comprising a therapy delivery circuit configured to deliver an electrical stimulation therapy in response to the control circuit detecting the tachyarrhythmia.

Example 3. The medical device of any of examples 1-2 wherein the control circuit is configured to determine the sensed event data by classifying each of the first ventricular event signals and each of the second ventricular event signals as one of a time-based matched event signal or a time-based non-matched event signal.

Example 4. The medical device of example 3 wherein the control circuit is configured to classify each of the first ventricular event signals by setting a first match window in response to each of the first ventricular event signals, determining whether a second ventricular event signal is sensed within the first match window, classifying a first ventricular event signal as a time-based matched event signal in response to a second ventricular event signal being sensed within the first match window and classifying a first ventricular event signal as a time-based unmatched event signal in response to a second ventricular event signal not being sensed within the first match window. The control circuit may be further configured to classify each of the second ventricular event signals by setting a second match window in response to each of the second ventricular event signals, determining whether a first ventricular event signal is sensed within the second match window, classifying a second ventricular event signal as a time-based matched event signal in response to a first ventricular event signal being sensed within the second match window and classifying a second ventricular event signal as a time-based unmatched event signal in response to a first ventricular event signal not being sensed within the second match window.

Example 5. The medical device of any of examples 3-4 wherein the control circuit is configured to determine that the reliability criteria are met based on the sensed event data by identifying one of the first cardiac electrical signal and the second cardiac electrical signal as a candidate signal, determining for the candidate signal that the time-based matched event signals represent at least a predetermined percentage of ventricular event signals sensed by the sensing circuit from the candidate signal and determining that the reliability criteria are met based on the time-based matched event signals representing at least the predetermined percentage of ventricular event signals sensed from the candidate signal. The control circuit may select the candidate signal for tachyarrhythmia detection in response to the reliability criteria being met.

Example 6. The medical device of any of examples 1-5 wherein the control circuit is configured to determine the sensed event data by determining a peak amplitude of each one of the first ventricular event signals from the first cardiac electrical signal and determining a peak amplitude of each one of the second ventricular event signals from the second cardiac electrical signal.

Example 7. The medical device of example 6 wherein the control circuit is configured to determine that the reliability criteria are met based on the sensed event data by identifying one of the first cardiac electrical signal and the second cardiac electrical signal as a candidate signal and for, the candidate signal, classifying ventricular event signals sensed from the candidate signal as one of time-based matched event signals or time-based unmatched event signals, determining a first representative amplitude from the peak amplitudes determined from the candidate signal that are classified as time-based matched event signals and determining a second representative amplitude from the peak amplitudes determined from the candidate signal that are classified as time-based unmatched event signals. The control circuit may determine that a ratio of the first representative amplitude to the second representative amplitude is less than a threshold ratio and determine that the reliability criteria are met based on the ratio being less than the threshold ratio. The control circuit may select the candidate signal for tachyarrhythmia detection in response to the reliability criteria being met.

Example 8. The medical device of any of examples 6-7 wherein the control circuit is further configured to determine that the reliability criteria are met based on the sensed event data by identifying a first one of the first cardiac electrical signal and the second cardiac electrical signal as a candidate signal and a second one of the first cardiac electrical signal and the second cardiac electrical signal as a non-candidate signal. The control circuit may further determine a first amplitude metric of the peak amplitudes determined from the candidate signal, determine a second amplitude metric of the peak amplitudes determined from the non-candidate signal and determine that the first amplitude metric is greater than the second amplitude metric. The control circuit may determine that the reliability criteria are met based on the first amplitude metric being greater than the second amplitude metric and select the candidate signal for tachyarrhythmia detection in response to the reliability criteria being met.

Example 9. The medical device of any of examples 6-8 wherein the sensing circuit is further configured to set a minimum sensing threshold for sensing ventricular event signals. The control circuit can be further configured to determine that the reliability criteria are met based on the sensed event data by identifying a first one of the first cardiac electrical signal and the second cardiac electrical signal as a candidate signal, identifying a second one of the first cardiac electrical signal and the second cardiac electrical signal as a non-candidate signal, determining an amplitude metric representative of the peak amplitudes determined from the non-candidate signal; determining that the amplitude metric is less than a predetermined multiple of the minimum sensing threshold and determining that the reliability criteria are met based on the amplitude metric being less than the predetermined multiple of the minimum sensing threshold. The control circuit may select the candidate signal for tachyarrhythmia detection in response to the reliability criteria being met.

Example 10. The medical device of any of examples 1-9 wherein the control circuit is further configured to determine the sensed event data for each of the first sensed event signals and the second sensed event signals by determining a signal pulse count during a noise analysis time interval and identifying each of the first sensed event signals and the second sensed event signals having a signal pulse count that is greater than a noise threshold as a noisy cycle.

Example 11. The medical device of example 10 wherein the control circuit is further configured to determine that the reliability criteria are met based on the sensed event data by identifying one of the first cardiac electrical signal and the second cardiac electrical signal as a candidate signal, determining a count of the noisy cycles identified for the candidate signal, determining that the count of the identified noisy cycles for the candidate signal is less than a signal noise threshold and determining that the reliability criteria are met based on the count of noisy cycles identified for the candidate signal being less than the signal noise threshold. The control circuit may select the candidate signal for tachyarrhythmia detection in response to the reliability criteria being met.

Example 12. The medical device of any of examples 1-11 wherein the control circuit is further configured to determine the sensed event data by determining first RR intervals from the first ventricular event signals sensed from the first cardiac electrical signal and determining second RR intervals from the second ventricular event signals sensed from the second cardiac electrical signal.

Example 13. The medical device of example 12 wherein the control circuit is further configured to determine that the reliability criteria are met based on the sensed event data by identifying one of the first cardiac electrical signal and the second cardiac electrical signal as a candidate signal, determining a maximum RR interval corresponding to the candidate signal from one of the first RR intervals or the second RR intervals, determining that the maximum RR interval corresponding to the candidate signal is less than an RR interval threshold and determining that the reliability criteria are met based on the maximum RR interval corresponding to the candidate signal being less than the RR interval threshold. The control circuit may select the candidate signal for providing input for tachyarrhythmia detection in response to the reliability criteria being met.

Example 14. The medical device of any of examples 12-13 wherein the control circuit is further configured to determine that the reliability criteria are met based on the sensed event data by: identifying a first one of the first cardiac electrical signal and the second cardiac electrical signal as a candidate signal and a second one of the first cardiac electrical signal and the second cardiac electrical signal as a non-candidate signal; determining a maximum RR interval corresponding to the non-candidate signal from one of the first RR intervals or the second RR intervals; determining that the maximum RR interval corresponding to the non-candidate signal is greater than an undersensing RR interval threshold; and determining that the reliability criteria are met based on the maximum RR interval corresponding to the non-candidate signal being greater than the undersensing RR interval threshold. The control circuit may select the candidate signal for providing input for tachyarrhythmia detection in response to the reliability criteria being met.

Example 15. The medical device of any of examples 1-14 wherein the control circuit is further configured to identify a candidate signal as a first one of the first cardiac electrical signal or the second cardiac electrical signal having the threshold number of tachyarrhythmia intervals detected from the corresponding first ventricular event signals sensed from the first cardiac electrical signal or second ventricular event signals sensed from the second cardiac electrical signal and identify a non-candidate cardiac electrical signal as a second one of the first cardiac electrical signal or the second cardiac electrical signal having less than the threshold number of tachyarrhythmia intervals detected from the corresponding first sensed ventricular event signals sensed from the first cardiac electrical signal or the second sensed ventricular event signals sensed from the second cardiac electrical signal. The control circuit may select the candidate signal for providing input for tachyarrhythmia detection in response to the reliability criteria being met.

Example 16. The medical device of example 15 wherein the control circuit is further configured to determine for the candidate signal a percentage of ventricular event signals sensed from the candidate signal that are matched in time to ventricular event signals sensed from the non-candidate signal and a maximum RR interval between ventricular event signals sensed from the candidate signal. The control circuit may determine that the reliability criteria are met by determining that the percentage of ventricular event signals sensed from the candidate signal that are matched in time to ventricular event signals sensed from the non-candidate signal is greater than a threshold percentage and determining that the maximum RR interval between the ventricular event signals sensed from the candidate signal is less than a maximum RR interval threshold.

Example 17. The medical device of any of examples 15-16 wherein the control circuit is further configured to determine a count of ventricular event signals sensed from the candidate signal by the sensing circuit that are noisy cycles, determine a first representative amplitude of ventricular event signals sensed from the candidate signal by the sensing circuit that are matched in time to ventricular event signals sensed from the non-candidate signal by the sensing circuit, determine a second representative amplitude of ventricular event signals sensed from the candidate signal by the sensing circuit that are unmatched in time to ventricular event signals sensed from the non-candidate signal by the sensing circuit. The control circuit may determine a ratio of the first representative amplitude to the second representative amplitude. The control circuit may determine a third representative amplitude of ventricular event signals sensed from the candidate signal by the sensing circuit and determine a fourth representative amplitude of ventricular event signals sensed from the non-candidate signal by the sensing circuit. The control circuit may determine that the reliability criteria are met by determining that the count of noisy cycles is less than a signal noise threshold, determining that the ratio is less than a threshold ratio and determining that the third representative amplitude is greater than fourth representative amplitude.

Example 18. The medical device of any of examples 15-17 wherein the control circuit is further configured to determine a representative amplitude of ventricular event signals sensed from the non-candidate signal by the sensing circuit and determine a maximum RR interval from ventricular event signals sensed from the non-candidate signal by the sensing circuit. The control circuit may determine that the reliability criteria are met by determining that the representative amplitude of ventricular event signals sensed from the non-candidate signal is less than a threshold amplitude and determining that the maximum RR interval determined from ventricular event signals sensed from the non-candidate signal is greater than an undersensing threshold interval.

Example 19. The medical device of any of examples 1-18 wherein the control circuit is further configured to detect a tachyarrhythmia detection threshold number of tachyarrhythmia intervals from the selected one of the first cardiac electrical signal or the second cardiac electrical signal and detect the tachyarrhythmia based on detecting the tachyarrhythmia detection threshold number of tachyarrhythmia intervals from the selected one of the first cardiac electrical signal or the second cardiac electrical signal.

Example 20. The medical device of any of examples 1-19, wherein the control circuit is further configured to determine at least one morphology feature from a third signal of the plurality of cardiac electrical signals received by the sensing circuit in response to each of the first ventricular event signals and each of the second ventricular event signals. The control circuit may detect the tachyarrhythmia based on the input from the selected one of the first cardiac electrical signal or the second cardiac electrical signal by analyzing the morphology features determined in response to only the first ventricular event signals or only the second ventricular event signals corresponding to the selected one of the first cardiac electrical signal or the second cardiac electrical signal.

Example 21. A method comprising receiving a plurality of cardiac electrical signals, sensing first ventricular event signals from a first cardiac electrical signal of the plurality of cardiac electrical signals and sensing second ventricular event signals from a second cardiac electrical signal of the plurality of cardiac electrical signals. The method further including determining sensed event data in response to each one of the first ventricular event signals and the second ventricular event signals, detecting a threshold number of tachyarrhythmia intervals from one of the first ventricular event signals sensed from the first cardiac electrical signal or the second ventricular event signals sensed from the second cardiac electrical signal. In response to detecting the threshold number of tachyarrhythmia intervals, the method can include determining that reliability criteria is met based on the sensed event data and selecting one of the first cardiac electrical signal or the second cardiac electrical signal for providing input for tachyarrhythmia detection in response to the reliability criteria being met. The method may include detecting a tachyarrhythmia based on the input from the selected one of the first cardiac electrical signal or the second cardiac electrical signal.

Example 22. The method of example 21 further comprising delivering an electrical stimulation therapy in response to detecting the tachyarrhythmia.

Example 23. The method of any of examples 21-22 wherein determining the sensed event data comprises classifying each of the first ventricular event signals and each of the second ventricular event signals as one of a time-based matched event signal or a time-based non-matched event signal.

Example 24. The method of example 23 wherein classifying each of the first ventricular event signals and each of the second ventricular event signals comprises setting a first match window in response to each of the first ventricular event signals, determining whether a second ventricular event signal is sensed within the first match window, and classifying a first ventricular event signal as a time-based matched event signal in response to a second ventricular event signal being sensed within the first match window or classifying a first ventricular event signal as a time-based unmatched event signal in response to a second ventricular event signal not being sensed within the first match window. The method may further include setting a second match window in response to each of the second ventricular event signals, determining whether a first ventricular event signal is sensed within the second match window and classifying a second ventricular event signal as a time-based matched event signal in response to a first ventricular event signal being sensed within the second match window or classifying a second ventricular event signal as a time-based unmatched event signal in response to a first ventricular event signal not being sensed within the second match window.

Example 25. The method of any of examples 23-24 further comprising determining that the reliability criteria are met based on the sensed event data by identifying one of the first cardiac electrical signal and the second cardiac electrical signal as a candidate signal and determining, for the candidate signal, that the time-based matched event signals represent at least a predetermined percentage of ventricular event signals sensed by the sensing circuit from the candidate signal. The method may include determining that the reliability criteria are met based on the time-based matched event signals representing at least the predetermined percentage of ventricular event signals sensed from the candidate signal and selecting the candidate signal for providing input for tachyarrhythmia detection in response to the reliability criteria being met.

Example 26. The method of any of examples 21-25 further comprising determining the sensed event data by determining a peak amplitude of each one of the first ventricular event signals from the first cardiac electrical signal and determining a peak amplitude of each one of the second ventricular event signals from the second cardiac electrical signal.

Example 27. The method of example 26, further comprising determining that the reliability criteria are met based on the sensed event data by identifying one of the first cardiac electrical signal and the second cardiac electrical signal as a candidate signal and, for the candidate signal, classifying ventricular event signals sensed from the candidate signal as one of time-based matched event signals or time-based unmatched event signals. The method may include determining a first representative amplitude from the peak amplitudes determined from the candidate signal that are classified as time-based matched event signals, determining a second representative amplitude from the peak amplitudes determined from the candidate signal that are classified as time-based unmatched event signals and determining that a ratio of the first representative amplitude to the second representative amplitude is less than a threshold ratio. The method may include determining that the reliability criteria are met based on the ratio being less than the threshold ratio and selecting the candidate signal for providing input for tachyarrhythmia detection in response to the reliability criteria being met.

Example 28. The method of any of examples 26-27 further comprising determining that the reliability criteria are met based on the sensed event data by identifying a first one of the first cardiac electrical signal and the second cardiac electrical signal as a candidate signal, identifying a second one of the first cardiac electrical signal and the second cardiac electrical signal as a non-candidate signal, determining a first amplitude metric of the peak amplitudes determined from the candidate signal, determining a second amplitude metric of the peak amplitudes determined from the non-candidate signal, determining that the first amplitude metric is greater than the second amplitude metric and determining that the reliability criteria are met based on the first amplitude metric being greater than the second amplitude metric. The method may include selecting the candidate signal for providing input for tachyarrhythmia detection in response to the reliability criteria being met.

Example 29. The method of any of examples 26-28 further comprising setting a minimum sensing threshold for sensing ventricular event signals and determining that the reliability criteria are met based on the sensed event data by identifying a first one of the first cardiac electrical signal and the second cardiac electrical signal as a candidate signal, identifying a second one of the first cardiac electrical signal and the second cardiac electrical signal as a non-candidate signal, determining an amplitude metric representative of the peak amplitudes determined from the non-candidate signal and determining that the amplitude metric is less than a predetermined multiple of the minimum sensing threshold. The method may include determining that the reliability criteria are met based on the amplitude metric being less than the predetermined multiple of the minimum sensing threshold and selecting the candidate signal for providing input for tachyarrhythmia detection in response to the reliability criteria being met.

Example 30. The method of any of examples 20-29 further comprising determining the sensed event data for each of the first sensed event signals and the second sensed event signals by determining a signal pulse count during a noise analysis time interval and identifying each of the first sensed event signals and the second sensed event signals having a signal pulse count that is greater than a noise threshold as a noisy cycle.

Example 31. The method of example 30, further comprising determining that the reliability criteria are met based on the sensed event data by identifying one of the first cardiac electrical signal and the second cardiac electrical signal as a candidate signal, determining a count of the noisy cycles identified for the candidate signal, determining that the count of the identified noisy cycles for the candidate signal is less than a signal noise threshold and determining that the reliability criteria are met based on the count of noisy cycles identified for the candidate signal being less than the signal noise threshold. The method may include selecting the candidate signal for providing input for tachyarrhythmia detection in response to the reliability criteria being met.

Example 32. The method of any of examples 21-31 further comprising determining the sensed event data by determining first RR intervals from the first ventricular event signals sensed from the first cardiac electrical signal and determining second RR intervals from the second ventricular event signals sensed from the second cardiac electrical signal.

Example 33. The method of example 32 further comprising determining that the reliability criteria are met based on the sensed event data by identifying one of the first cardiac electrical signal and the second cardiac electrical signal as a candidate signal, determining a maximum RR interval corresponding to the candidate signal from one of the first RR intervals or the second RR intervals, determining that the maximum RR interval corresponding to the candidate signal is less than an RR interval threshold, and determining that the reliability criteria are met based on the maximum RR interval corresponding to the candidate signal being less than the RR interval threshold. The method may further include selecting the candidate signal for providing input for tachyarrhythmia detection in response to the reliability criteria being met.

Example 34. The method of any of examples 32-33 further comprising determining that the reliability criteria are met based on the sensed event data by identifying a first one of the first cardiac electrical signal and the second cardiac electrical signal as a candidate signal, identifying a second one of the first cardiac electrical signal and the second cardiac electrical signal as a non-candidate signal, determining a maximum RR interval corresponding to the non-candidate signal from one of the first RR intervals or the second RR intervals, determining that the maximum RR interval corresponding to the non-candidate signal is greater than an undersensing RR interval threshold and determining that the reliability criteria are met based on the maximum RR interval corresponding to the non-candidate signal being greater than the undersensing RR interval threshold. The method may include selecting the candidate signal for providing input for tachyarrhythmia detection in response to the reliability criteria being met.

Example 35. The method of any of examples 21-34 further comprising identifying a candidate signal as a first one of the first cardiac electrical signal or the second cardiac electrical signal having the threshold number of tachyarrhythmia intervals detected from the corresponding first ventricular event signals sensed from the first cardiac electrical signal or second ventricular event signals sensed from the second cardiac electrical signal and identifying a non-candidate cardiac electrical signal as a second one of the first cardiac electrical signal or the second cardiac electrical signal having less than the threshold number of tachyarrhythmia intervals detected from the corresponding first sensed ventricular event signals sensed from the first cardiac electrical signal or the second sensed ventricular event signals sensed from the second cardiac electrical signal. The method may include selecting the candidate signal for providing input for tachyarrhythmia detection in response to the reliability criteria being met.

Example 36. The method of example 35 further comprising determining for the candidate signal a percentage of ventricular event signals sensed from the candidate signal that are matched in time to ventricular event signals sensed from the non-candidate signal and a maximum RR interval between ventricular event signals sensed from the candidate signal. The method may further include determining that the reliability criteria are met by determining that the percentage of ventricular event signals sensed from the candidate signal that are matched in time to ventricular event signals sensed from the non-candidate signal is greater than a threshold percentage and determining that the maximum RR interval between the ventricular event signals sensed from the candidate signal is less than a maximum RR interval threshold.

Example 37. The method of any of examples 35-36 further comprising determining a count of ventricular event signals sensed from the candidate signal that are noisy cycles, determining a first representative amplitude of ventricular event signals sensed from the candidate signal that are matched in time to ventricular event signals sensed from the non-candidate signal, determining a second representative amplitude of ventricular event signals sensed from the candidate signal that are unmatched in time to ventricular event signals sensed from the non-candidate signal, and determining a ratio of the first representative amplitude to the second representative amplitude. The method may further include determining a third representative amplitude of ventricular event signals sensed from the candidate signal and determining a fourth representative amplitude of ventricular event signals sensed from the non-candidate signal. The method may further include determining that the reliability criteria are met by determining that the count of noisy cycles is less than a signal noise threshold, determining that the ratio is less than a threshold ratio and determining that the third representative amplitude is greater than fourth representative amplitude.

Example 38. The method of any of examples 35-37 further comprising determining a representative amplitude of ventricular event signals sensed from the non-candidate signal and determining a maximum RR interval from ventricular event signals sensed from the non-candidate signal. The method may further include determining that the reliability criteria are met by determining that the representative amplitude of ventricular event signals sensed from the non-candidate signal is less than a threshold amplitude and determining that the maximum RR interval determined from ventricular event signals sensed from the non-candidate signal is greater than an undersensing threshold interval.

Example 39. The method any of examples 21-38 further comprising detecting a tachyarrhythmia detection threshold number of tachyarrhythmia intervals from the selected one of the first cardiac electrical signal or the second cardiac electrical signal and detecting the tachyarrhythmia based on detecting the tachyarrhythmia detection threshold number of tachyarrhythmia intervals from the selected one of the first cardiac electrical signal or the second cardiac electrical signal.

Example 40. The method of any of examples 21-39 further comprising determining at least one morphology feature from a third signal of the plurality of cardiac electrical signals in response to each of the first ventricular event signals and each of the second ventricular event signals. The method may further include detecting the tachyarrhythmia based on the input from the selected one of the first cardiac electrical signal or the second cardiac electrical signal by analyzing the morphology features determined in response to only the first ventricular event signals or only the second ventricular event signals corresponding to the selected one of the first cardiac electrical signal or the second cardiac electrical signal.

Example 41. A non-transitory computer readable medium storing instructions that, when executed by a control circuit of a medical device, cause the medical device to: receive a plurality of cardiac electrical signals; sense first ventricular event signals from a first cardiac electrical signal of the plurality of cardiac electrical signals; sense second ventricular event signals from a second cardiac electrical signal of the plurality of cardiac electrical signals; determine sensed event data in response to each one of the first ventricular event signals and the second ventricular event signals; and detect a threshold number of tachyarrhythmia intervals from one of the first ventricular event signals or the second ventricular event signals. In response to detecting the threshold number of tachyarrhythmia intervals, the instructions further cause the medical device to determine that reliability criteria are met based on the sensed event data, select one of the first cardiac electrical signal or the second cardiac electrical signal for providing input for tachyarrhythmia detection in response to the reliability criteria being met, and detect a tachyarrhythmia based on the input from the selected one of the first cardiac electrical signal or the second cardiac electrical signal.

Example 42. A medical device comprising a sensing circuit configured to receive a plurality of cardiac electrical signals, sense first ventricular event signals from a first cardiac electrical signal of the plurality of cardiac electrical signals and sense second ventricular event signals from a second cardiac electrical signal of the plurality of cardiac electrical signals. The medical device further includes a control circuit configured to determine sensed event data in response to each one of the first ventricular event signals and the second ventricular event signals sensed by the sensing circuit, detect a threshold number of tachyarrhythmia intervals from one of the first cardiac electrical signal or the second cardiac electrical signal and in response to detecting the threshold number of tachyarrhythmia intervals, select based on the sensed event data one of the first cardiac electrical signal or the second cardiac electrical signal for providing input for tachyarrhythmia detection. The control circuit may detect a tachyarrhythmia based on the selected one of the first cardiac electrical signal or the second cardiac electrical signal. The medical device may include a therapy delivery circuit configured to deliver an electrical stimulation therapy in response to the control circuit detecting the tachyarrhythmia.

Example 43. The medical device of example 42 wherein the control circuit is further configured to determine the sensed event data by setting a first match window in response to each of the first ventricular event signals, determining whether one of the second ventricular event signals is sensed from the second cardiac electrical signal within the first match window and classifying each of the first ventricular event signals as one of: a time-based matched event signal in response to one of the second ventricular event signals being sensed from the second cardiac electrical signal within the first match window or a time-based unmatched event signal in response to none of the second ventricular event signals being sensed from the second cardiac electrical signal within the first match window. The control circuit can be further configured to determine the sensed event data by setting a second match window in response to each of the second ventricular event signals, determining whether one of the first ventricular event signals is sensed from the first cardiac electrical signal within the second match window and classifying each of the second ventricular event signals as one of: a time-based matched event signal in response to one of the first ventricular event signals being sensed from the first cardiac electrical signal within the second match window or a time-based unmatched event signal in response to none of the first ventricular event signals being sensed from the first cardiac electrical signal within the second match window.

Example 44. The medical device of example 43, wherein the control circuit is further configured to select, based on the sensed event data, one of the first cardiac electrical signal or the second cardiac electrical signal for providing input for tachyarrhythmia detection by identifying one of the first cardiac electrical signal and the second cardiac electrical signal as a candidate signal and determining, for the candidate signal, that the classified time-based matched event signals are at least a predetermined percentage of the respective first ventricular event signals or the second ventricular event signals sensed from the candidate signal. The control circuit may select the candidate signal for providing input for tachyarrhythmia detection in response to the classified time-based matched event signals being at least the predetermined percentage of the respective first ventricular event signals or the second ventricular event signals sensed from the candidate signal.

Example 45. The medical device of example 44 wherein the control circuit is further configured to determine the sensed event data by determining first peak amplitudes from the candidate signal, the first peak amplitudes associated with time-based matched event signals, and determining second peak amplitudes from the candidate signal, the second peak amplitudes associated with the time-based unmatched event signals. The control circuit may determine a ratio from the first peak amplitudes and the second peak amplitudes, determine that the ratio meets a threshold ratio and select one of the first cardiac electrical signal or the second cardiac electrical signal for providing input for tachyarrhythmia detection by selecting the candidate signal in response to the ratio meeting the threshold ratio.

Example 46. The medical device of any of examples 42-45, wherein the control circuit is further configured to determine the sensed event data by determining first peak amplitudes from the first ventricular event signals and determining second peak amplitudes from the second ventricular event signals.

Example 47. The medical device of example 46 wherein the sensing circuit is further configured to sense each of the first ventricular event signals from the first cardiac electrical signal by determining a crossing of a first auto-adjusting sensing threshold by the first cardiac electrical signal and sense each of the second ventricular event signals from the second cardiac electrical signal by determining a crossing of a second auto-adjusting sensing threshold by the second cardiac electrical signal. The control circuit can be further configured to determine the sensed event data by determining a first sensing threshold amplitude for each of the first sensed event signals by determining an amplitude of the first auto-adjusting sensing threshold at the crossing of the of the first auto-adjusting sensing threshold and determining second sensing threshold amplitudes by determining, for each of the second sensed event signals, an amplitude of the second auto-adjusting sensing threshold at the crossing of the of the second auto-adjusting sensing threshold. The control circuit may determine from the first peak amplitudes and the first sensing threshold amplitudes a first amplitude-to-sense threshold ratio associated with the first ventricular event signals and determine from the second peak amplitudes and the second sensing threshold amplitudes a second amplitude-to-sense threshold ratio associated with the second ventricular event signals. The control circuit may select one of the first cardiac electrical signal or the second cardiac electrical signal for providing input for tachyarrhythmia detection based on at least the first amplitude-to-sense threshold ratio and the second amplitude-to-sense threshold ratio.

Example 48. The medical device of example 46 wherein the control circuit is further configured to identify a first one of the first cardiac electrical signal and the second cardiac electrical signal as a candidate signal and identify a second one of the first cardiac electrical signal and the second cardiac electrical signal as a non-candidate signal. The control circuit may determine an amplitude metric from the peak amplitudes determined from the non-candidate signal and determine that the amplitude metric is less than a threshold amplitude. The control circuit may select one of the first cardiac electrical signal or the second cardiac electrical signal for providing input for tachyarrhythmia detection by selecting the candidate signal in response to the amplitude metric being less than the threshold amplitude.

Example 49. The medical device of any of examples 42-48 wherein the control circuit is further configured to identify one of the first cardiac electrical signal and the second cardiac electrical signal as a candidate signal, determine the sensed event data by applying a noise analysis time interval to the candidate signal in response to each of the first sensed event signals or the second sensed event signals that are sensed from the candidate signal; and determining a signal pulse count from the candidate signal sensed during the noise analysis time interval. The control circuit may determine that less than a threshold number of the signal pulse counts are greater than a noisy cycle threshold and select one of the first cardiac electrical signal or the second cardiac electrical signal for providing input for tachyarrhythmia detection by selecting the candidate signal at least in response to less than the threshold number of the signal pulse counts being greater than the noisy cycle threshold.

Example 50. The medical device of any of the examples 42-49 wherein the control circuit is further configured to determine the sensed event data by determining first RR intervals from the first ventricular event signals sensed from the first cardiac electrical signal and determining second RR intervals from the second ventricular event signals sensed from the second cardiac electrical signal. The control circuit may identify one of the first cardiac electrical signal and the second cardiac electrical signal as a candidate signal, determine that the RR intervals determined from the candidate signal are less than an RR interval threshold and select one of the first cardiac electrical signal or the second cardiac electrical signal for providing input for tachyarrhythmia detection by selecting the candidate signal at least in response to the RR intervals determined from the candidate signal being less than the RR interval threshold.

Example 51. The medical device of any of examples 42-50 wherein the control circuit is further configured to determine the sensed event data by determining first RR intervals from the first ventricular event signals sensed from the first cardiac electrical signal and determining second RR intervals from the second ventricular event signals sensed from the second cardiac electrical signal. The control circuit may identify a first one of the first cardiac electrical signal and the second cardiac electrical signal as a candidate signal and identify a second one of the first cardiac electrical signal and the second cardiac electrical signal as a non-candidate signal. The control circuit may determine that a maximum RR interval of one of the first RR intervals or the second RR intervals that are associated with the non-candidate signal is greater than an undersensing RR interval threshold. The control circuit may select one of the first cardiac electrical signal or the second cardiac electrical signal for providing input for tachyarrhythmia detection by selecting the candidate signal at least in response to the maximum RR interval associated with the non-candidate signal being greater than the undersensing RR interval threshold.

Example 52. The medical device of any of examples 42-51 wherein the control circuit is further configured to identify a candidate signal as one of the first cardiac electrical signal and the second cardiac electrical signal that is associated with the detected threshold number of tachyarrhythmia intervals and identify a non-candidate signal as a second one of the first cardiac electrical signal and the second cardiac electrical signal that is not associated with the detected threshold number of tachyarrhythmia intervals. The control circuit may determine when reliability criteria are met based on the sensed event data and select one of the first cardiac electrical signal or the second cardiac electrical signal for providing input for tachyarrhythmia detection by selecting the candidate signal for providing input for tachyarrhythmia detection in response to the reliability criteria being met or selecting the non-candidate signal for providing input for tachyarrhythmia detection in response to the reliability criteria not being met.

Example 53. The medical device of any of examples 42-52, further comprising a memory. The control circuit is further configured to detect the tachyarrhythmia based on the selected one of the first cardiac electrical signal or the second cardiac electrical signal by detecting a detection threshold number of tachyarrhythmia intervals from the selected one of the first cardiac electrical signal or the second cardiac electrical signal and buffering in the memory time segments of a third cardiac electrical signal of the plurality of cardiac electrical signals received by the sensing circuit, each of the time segments being buffered in the memory in response to the first ventricular event signals or the second ventricular event signals that are sensed from the selected one of the first cardiac electrical signal or the second cardiac electrical signal. The control circuit may be further configured to detect the tachyarrhythmia by determining at least one morphology feature from time segments of the third cardiac electrical signal and detecting the tachyarrhythmia based on the detection threshold number of tachyarrhythmia intervals detected from the selected one of the first cardiac electrical signal or the second cardiac electrical signal and the at least one morphology feature.

Example 54. A method comprising receiving a plurality of cardiac electrical signals, sensing first ventricular event signals from a first cardiac electrical signal of the plurality of cardiac electrical signals, sensing second ventricular event signals from a second cardiac electrical signal of the plurality of cardiac electrical signals and determining sensed event data in response to each one of the first ventricular event signals and the second ventricular event signals. The method includes detecting a threshold number of tachyarrhythmia intervals from one of the first cardiac electrical signal or the second cardiac electrical signal and, in response to detecting the threshold number of tachyarrhythmia intervals, selecting based on the sensed event data one of the first cardiac electrical signal or the second cardiac electrical signal for providing input for tachyarrhythmia detection. The method may include detecting a tachyarrhythmia based on the input from the selected one of the first cardiac electrical signal or the second cardiac electrical signal. The method may further include delivering an electrical stimulation therapy in response to detecting the tachyarrhythmia.

Example 55. The method of example 54 wherein determining the sensed event data comprises setting a first match window in response to each of the first ventricular event signals, determining whether one of the second ventricular event signals is sensed from the second cardiac electrical signal within the first match window and classifying each of the first ventricular event signals as one of: a time-based matched event signal in response to one of the second ventricular event signals being sensed from the second cardiac electrical signal within the first match window or a time-based unmatched event signal in response to none of the second ventricular event signals being sensed from the second cardiac electrical signal within the first match window. The method may further include setting a second match window in response to each of the second ventricular event signals, determining whether one of the first ventricular event signals is sensed from the first cardiac electrical signal within the second match window and classifying each of the second ventricular event signals as one of: a time-based matched event signal in response to one of the first ventricular event signals being sensed from the first cardiac electrical signal within the second match window or a time-based unmatched event signal in response to none of the first ventricular event signals being sensed from the first cardiac electrical signal within the second match window.

Example 56. The method of example 55, wherein selecting, based on the sensed event data, one of the first cardiac electrical signal or the second cardiac electrical signal for providing input for tachyarrhythmia detection comprises identifying one of the first cardiac electrical signal and the second cardiac electrical signal as a candidate signal and determining, for the candidate signal, that the classified time-based matched event signals are at least a predetermined percentage of the respective first ventricular event signals or the second ventricular event signals sensed from the candidate signal. The method may include selecting one of the first cardiac electrical signal or the second cardiac electrical signal for providing input for tachyarrhythmia detection by selecting the candidate signal in response to the classified time-based matched event signals being at least the predetermined percentage of the respective first ventricular event signals or the second ventricular event signals sensed from the candidate signal.

Example 57. The method of example 56 further comprising determining the sensed event data by determining first peak amplitudes from the candidate signal, the first peak amplitudes associated with time-based matched event signals, and determining second peak amplitudes from the candidate signal, the second peak amplitudes associated with the time-based unmatched event signals. The method may further include determining a ratio from the first peak amplitudes and the second peak amplitudes and determining that the ratio meets a threshold ratio. The method may include selecting one of the first cardiac electrical signal or the second cardiac electrical signal for providing input for tachyarrhythmia detection by selecting the candidate signal in response to the ratio meeting the threshold ratio.

Example 58. The method of any of example 54-57, wherein determining the sensed event data comprises determining first peak amplitudes from the first ventricular event signals and determining second peak amplitudes from the second ventricular event signals.

Example 59. The method of example 58, further comprising sensing each of the first ventricular event signals from the first cardiac electrical signal by determining a crossing of a first auto-adjusting sensing threshold by the first cardiac electrical signal and sensing each of the second ventricular event signals from the second cardiac electrical signal by determining a crossing of a second auto-adjusting sensing threshold by the second cardiac electrical signal. Determining the sensed event data may further comprises determining a first sensing threshold amplitude for each of the first sensed event signals by determining an amplitude of the first auto-adjusting sensing threshold at the crossing of the of the first auto-adjusting sensing threshold and determining a second sensing threshold amplitude for each of the second sensed event signals by determining an amplitude of the second auto-adjusting sensing threshold at the crossing of the of the second auto-adjusting sensing threshold. The method may include determining from the first peak amplitudes and the first sensing threshold amplitudes a first amplitude-to-sense threshold ratio associated with the first ventricular event signals and determining from the second peak amplitudes and the second sensing threshold amplitudes a second amplitude-to-sense threshold ratio associated with the second ventricular event signals. The method may include selecting one of the first cardiac electrical signal or the second cardiac electrical signal for providing input for tachyarrhythmia detection based on at least the first amplitude-to-sense threshold ratio and the second amplitude-to-sense threshold ratio.

Example 60. The method of example 58 further comprising identifying a first one of the first cardiac electrical signal and the second cardiac electrical signal as a candidate signal and identifying a second one of the first cardiac electrical signal and the second cardiac electrical signal as a non-candidate signal. The method may include determining an amplitude metric from the peak amplitudes determined from the non-candidate signal, determining that the amplitude metric is less than a threshold amplitude and selecting one of the first cardiac electrical signal or the second cardiac electrical signal for providing input for tachyarrhythmia detection by selecting the candidate signal in response to the amplitude metric being less than the threshold amplitude.

Example 61. The method of any of examples 54-60 further comprising identifying one of the first cardiac electrical signal and the second cardiac electrical signal as a candidate signal, determining the sensed event data by applying a noise analysis time interval to the candidate signal in response to each of the first sensed event signals or the second sensed event signals that are sensed from the candidate signal and determining a signal pulse count from the candidate signal sensed during the noise analysis time interval. The method may include determining that less than a threshold number of the signal pulse counts are greater than a noisy cycle threshold. The method may include selecting one of the first cardiac electrical signal or the second cardiac electrical signal for providing input for tachyarrhythmia detection by selecting the candidate signal in response to less than the threshold number of the signal pulse counts being greater than the noisy cycle threshold.

Example 62. The method of any of the examples 54-61 further comprising determining the sensed event data by determining first RR intervals from the first ventricular event signals sensed from the first cardiac electrical signal and determining second RR intervals from the second ventricular event signals sensed from the second cardiac electrical signal. The method may include identifying one of the first cardiac electrical signal and the second cardiac electrical signal as a candidate signal, determining that the RR intervals determined from the candidate signal are less than an RR interval threshold and selecting one of the first cardiac electrical signal or the second cardiac electrical signal for providing input for tachyarrhythmia detection by selecting the candidate signal at least in response to the RR intervals determined from the candidate signal being less than the RR interval threshold.

Example 63. The method of any of examples 54-62 further comprising determining the sensed event data by determining first RR intervals from the first ventricular event signals sensed from the first cardiac electrical signal and determining second RR intervals from the second ventricular event signals sensed from the second cardiac electrical signal. The method further including identifying a first one of the first cardiac electrical signal and the second cardiac electrical signal as a candidate signal, identifying a second one of the first cardiac electrical signal and the second cardiac electrical signal as a non-candidate signal and determining that a maximum RR interval of one of the first RR intervals or the second RR intervals that are associated with the non-candidate signal is greater than an undersensing RR interval threshold. The method may include selecting one of the first cardiac electrical signal or the second cardiac electrical signal for providing input for tachyarrhythmia detection by selecting the candidate signal at least in response to the maximum RR interval associated with the non-candidate signal being greater than the undersensing RR interval threshold.

Example 64. The method of any of the examples 54-63 further comprising identifying a candidate signal as one of the first cardiac electrical signal and the second cardiac electrical signal that is associated with the detected threshold number of tachyarrhythmia intervals and identifying a non-candidate signal as a second one of the first cardiac electrical signal and the second cardiac electrical signal that is not associated with the detected threshold number of tachyarrhythmia intervals. The method may further include determining when reliability criteria are met based on the sensed event data and selecting one of the first cardiac electrical signal or the second cardiac electrical signal for providing input for tachyarrhythmia detection by selecting the candidate signal for providing input for tachyarrhythmia detection in response to the reliability criteria being met or selecting the non-candidate signal for providing input for tachyarrhythmia detection in response to the reliability criteria not being met.

Example 65. The method of any of examples 54-64 further comprising detecting the tachyarrhythmia based on the selected one of the first cardiac electrical signal or the second cardiac electrical signal by detecting a detection threshold number of tachyarrhythmia intervals from the selected one of the first cardiac electrical signal or the second cardiac electrical signal and buffering time segments of a third cardiac electrical signal of the plurality of cardiac electrical signals, each of the time segments being buffered in response to the first ventricular event signals or the second ventricular event signals that are sensed from the selected one of the first cardiac electrical signal or the second cardiac electrical signal. The method may further include determining at least one morphology feature from time segments of the third cardiac electrical signal and detecting the tachyarrhythmia based on the detection threshold number of tachyarrhythmia intervals detected from the selected one of the first cardiac electrical signal or the second cardiac electrical signal and the at least one morphology feature.

Example 66. A non-transitory computer readable medium storing instructions that, when executed by a control circuit of a medical device, cause the medical device to receive a plurality of cardiac electrical signals, sense first ventricular event signals from a first cardiac electrical signal of the plurality of cardiac electrical signals, sense second ventricular event signals from a second cardiac electrical signal of the plurality of cardiac electrical signals, determine sensed event data in response to each one of the first ventricular event signals and the second ventricular event signals and detect a threshold number of tachyarrhythmia intervals from one of the first cardiac electrical signal or the second cardiac electrical signal. The instructions may further cause the medical device to, in response to detecting the threshold number of tachyarrhythmia intervals, select based on the sensed event data one of the first cardiac electrical signal or the second cardiac electrical signal for providing input for tachyarrhythmia detection and detect a tachyarrhythmia based on the input from the selected one of the first cardiac electrical signal or the second cardiac electrical signal. The instructions may further cause the medical device to deliver an electrical stimulation therapy in response to detecting the tachyarrhythmia.

This summary is intended to provide an overview of the subject matter described in this disclosure. It is not intended to provide an exclusive or exhaustive explanation of the apparatus and methods described in detail within the accompanying drawings and description below. Further details of one or more examples are set forth in the accompanying drawings and the description below.

DETAILED DESCRIPTION

In general, this disclosure describes a medical device and techniques for detecting tachyarrhythmia. In various examples, the medical device performing the techniques disclosed herein may be included in an ICD system capable of sensing cardiac electrical signals, detecting tachyarrhythmia, and delivering electrical stimulation therapy for terminating the tachyarrhythmia. In some examples, the ICD is coupled to an extra-cardiovascular lead. As used herein, the term "extra-cardiovascular" refers to a position outside the blood vessels, heart, and pericardium surrounding the heart of a patient. Implantable electrodes carried by extra-cardiovascular leads may be positioned extra-thoracically (outside the ribcage and sternum) or intra-thoracically (beneath the ribcage or sternum) but generally not in intimate contact with myocardial tissue. In other examples, transvenous extra-cardiac leads may carry implantable electrodes that can be positioned intravenously but outside the heart in an extra-cardiac location, e.g., within the internal thoracic vein, jugular vein, or other vein, for sensing cardiac electrical signals and delivering cardiac pacing pulses.

Figure 1A:
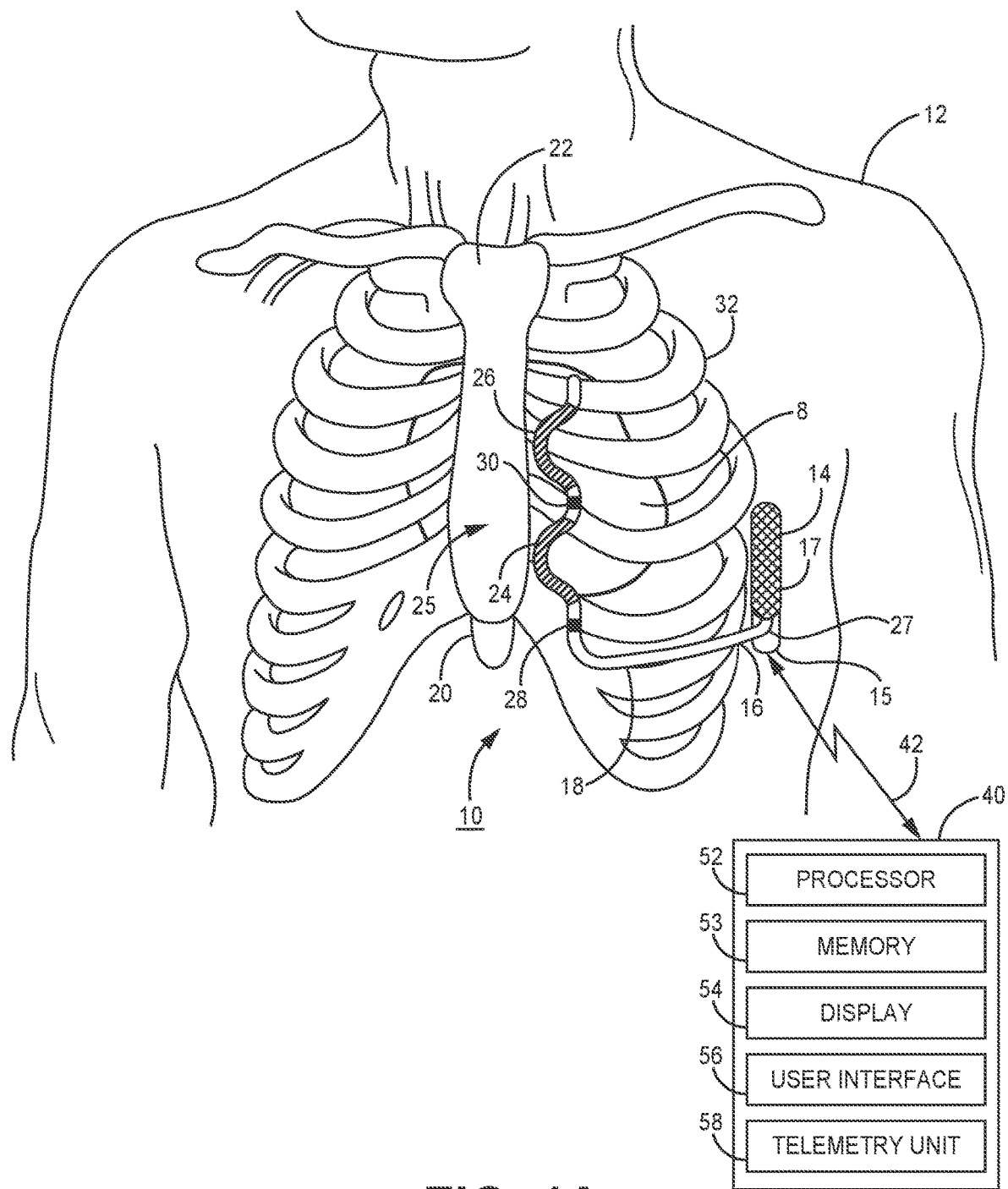
FIGS. 1A and 1B are conceptual diagrams of one example of an ICD system that may be configured to sense cardiac event signals, detect tachyarrhythmia and deliver electrical stimulation therapy according to the techniques disclosed herein.
Figure 1B:
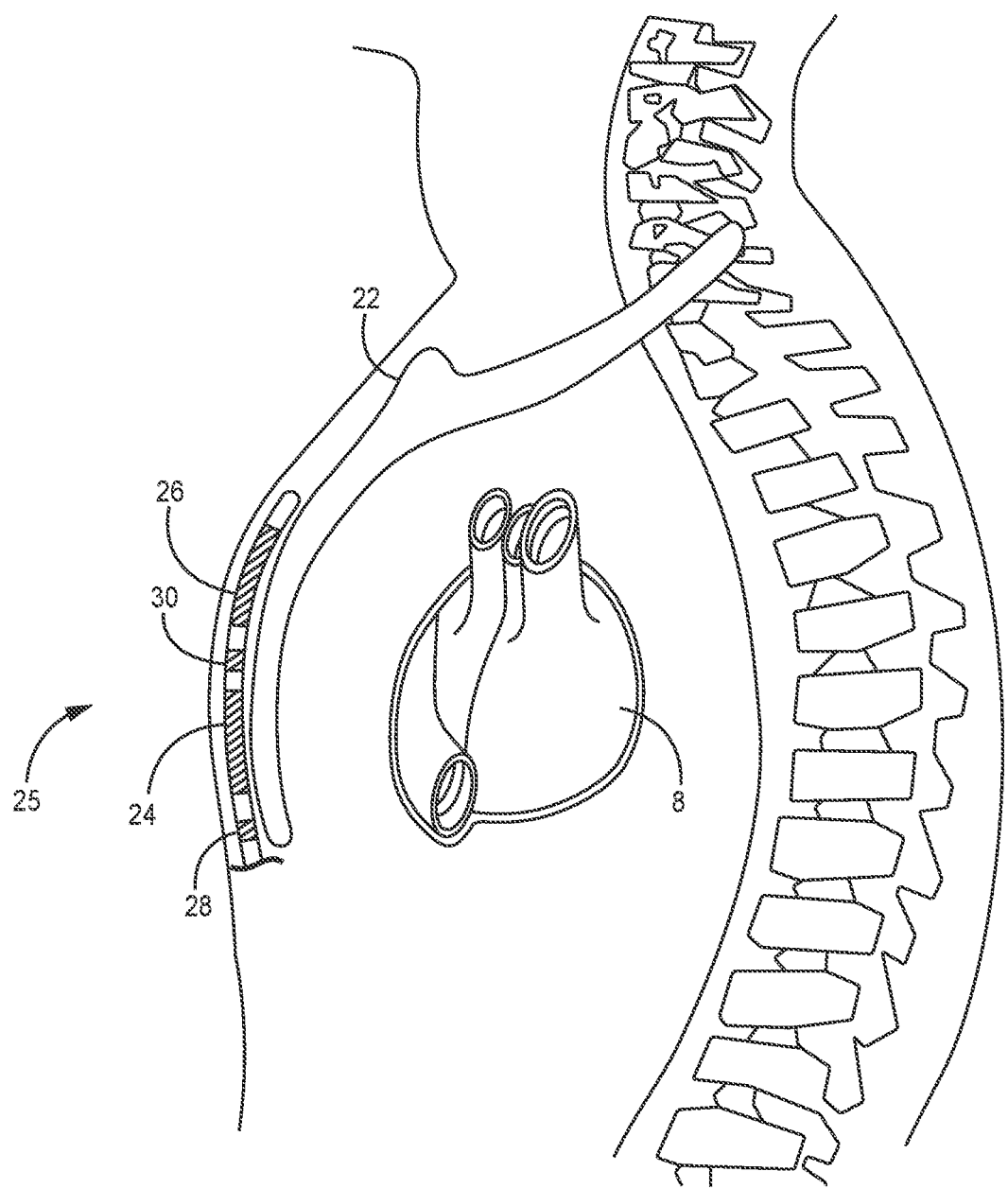

FIGS. 1A and 1B are conceptual diagrams of one example of an ICD system 10 that may be configured to sense cardiac event signals, detect tachyarrhythmia and deliver electrical stimulation therapy according to the techniques disclosed herein. FIG. 1A is a front view of ICD system 10 implanted within patient 12. FIG. 1B is a side view of ICD system 10 implanted within patient 12. ICD system 10 includes an ICD 14 connected to an electrical stimulation and sensing lead 16, positioned in an extra-cardiovascular location in this example. FIGS. 1A and 1B are described in the context of an ICD system 10 capable of providing high voltage CV/DF shocks and cardiac pacing pulses in response to detecting a cardiac arrhythmia based on processing of sensed cardiac electrical signals. The techniques for detecting tachyarrhythmia as disclosed herein may be implemented in a cardiac monitoring device that does not necessarily include cardiac pacing and/or CV/DF shock delivery capabilities in some examples. Furthermore, the techniques disclosed herein for sensing cardiac electrical signals and detecting tachyarrhythmia may be implemented in a variety of medical devices including external or implantable cardiac monitors, pacemakers, and ICDs.

ICD 14 includes a housing 15 that forms a hermetic seal that protects internal components of ICD 14. The housing 15 of ICD 14 may be formed of a conductive material, such as titanium or titanium alloy. The housing 15 may function as an electrode (sometimes referred to as a "can" electrode). Housing 15 may be used as an active can electrode for use in delivering CV/DF shocks or other high voltage pulses delivered using a high voltage therapy circuit. In other examples, housing 15 may be available for use in delivering unipolar, relatively lower voltage cardiac pacing pulses and/or for sensing cardiac electrical signals in combination with electrodes carried by lead 16. In other instances, the housing 15 of ICD 14 may include a plurality of electrodes on an outer portion of the housing. The outer portion(s) of the housing 15 functioning as an electrode(s) may be coated with a material, such as titanium nitride, e.g., for reducing post-stimulation polarization artifact.

ICD 14 includes a connector assembly 17 (also referred to as a connector block or header) that includes electrical feedthroughs crossing housing 15 to provide electrical connections between conductors extending within the lead body 18 of lead 16 and electronic components included within the housing 15 of ICD 14. As will be described in further detail herein, housing 15 may house one or more processors, memories, transceivers, cardiac electrical signal sensing circuitry, therapy delivery circuitry, power sources and other components for sensing cardiac electrical signals, detecting a heart rhythm, and controlling and delivering electrical stimulation pulses to treat an abnormal heart rhythm.

Elongated lead body 18 has a proximal end 27 that includes a lead connector (not shown) configured to be connected to ICD connector assembly 17 and a distal portion 25 that includes one or more electrodes. In the example illustrated in FIGS. 1A and 1B, the distal portion 25 of lead body 18 includes defibrillation electrodes 24 and 26 and pace/sense electrodes 28 and 30. In some cases, defibrillation electrodes 24 and 26 may together form a defibrillation electrode in that they may be configured to be activated concurrently. Alternatively, defibrillation electrodes 24 and 26 may form separate defibrillation electrodes in which case each of the electrodes 24 and 26 may be activated independently.

Electrodes 24 and 26 (and in some examples housing 15) are referred to herein as defibrillation electrodes because they are utilized, individually or collectively, for delivering high voltage stimulation therapy (e.g., CV/DF shocks). Electrodes 24 and 26 may be elongated coil electrodes and generally have a relatively high surface area for delivering high voltage electrical stimulation pulses compared to pacing and sensing electrodes 28 and 30. However, electrodes 24 and 26 and housing 15 may also be utilized to provide pacing functionality, sensing functionality or both pacing and sensing functionality in addition to or instead of high voltage stimulation therapy. In this sense, the use of the term "defibrillation electrode" herein should not be considered as limiting the electrodes 24 and 26 for use in only high voltage cardioversion/defibrillation shock therapy applications. For example, either of electrodes 24 and 26 may be used as a sensing electrode in a sensing electrode vector for sensing cardiac electrical signals and determining a need for an electrical stimulation therapy.

Electrodes 28 and 30 are relatively smaller surface area electrodes which are available for use in sensing electrode vectors for sensing cardiac electrical signals and may be used for delivering relatively low voltage pacing pulses in some configurations. Electrodes 28 and 30 are referred to as pace/sense electrodes because they are generally configured for use in low voltage applications, e.g., used as either a cathode or anode for delivery of pacing pulses and/or sensing of cardiac electrical signals, as opposed to delivering high voltage CV/DF shocks. In some instances, electrodes 28 and 30 may provide only pacing functionality, only sensing functionality or both.

ICD 14 may obtain cardiac electrical signals corresponding to electrical activity of heart 8 via a combination of sensing electrode vectors that include combinations of electrodes 24, 26, 28 and/or 30. In some examples, housing 15 of ICD 14 is used in combination with one or more of electrodes 24, 26, 28 and/or 30 in a sensing electrode vector. Various sensing electrode vectors utilizing combinations of electrodes 24, 26, 28, and 30 and housing 15 are described below for sensing cardiac electrical signals, which may include sensing two or more cardiac electrical signals, each using a different sensing electrode vector that may be selected by sensing circuitry included in ICD 14. As described herein, the cardiac electrical signal(s) received via a selected sensing electrode vector may be used by ICD 14 for sensing cardiac event signals attendant to intrinsic depolarizations of the myocardium, e.g., R-waves attendant to ventricular depolarization and in some cases P-waves attendant to atrial depolarization. Sensed cardiac event signals may be used for determining the heart rate and determining a need for cardiac pacing, e.g., for treating bradycardia or asystole, or for determining a need for tachyarrhythmia therapies, e.g., anti-tachycardia pacing (ATP) or CV/DF shocks.

As described below, two sensing electrode vectors may be selected for receiving two cardiac electrical signals for sensing ventricular event signals from the cardiac electrical signals. In some examples, one of the two cardiac electrical signals may be verified as a reliable signal for tachyarrhythmia detection through processing and analysis by a control circuit of ICD 14. Sensed cardiac event intervals determined from the verified, reliable signal may be used for detecting and counting tachyarrhythmia intervals and subsequently detecting a tachyarrhythmia episode when a threshold number of tachyarrhythmia intervals is reached. In some examples, a third sensing electrode vector may be selected for acquiring cardiac electrical signal segments that are analyzed by processing circuitry of ICD 14 for performing morphology analysis required by a tachyarrhythmia detection algorithm. In some examples, a threshold number of tachyarrhythmia intervals and cardiac signal morphology criteria are required to be met in order to detect tachyarrhythmia and deliver ATP and/or CV/DF shocks.

In the example illustrated in FIGS. 1A and 1B, electrode 28 is located proximal to defibrillation electrode 24, and electrode 30 is located between defibrillation electrodes 24 and 26. One, two or more pace/sense electrodes may be carried by lead body 18. For instance, a third pace/sense electrode may be located distal to defibrillation electrode 26 in some examples. Electrodes 28 and 30 are illustrated as ring electrodes; however, electrodes 28 and 30 may comprise any of a number of different types of electrodes, including ring electrodes, short coil electrodes, hemispherical electrodes, directional electrodes, segmented electrodes, or the like. Electrodes 28 and 30 may be positioned at other locations along lead body 18 and are not limited to the positions shown. In other examples, lead 16 may include fewer or more pace/sense electrodes and/or defibrillation electrodes than the example shown here.

In the example shown, lead 16 extends subcutaneously or submuscularly over the ribcage 32 medially from the connector assembly 27 of ICD 14 toward a center of the torso of patient 12, e.g., toward xiphoid process 20 of patient 12. At a location near xiphoid process 20, lead 16 bends or turns and extends superiorly, subcutaneously or submuscularly, over the ribcage and/or sternum, substantially parallel to sternum 22. Although illustrated in FIG. 1A as being offset laterally from and extending substantially parallel to sternum 22, the distal portion 25 of lead 16 may be implanted at other locations, such as over sternum 22, offset to the right or left of sternum 22, angled laterally from sternum 22 toward the left or the right, or the like. Alternatively, lead 16 may be placed along other subcutaneous or submuscular paths. The path of extra-cardiovascular lead 16 may depend on the location of ICD 14, the arrangement and position of electrodes carried by the lead body 18, and/or other factors. The techniques disclosed herein are not limited to a particular path of lead 16 or final locations of electrodes 24, 26, 28 and 30.

Electrical conductors (not illustrated) extend through one or more lumens of the elongated lead body 18 of lead 16 from the lead connector at the proximal lead end 27 to electrodes 24, 26, 28, and 30 located along the distal portion 25 of the lead body 18. The elongated electrical conductors contained within the lead body 18, which may be separate respective insulated conductors within the lead body 18, are each electrically coupled with respective defibrillation electrodes 24 and 26 and pace/sense electrodes 28 and 30. The respective conductors electrically couple the electrodes 24, 26, 28, and 30 to circuitry, such as a therapy delivery circuit and/or a sensing circuit, of ICD 14 via connections in the connector assembly 17, including associated electrical feedthroughs crossing housing 15. The electrical conductors transmit electrical stimulation pulses from a therapy delivery circuit within ICD 14 to one or more of defibrillation electrodes 24 and 26 and/or pace/sense electrodes 28 and 30 and transmit electrical signals produced by the patient's heart 8 from one or more of defibrillation electrodes 24 and 26 and/or pace/sense electrodes 28 and 30 to the sensing circuit within ICD 14.

The lead body 18 of lead 16 may be formed from a non-conductive material, including silicone, polyurethane, fluoropolymers, mixtures thereof, and/or other appropriate materials, and shaped to form one or more lumens within which the one or more conductors extend. Lead body 18 may be tubular or cylindrical in shape. In other examples, the distal portion 25 (or all of) the elongated lead body 18 may have a flat, ribbon or paddle shape. Lead body 18 may be formed having a preformed distal portion 25 that is generally straight, curving, bending, serpentine, undulating or zig-zagging.

In the example shown, lead body 18 includes a curving distal portion 25 having two "C" shaped curves, which together may resemble the Greek letter epsilon, "ε." Defibrillation electrodes 24 and 26 are each carried by one of the two respective C-shaped portions of the lead body distal portion 25. The two C-shaped curves are seen to extend or curve in the same direction away from a central axis of lead body 18, along which pace/sense electrodes 28 and 30 are positioned. Pace/sense electrodes 28 and 30 may, in some instances, be approximately aligned with the central axis of the straight, proximal portion of lead body 18 such that mid-points of defibrillation electrodes 24 and 26 are laterally offset from pace/sense electrodes 28 and 30.

Other examples of extra-cardiovascular leads including one or more defibrillation electrodes and one or more pacing and sensing electrodes carried by curving, serpentine, undulating or zig-zagging distal portion of the lead body 18 that may be implemented with the techniques described herein are generally disclosed in U.S. Pat. No. 10,675,478 (Marshall, et al.), incorporated herein by reference in its entirety. The techniques disclosed herein are not limited to any particular lead body design, however. In other examples, lead body 18 is a flexible elongated lead body without any pre-formed shape, bends or curves.

ICD 14 analyzes the cardiac electrical signals received from two or more sensing electrode vectors to monitor for abnormal rhythms, such as asystole, bradycardia, ventricular tachycardia (VT) or ventricular fibrillation (VF). ICD 14 may analyze the heart rate and morphology of the cardiac electrical signals to monitor for tachyarrhythmia in accordance with tachyarrhythmia detection techniques disclosed herein. ICD 14 generates and delivers electrical stimulation therapy in response to detecting a tachyarrhythmia, e.g., VT or VF (VT/VF) using a therapy delivery electrode vector which may be selected from any of the available electrodes 24, 26, 28 30 and/or housing 15. ICD 14 may deliver ATP in response to VT detection and in some cases may deliver ATP prior to a CV/DF shock or during high voltage capacitor charging in an attempt to avert the need for delivering a CV/DF shock. If ATP does not successfully terminate VT or when VF is detected, ICD 14 may deliver one or more CV/DF shocks via one or both of defibrillation electrodes 24 and 26 and/or housing 15. In some cases, ICD 14 delivers a CV/DF shock in response to detecting VT/VF without delivering ATP prior to shock delivery.

In the absence of a ventricular event signal, ICD 14 may generate and deliver a cardiac pacing pulse, such as a post-shock pacing pulse or bradycardia pacing pulse when asystole is detected or when a pacing escape interval expires prior to sensing a ventricular event signal. The cardiac pacing pulses may be delivered using a pacing electrode vector that includes one or more of the electrodes 24, 26, 28, and 30 and the housing 15 of ICD 14.

ICD 14 is shown implanted subcutaneously on the left side of patient 12 along the ribcage 32. ICD 14 may, in some instances, be implanted between the left posterior axillary line and the left anterior axillary line of patient 12. ICD 14 may, however, be implanted at other subcutaneous or submuscular locations in patient 12. For example, ICD 14 may be implanted in a subcutaneous pocket in the pectoral region. In this case, lead 16 may extend subcutaneously or submuscularly from ICD 14 toward the manubrium of sternum 22 and bend or turn and extend inferiorly from the manubrium to the desired location subcutaneously or submuscularly. In yet another example, ICD 14 may be placed abdominally. Lead 16 may be implanted in other extra-cardiovascular locations as well. For instance, as described with respect to FIGS. 2A-2C, the distal portion 25 of lead 16 may be implanted underneath the sternum/ribcage in the substernal space. FIGS. 1A and 1B are illustrative in nature and should not be considered limiting in the practice of the techniques disclosed herein. A medical device operating according to techniques disclosed herein may be coupled to a transvenous or non-transvenous lead in various examples for carrying electrodes for sensing cardiac electrical signals and delivering electrical stimulation therapy. For example, the medical device may be coupled to an extra-cardiovascular lead as illustrated in the accompanying drawings, referring to a lead that positions electrodes outside the blood vessels, heart, and pericardium surrounding the heart of a patient. Implantable electrodes carried by extra-cardiovascular leads may be positioned extra-thoracically (outside the ribcage and sternum), subcutaneously or submuscularly, or intra-thoracically (beneath the ribcage or sternum, sometimes referred to as a sub-sternal position) and may not necessarily be in intimate contact with myocardial tissue. An extra-cardiovascular lead may also be referred to as a "non-transvenous" lead.

In other examples, the medical device may be coupled to a transvenous lead that positions electrodes within a blood vessel, which may remain outside the heart in an "extra-cardiac" location or be advanced to position electrodes within a heart chamber. For instance, a transvenous medical lead may be advanced along a venous pathway to position electrodes in an extra-cardiac location within the internal thoracic vein (ITV), an intercostal vein, the superior epigastric vein, or the azygos, hemiazygos, or accessory hemiazygos veins, as examples. In still other examples, a transvenous lead may be advanced to position electrodes within the heart, e.g., within an atrial and/or ventricular heart chambers.

An external device 40 is shown in telemetric communication with ICD 14 by a wireless communication link 42. External device 40 may include a processor 52, memory 53, display 54, user interface 56 and telemetry unit 58. Processor 52 controls external device operations and processes data and signals received from ICD 14. Display unit 54, which may include a graphical user interface, displays data and other information to a user for reviewing ICD operation and programmed parameters as well as cardiac electrical signals retrieved from ICD 14.

User interface 56 may include a mouse, touch screen, keypad or the like to enable a user to interact with external device 40 to initiate a telemetry session with ICD 14 for retrieving data from and/or transmitting data to ICD 14, including programmable parameters for controlling cardiac event signal sensing, arrhythmia detection and therapy delivery. Telemetry unit 58 includes a transceiver and antenna configured for bidirectional communication with a telemetry circuit included in ICD 14 and is configured to operate in conjunction with processor 52 for sending and receiving data relating to ICD functions via communication link 42.

Communication link 42 may be established between ICD 14 and external device 40 using a radio frequency (RF) link such as BLUETOOTH®, Wi-Fi, or Medical Implant Communication Service (MICS) or other RF or communication frequency bandwidth or communication protocols. Data stored or acquired by ICD 14, including physiological signals or associated data derived therefrom, results of device diagnostics, and histories of detected rhythm episodes and delivered therapies, may be retrieved from ICD 14 by external device 40 following an interrogation command.

External device 40 may be embodied as a programmer used in a hospital, clinic or physician's office to retrieve data from ICD 14 and to program operating parameters and algorithms in ICD 14 for controlling ICD functions. External device 40 may alternatively be embodied as a home monitor or handheld device. External device 40 may be used to program cardiac signal sensing parameters, cardiac rhythm detection parameters and therapy control parameters used by ICD 14. At least some control parameters used in sensing cardiac event signals and detecting tachyarrhythmias according to the techniques disclosed herein as well as therapy delivery control parameters may be programmed into ICD 14 using external device 40 in some examples.

Figure 2A:
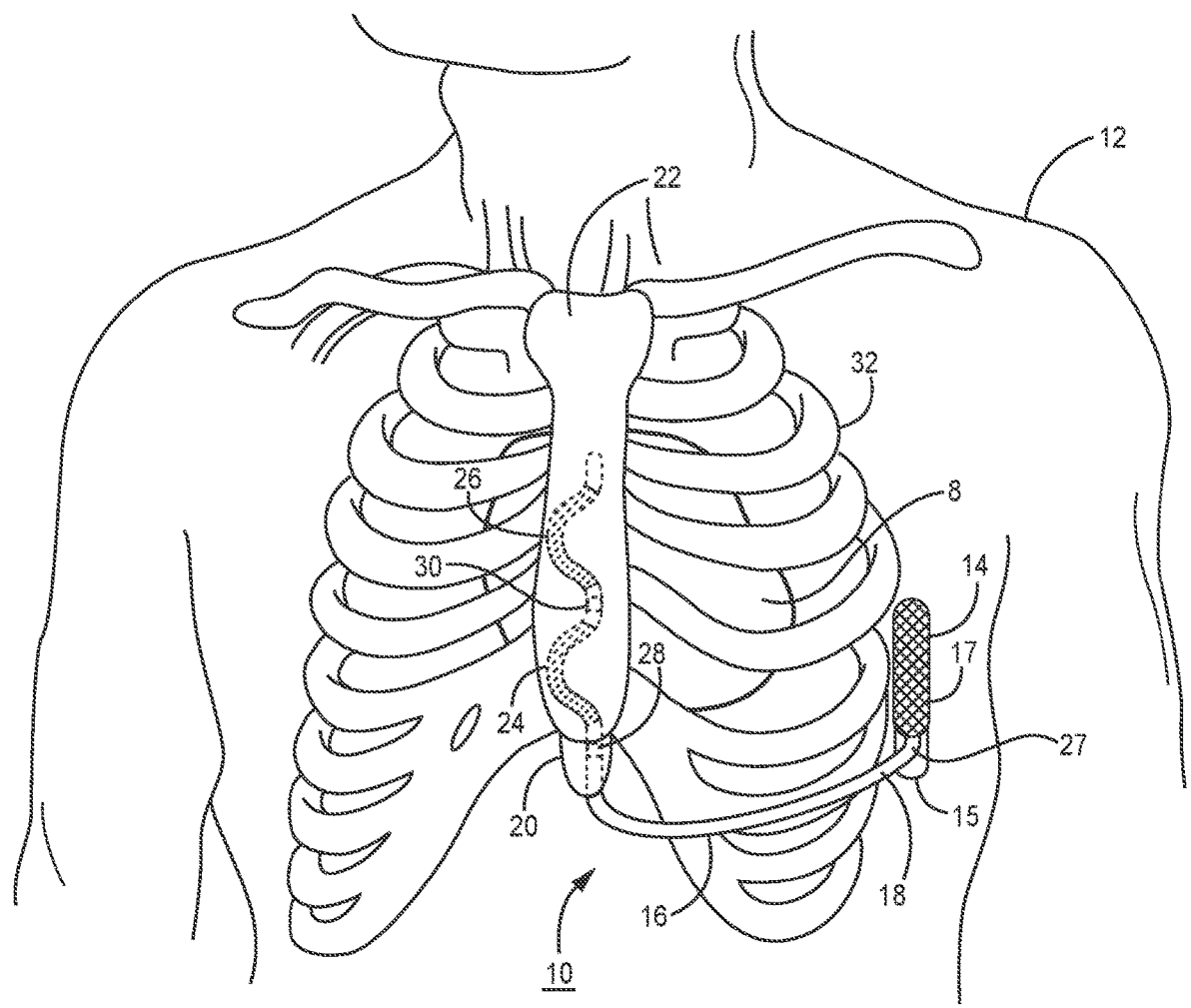
FIGS. 2A-2C are conceptual diagrams of a patient implanted with an ICD system in a different implant configuration than the arrangement shown in FIGS. 1A-1B.
Figure 2B:
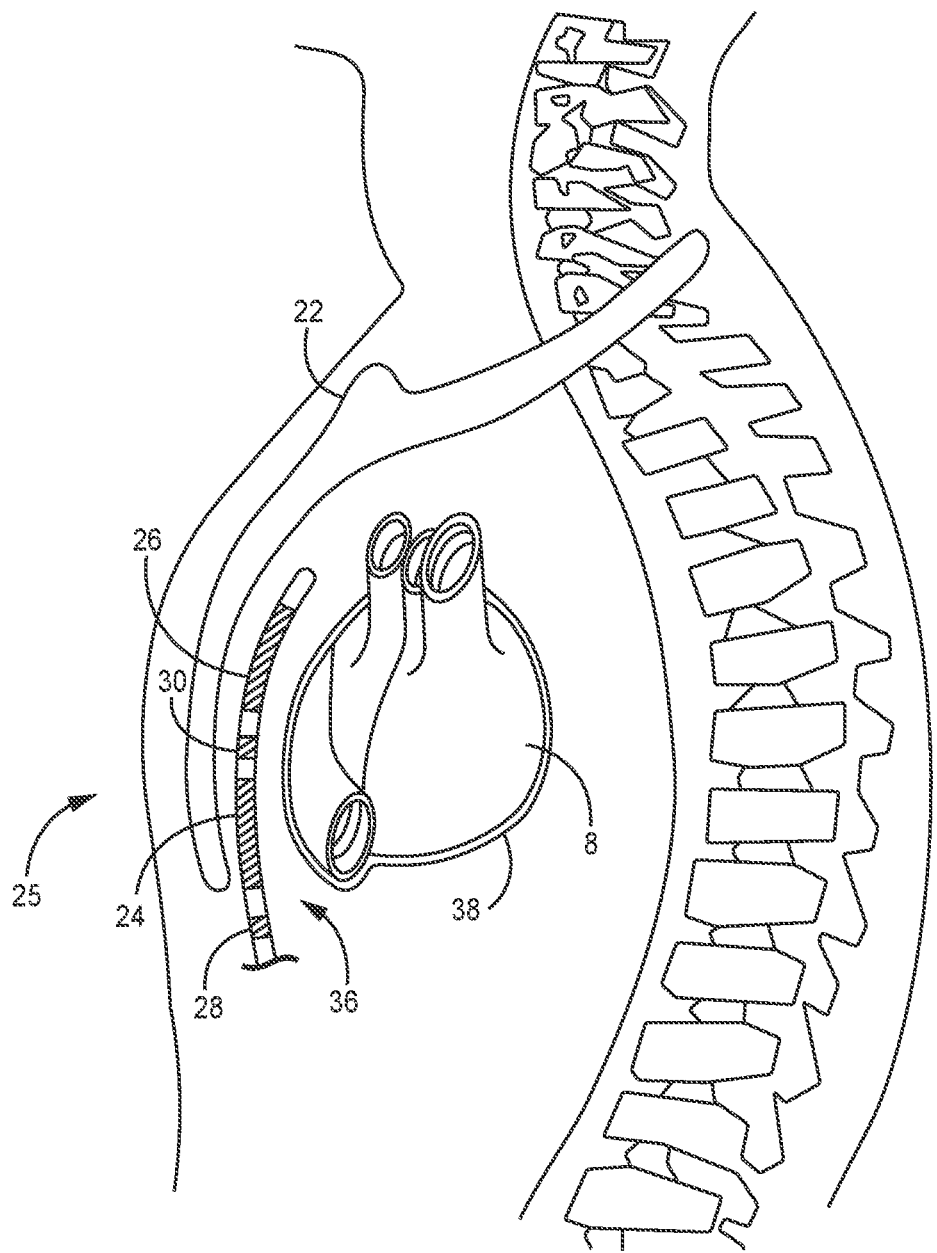
Figure 2C:
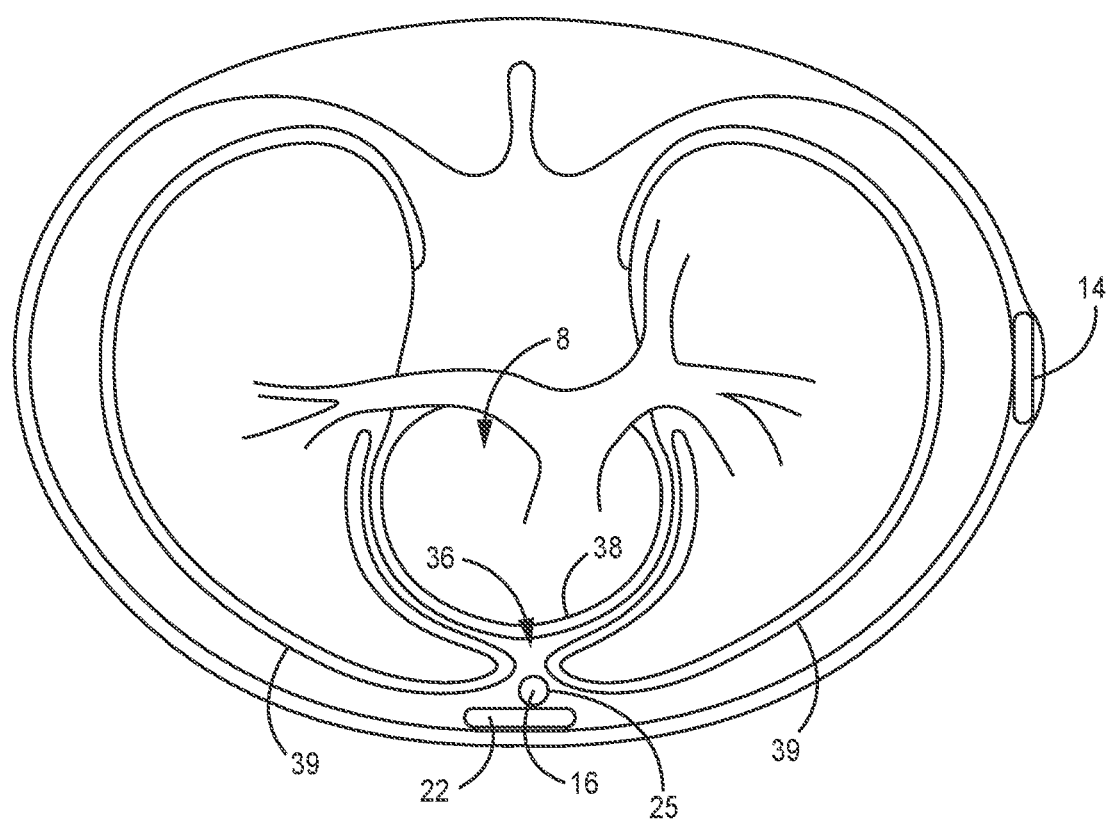

FIGS. 2A-2C are conceptual diagrams of patient 12 implanted with extra-cardiovascular ICD system 10 in a different implant configuration than the arrangement shown in FIGS. 1A-1B. FIG. 2A is a front view of patient 12 implanted with ICD system 10. FIG. 2B is a side view of patient 12 implanted with ICD system 10. FIG. 2C is a transverse view of patient 12 implanted with ICD system 10. In this arrangement, extra-cardiovascular lead 16 of system 10 is implanted at least partially underneath sternum 22 of patient 12. Lead 16 extends subcutaneously or submuscularly from ICD 14 toward xiphoid process 20 and at a location near xiphoid process 20 bends or turns and extends superiorly within anterior mediastinum 36 (see FIG. 2C) in a substernal position.

Anterior mediastinum 36 may be viewed as being bounded laterally by pleurae 39, posteriorly by pericardium 38, and anteriorly by sternum 22 (see FIG. 2C). The distal portion 25 of lead 16 may extend along the posterior side of sternum 22 substantially within the loose connective tissue and/or substernal musculature of anterior mediastinum 36. A lead implanted such that the distal portion 25 is substantially within anterior mediastinum 36, may be referred to as a "substernal lead."

In the example illustrated in FIGS. 2A-2C, lead 16 is located substantially centered under sternum 22. In other instances, however, lead 16 may be implanted such that it is offset laterally from the center of sternum 22. In some instances, lead 16 may extend laterally such that distal portion 25 of lead 16 is underneath/below the ribcage 32 in addition to or instead of sternum 22. In other examples, the distal portion 25 of lead 16 may be implanted in other extra-cardiac, intra-thoracic locations, including in the pleural cavity or around the perimeter of and adjacent to the pericardium 38 of heart 8.

In the various example implant locations of lead 16 and electrodes 24, 26, 28 and 30 shown and described herein, cardiac signals sensed by ICD 14 may have a relatively low and/or variable signal strength, e.g., caused by postural changes, respiration or other body movement, and/or may be contaminated by skeletal muscle myopotentials and/or environmental electromagnetic interference (EMI). Undersensing of R-waves or fibrillation waves may result in an undetected tachyarrhythmia when ATP or CV/DF therapy may be needed. Oversensing of P-waves, T-waves, skeletal muscle myopotentials or other noise may lead to a false tachyarrhythmia detection. Techniques disclosed herein provide improvements in sensing cardiac event signals and detecting tachyarrhythmia in order to avoid delivering unneeded tachyarrhythmia therapy and avoid withholding tachyarrhythmia therapy when it is actually needed.

Figure 3:
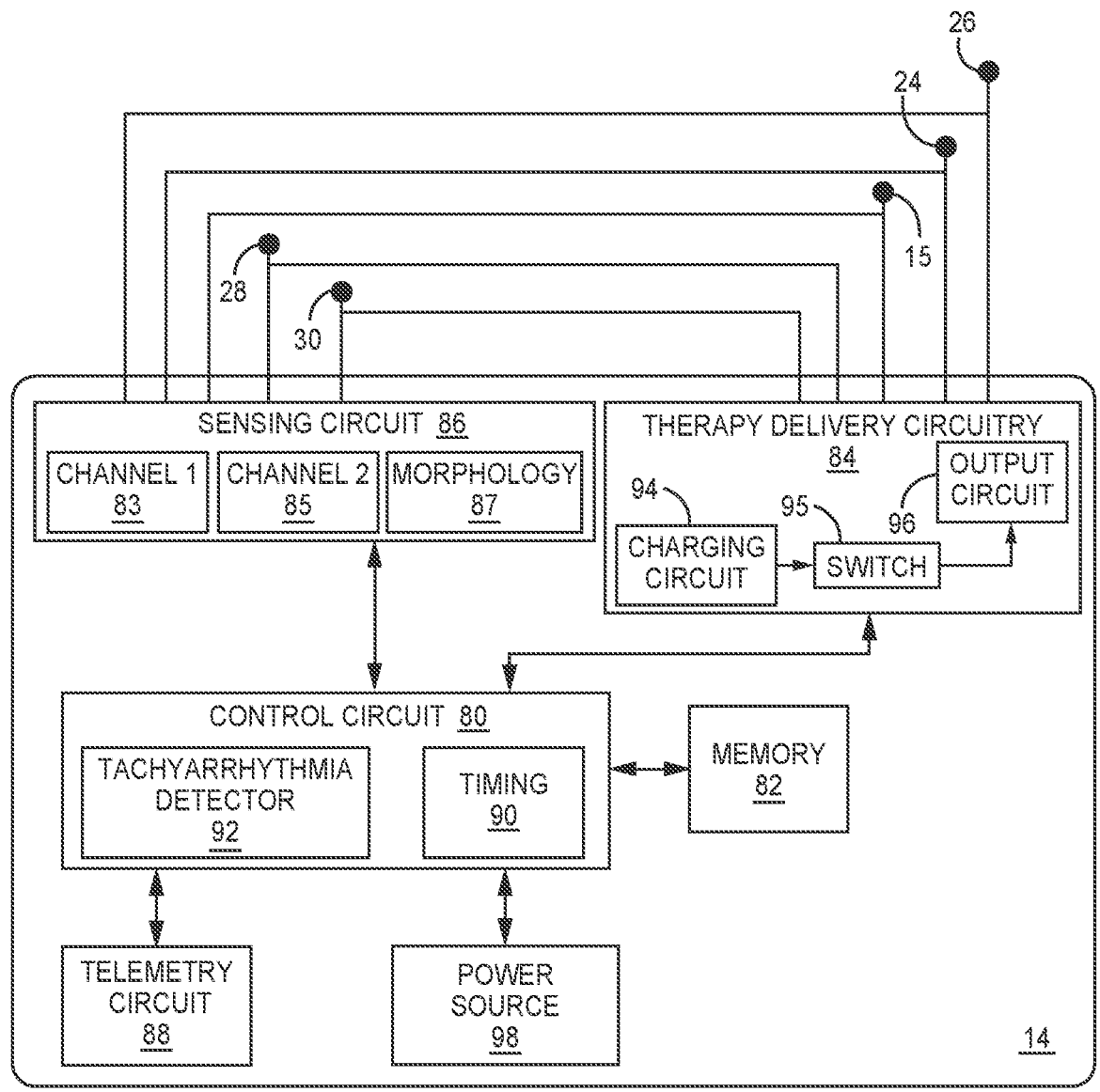
FIG. 3 is a conceptual diagram of an ICD according to one example.

FIG. 3 is a conceptual diagram of ICD 14 according to one example. The electronic circuitry enclosed within housing 15 (shown schematically as an electrode in FIG. 3) includes software, firmware and hardware that cooperatively monitor cardiac electrical signals, determine when an electrical stimulation therapy is necessary, and deliver therapy as needed according to programmed therapy delivery algorithms and control parameters. ICD 14 may be coupled to a lead, such as lead 16 carrying electrodes 24, 26, 28, and 30, for delivering electrical stimulation pulses to the patient's heart and for sensing cardiac electrical signals.

ICD 14 includes a control circuit 80, memory 82, therapy delivery circuit 84, cardiac electrical signal sensing circuit 86, and telemetry circuit 88. A power source 98 provides power to the circuitry of ICD 14, including each of the components 80, 82, 84, 86, and 88 as needed. Power source 98 may include one or more energy storage devices, such as one or more rechargeable or non-rechargeable batteries. The connections between power source 98 and each of the other components 80, 82, 84, 86 and 88 are to be understood from the general block diagram of FIG. 3 but are not shown for the sake of clarity. For example, power source 98 may be coupled to one or more charging circuits included in therapy delivery circuit 84 for charging holding capacitors included in therapy delivery circuit 84 that are discharged at appropriate times under the control of control circuit 80 for producing electrical pulses according to a therapy protocol. Power source 98 is also coupled to components of cardiac electrical signal sensing circuit 86, such as sense amplifiers, analog-to-digital converters, switching circuitry, etc. as needed.

The circuits shown in FIG. 3 represent functionality included in ICD 14 and may include any discrete and/or integrated electronic circuit components that implement analog and/or digital circuits capable of producing the functions attributed to ICD 14 herein. Functionality associated with one or more circuits may be performed by separate hardware, firmware or software components, or integrated within common hardware, firmware or software components. For example, cardiac electrical signal sensing and analysis for detecting tachyarrhythmia may be performed cooperatively by sensing circuit 86 and control circuit 80 and may include operations implemented in a processor or other signal processing circuitry included in control circuit 80 executing instructions stored in memory 82 and control signals such as blanking and timing intervals and sensing threshold amplitude signals sent from control circuit 80 to sensing circuit 86.

The various circuits of ICD 14 may include an application specific integrated circuit (ASIC), an electronic circuit, a processor (shared, dedicated, or group) and memory that execute one or more software or firmware programs, a combinational logic circuit, state machine, or other suitable components or combinations of components that provide the described functionality. The particular form of software, hardware and/or firmware employed to implement the functionality disclosed herein will be determined primarily by the particular system architecture employed in the ICD and by the particular sensing, detection and therapy delivery methodologies employed by the ICD. Providing software, hardware, and/or firmware to accomplish the described functionality in the context of any modern medical device system, given the disclosure herein, is within the abilities of one of skill in the art.

Memory 82 may include any volatile, non-volatile, magnetic, or electrical non-transitory computer readable storage media, such as random access memory (RAM), read-only memory (ROM), non-volatile RAM (NVRAM), electrically-erasable programmable ROM (EEPROM), flash memory, or any other memory device. Furthermore, memory 82 may include non-transitory computer readable media storing instructions that, when executed by one or more processing circuits, cause control circuit 80 and/or other ICD components to perform various functions attributed to ICD 14 or those ICD components. The non-transitory computer-readable media storing the instructions may include any of the media listed above.

Control circuit 80 communicates, e.g., via a data bus, with therapy delivery circuit 84 and sensing circuit 86 for sensing cardiac electrical event signals, detecting cardiac rhythms, and controlling delivery of cardiac electrical stimulation therapies in response to sensed cardiac signals. Therapy delivery circuit 84 and sensing circuit 86 are electrically coupled to electrodes 24, 26, 28, 30 carried by lead 16 and the housing 15, which may function as a common or ground electrode or as an active can electrode for delivering CV/DF shock pulses or cardiac pacing pulses.

Cardiac electrical signal sensing circuit 86 (also referred to herein as "sensing circuit" 86) may be selectively coupled to electrodes 28, 30 and/or housing 15 in order to monitor electrical activity of the patient's heart. Sensing circuit 86 may additionally be selectively coupled to defibrillation electrodes 24 and/or 26 for use in a sensing electrode vector together or in combination with one or more of electrodes 28, 30 and/or housing 15. Sensing circuit 86 may be enabled to receive cardiac electrical signals from at least two different sensing electrode vectors selected from the available electrodes 24, 26, 28, 30, and housing 15 in some examples. At least three (or more) cardiac electrical signals from three (or more) different sensing electrode vectors may be received simultaneously by sensing circuit 86 in some examples. Sensing circuit 86 may monitor at least one cardiac electrical signal for sensing cardiac event signals, e.g., R-waves attendant to intrinsic ventricular myocardial depolarizations. In some examples, sensing circuit 86 may be configured to monitor two cardiac electrical signals simultaneously for sensing cardiac event signals. A third cardiac electrical signal may be received by sensing circuit 86 and passed to control circuit 80 for processing and analysis for determining when morphology-based criteria for detecting a tachyarrhythmia are met. As described below, a third cardiac electrical signal may be analyzed for verifying the reliability of one of the other two cardiac electrical signals for sensing ventricular event signals for use in detecting tachyarrhythmia intervals and for tachyarrhythmia detection. Sensing circuit 86 may include switching circuitry for selecting which of electrodes 24, 26, 28, 30, and housing 15 are coupled as a first sensing electrode vector to a first sensing channel 83 for receiving a first cardiac electrical signal, which electrodes are coupled as a second sensing electrode vector to a second sensing channel 85 of sensing circuit 86 for receiving a second cardiac electrical signal, and which electrodes are coupled as a third sensing electrode vector to a morphology signal channel 87 for receiving a third cardiac electrical signal.

Each sensing channel 83 and 85 may be configured to amplify, filter and digitize the cardiac electrical signal received from selected electrodes coupled to the respective sensing channel to improve the signal quality for sensing cardiac event signals, such as R-waves. The cardiac event detection circuitry within sensing circuit 86 may include one or more sense amplifiers, filters, rectifiers, threshold detectors, comparators, analog-to-digital converters (ADCs), timers or other analog and/or digital components as described further in conjunction with FIG. 4. A cardiac event sensing threshold may be automatically adjusted by each sensing channel 83 and 85 under the control of control circuit 80, based on sensing threshold control parameters, such as various timing intervals and sensing threshold amplitude values that may be determined by control circuit 80, stored in memory 82, and/or controlled by hardware, firmware and/or software of control circuit 80 and/or sensing circuit 86.

First sensing channel 83 and second sensing channel 85 may each control a cardiac event sensing threshold, e.g., an R-wave sensing threshold, that is applied to the incoming cardiac electrical signal for sensing cardiac event signals, e.g., R-waves. Upon sensing a cardiac event signal based on a sensing threshold crossing, first sensing channel 83 may produce a sensed event signal that is passed to control circuit 80. For example, upon detecting an R-wave sensing threshold crossing by the cardiac electrical signal received via a first sensing electrode vector, the first sensing channel 83 may generate a ventricular sensed event signal that is passed to control circuit 80. Similarly, upon detecting an R-wave sensing threshold crossing by a second cardiac electrical signal received by second sensing channel 85, the second sensing channel 85 may generate a ventricular sensed event signal that is passed to control circuit 80. The first and second sensing channels 83 and 85 may be configured to automatically adjust the R-wave sensing threshold used by each channel separately. The ventricular sensed event signals and relative timing from each other may be used by control circuit 80 for determining sensed event intervals and validating the reliability of the cardiac electrical signal and sensed event intervals determined therefrom for use in detecting tachyarrhythmia according to techniques disclosed herein.

Illustrative techniques disclosed herein are described in conjunction with sensing circuit 86 configured to receive two different cardiac electrical signals by the two cardiac event sensing channels 83 and 85 for sensing R-waves from the two cardiac electrical signals and for receiving a third cardiac electrical signal by morphology signal channel 87 for passing a digitized electrocardiogram (ECG) signal to control circuit 80 for morphology analysis. The three cardiac electrical signals sensed by sensing circuit 86 may be received using three different sensing electrode vectors selected from the available electrodes 24, 26, 28 and 30 and housing 15. However, it is to be understood that cardiac event signal sensing and tachyarrhythmia detection techniques disclosed herein may be implemented using more or fewer cardiac electrical signals. For example, two cardiac electrical signals may be received by sensing circuit 86 from two different sensing electrode vectors, with one signal passed to the first sensing channel 83 and the other signal passed to the second sensing channel 85. Either or both of the two signals may be passed to control circuit 80 as a multi-bit digital ECG signal used by control circuit 80 for morphology analysis for validating the reliability of ventricular sensed event signals received from one or both of the first sensing channel 83 and the second sensing channel 85 for use in tachyarrhythmia detection.

Memory 82 may be configured to store sensed event data for a predetermined number of sensed ventricular events in a circulating buffer under the control of control circuit 80. Control circuit 80 may access the stored sensed event data when reliability verification of a cardiac electrical signal for tachyarrhythmia detection is required. As described below, when a threshold number of ventricular sensed event signals received from sensing circuit 86 occur at (or less than) a tachyarrhythmia detection interval, control circuit 80 may evaluate stored sensed event data for selecting one of the sensing channel cardiac electrical signals for use in detecting tachyarrhythmia.

The ventricular sensed event signals received from sensing circuit 86 by control circuit 80 can be used by control circuit 80 for determining sensed event intervals, which are referred to herein as RR intervals (RRIs). An RRI is the time interval between two ventricular sensed event signals received by control circuit 80 from the same sensing channel 83 or 85, which may also be referred to as an "in-channel" sensed event interval. Control circuit 80 may include a timing circuit 90 for determining RRIs between consecutive ventricular sensed event signals received from a given sensing channel 83 or 85. As described below, control circuit 80 may determine and store in memory 82 sensed event data in response to each ventricular sensed event signal, including an RRI. Based on the stored sensed event data, control circuit 80 may select a reliable cardiac electrical signal for use in detecting VT/VF.

Timing circuit 90 may be configured to control various timers and/or counters used in setting various intervals and windows used in sensing ventricular event signals, determining time intervals between received ventricular sensed event signals, obtaining cardiac signal segments for performing morphology analysis and controlling the timing of cardiac pacing pulses generated by therapy delivery circuit 84. Timing circuit 90 may start a timer in response to receiving a ventricular sensed event signal for timing the RRIs between consecutively received in-channel ventricular sensed event signals. Control circuit 80 may pass the RRI to tachyarrhythmia detection circuit 92 for determining and counting tachyarrhythmia intervals. Timing circuit 90 may additionally apply or set an event match window or timer for determining if a first ventricular sensed event signal received from one sensing channel 83 or 85 is matched in time by a second ventricular sensed event signal received from the other sensing channel 85 or 83. A cross-channel event interval may be determined from a ventricular sensed event signal received from one sensing channel 83 or 85 to a consecutively received ventricular sensed event signal from the other sensing channel 85 or 83, which may be earlier or later than the current ventricular sensed event interval. Based on this cross channel event interval, control circuit 80 may determine if a ventricular sensed event signal from one sensing channel is matched in time to a ventricular sensed event signal from the other sensing channel. As further described below, the determination of a ventricular sensed event signal being matched or unmatched with a ventricular sensed event signal from the other sensing channel may be stored as sensed event data used by control circuit 80 for selecting a reliable cardiac electrical signal for VT/VF detection.

Control circuit 80 may include a tachyarrhythmia detection circuit 92 configured to analyze RRIs received from timing circuit 90 and cardiac electrical signals received from sensing circuit 86 for detecting tachyarrhythmia. Tachyarrhythmia detection circuit 92 may detect tachyarrhythmia based on sensed cardiac electrical signals meeting tachyarrhythmia detection criteria. For example, when a threshold number of ventricular sensed event signals from one sensing channel 83 or 85 each occur at a sensed event interval (e.g., RRI) that is less than a tachyarrhythmia detection interval, control circuit 80 may detect VT/VF. An RRI that is equal to or less than the tachyarrhythmia detection interval is referred to as a "tachyarrhythmia interval." In some examples, a tachyarrhythmia detection based on the threshold number of tachyarrhythmia intervals being reached may be confirmed or rejected based on morphology analysis of a cardiac electrical signal. Tachyarrhythmia detection circuit 92 may be implemented in control circuit 80 as hardware, software and/or firmware that processes and analyzes signals received from sensing circuit 86 for detecting VT and/or VF. Tachyarrhythmia detection circuit 92 may include comparators and counters for counting RRIs determined by timing circuit 90 that fall into various rate detection zones for determining a ventricular rate or performing other rate- or interval-based assessment of ventricular sensed event signals for detecting and discriminating VT and VF.

For example, tachyarrhythmia detector 92 may compare the RRIs determined by timing circuit 90 to one or more tachyarrhythmia detection interval zones, such as a tachycardia detection interval zone and a fibrillation detection interval zone. RRIs falling into a detection interval zone are counted by a respective VT interval counter or VF interval counter and in some cases in a combined VT/VF interval counter. The VF detection interval threshold may be set to 300 to 350 milliseconds (ms), as an example. For instance, if the VF detection interval is set to 320 ms, RRIs that are less than 320 ms are counted by the VF interval counter. When VT detection is enabled, the VT detection interval may be programmed to be in the range of 350 to 420 ms, or 400 ms as an example. RRIs that are less than the VT detection interval but greater than or equal to the VF detection interval may be counted by a VT interval counter. In order to detect VT or VF, the respective VT or VF interval counter is required to reach a threshold "number of intervals to detect" or "NID."

As an example, the NID to detect VT may require that the VT interval counter reaches 18 VT intervals, 24 VT intervals, 32 VT intervals or other selected NID. In some examples, the VT intervals may be required to be consecutive intervals, e.g., 18 out of 18, 24 out of 24, or 32 out of the most recent 32 consecutive RRIs. The NID required to detect VF may be programmed to a threshold number of X VF intervals out of Y consecutive RRIs. For instance, the NID required to detect VF may be 18 VF intervals out of the most recent 24 consecutive RRIs or 30 VF intervals out 40 consecutive RRIs, as examples. When a VT or VF interval counter reaches a respective NID, a ventricular tachyarrhythmia may be detected by tachyarrhythmia detector 92. The NID may be programmable and range from as low as 12 to as high as 40 or as high as 100, with no limitation intended. VT or VF interval counters may reach a respective NID when VT and/or VF intervals are detected consecutively or non-consecutively out of a specified number of most recent RRIs. In some cases, a combined VT/VF interval counter may count both VT and VF intervals and detect a tachyarrhythmia episode based on the fastest intervals detected when a specified NID is reached. In one example, the NID required to be reached by the combined VT/VF interval counter may be higher than the NID required to be reached by the VF interval counter. For example, the NID applied to the combined VT/VF interval count may be 110%, 115%, 120% or any other selected percentage or portion higher than the programmed NID applied to the VF interval counter. To illustrate, if the NID to detect VF is 30 out of 40 RRIs being VF intervals, the combined VT/VF count may be required to reach a combined count of 35 VT/VF intervals in order to detect VT/VF.

Tachyarrhythmia detection circuit 92 may be configured to perform other signal analysis for determining if other detection criteria are satisfied before detecting VT or VF based on an NID being reached, such as R-wave morphology criteria, onset criteria, and noise and oversensing rejection criteria. To support these additional analyses, sensing circuit 86 may pass a digitized ECG signal to control circuit 80, e.g., from morphology signal channel 87, for morphology analysis performed by tachyarrhythmia detection circuit 92 for detecting and discriminating heart rhythms. A cardiac electrical signal received by the morphology signal channel 87 (and/or sensing channel 83 and/or sensing channel 85) may be passed through a filter and amplifier, provided to a multiplexer and thereafter converted to a multi-bit digital signal by an analog-to-digital converter, all included in sensing circuit 86 in some examples, for storage in memory 82. Memory 82 may include one or more circulating buffers to temporarily store digital cardiac electrical signal segments for analysis performed by control circuit 80. Control circuit 80 may be a microprocessor-based controller that employs digital signal analysis techniques to characterize the digitized signals stored in memory 82 to recognize and classify the patient's heart rhythm employing any of numerous signal processing methodologies for analyzing cardiac signals and cardiac event waveforms, e.g., R-waves.

Therapy delivery circuit 84 includes at least one charging circuit 94, including one or more charge storage devices such as one or more high voltage capacitors for generating high voltage shock pulses for treating VT/VF. Charging circuit 94 may include one or more low voltage capacitors for generating relatively lower voltage pulses, e.g., for cardiac pacing therapies. Therapy delivery circuit 84 may include switching circuitry 95 that controls when the charge storage device(s) are discharged through an output circuit 96 across a selected pacing electrode vector or CV/DF shock vector.

In response to detecting VT or VF, control circuit 80 may schedule a therapy and control therapy delivery circuit 84 to generate and deliver the therapy, such as ATP and/or CV/DF shocks. Therapy can be generated by initiating charging of high voltage capacitors of charging circuit 94. Charging is controlled by control circuit 80 which monitors the voltage on the high voltage capacitors, which is passed to control circuit 80 via a charging control line. When the voltage reaches a predetermined value set by control circuit 80, a logic signal is generated on a capacitor full line and passed to therapy delivery circuit 84, terminating charging. A CV/DF pulse is delivered to the heart under the control of the timing circuit 90 by an output circuit 96 of therapy delivery circuit 84 via a control bus. The output circuit 96 may include an output capacitor through which the charged high voltage capacitor is discharged via switching circuitry, e.g., an H-bridge, which determines the electrodes used for delivering the cardioversion or defibrillation pulse and the pulse wave shape.

In some examples, the high voltage therapy circuit configured to deliver CV/DF shock pulses can be controlled by control circuit 80 to deliver pacing pulses, e.g., for delivering ATP, post shock pacing pulses or bradycardia pacing pulses. In other examples, therapy delivery circuit 84 may include a low voltage therapy circuit including one or more separate or shared charging circuits, switch circuits and output circuits for generating and delivering relatively lower voltage pacing pulses for a variety of pacing needs. Charging of capacitors to a programmed pulse amplitude and discharging of the capacitors for a programmed pulse width may be performed by therapy delivery circuit 84 according to control signals received from control circuit 80 for delivering cardiac pacing pulses. As described above, timing circuit 90 may include various timers or counters that control when cardiac pacing pulses are delivered. The microprocessor of control circuit 80 may set the amplitude, pulse width, polarity or other characteristics of cardiac pacing pulses, which may be based on programmed values stored in memory 82.

Control parameters utilized by control circuit 80 for sensing cardiac event signals, detecting arrhythmias, and controlling therapy delivery may be programmed into memory 82 via telemetry circuit 88. Telemetry circuit 88 includes a transceiver and antenna for communicating with external device 40 (shown in FIG. 1A) using RF communication or other communication protocols as described above. Under the control of control circuit 80, telemetry circuit 88 may receive downlink telemetry from and send uplink telemetry to external device 40.

Figure 4:
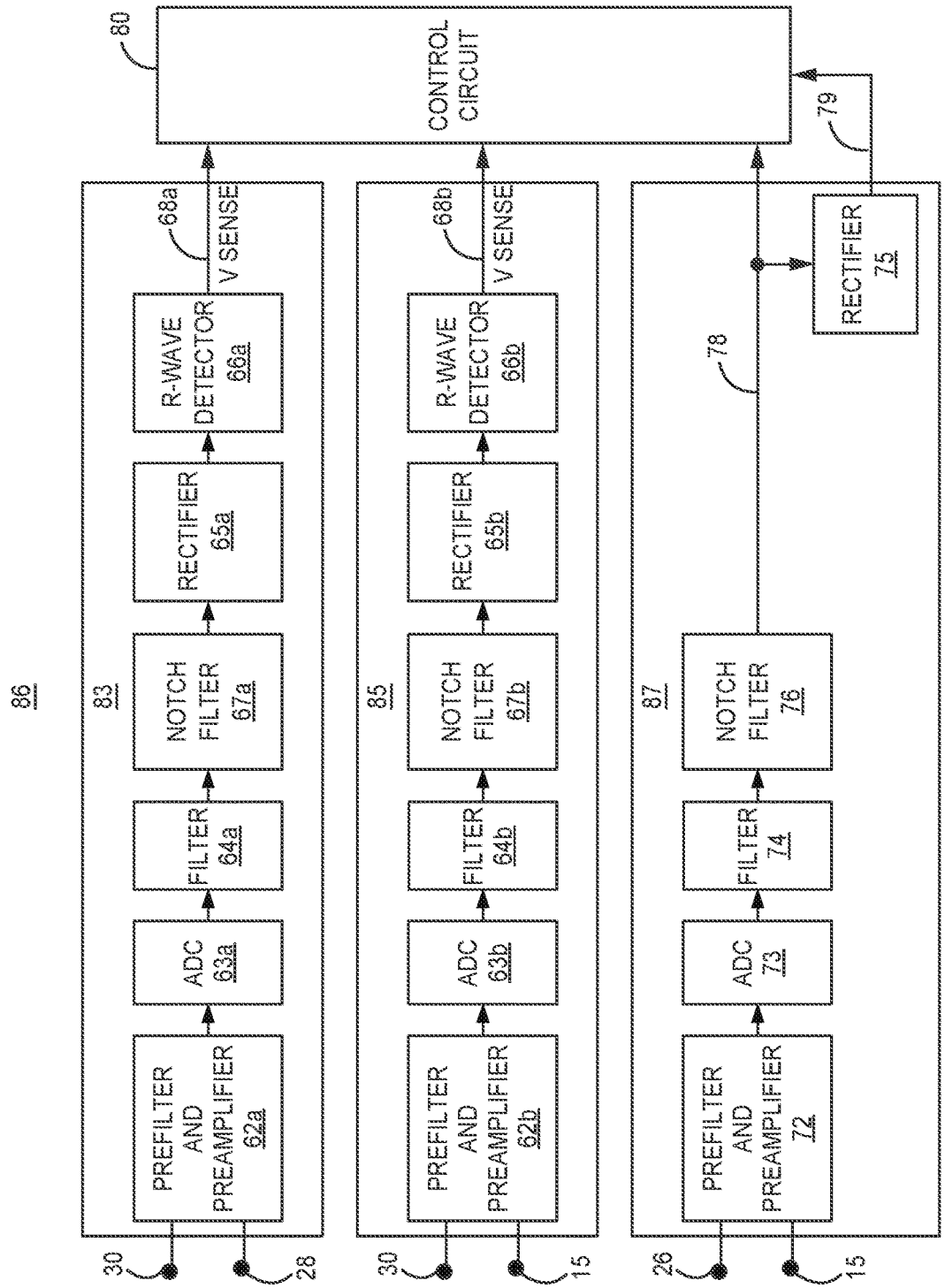
FIG. 4 is a conceptual diagram of circuitry that may be included in the sensing circuit of the ICD shown in FIG. 3 according to one example.

FIG. 4 is a conceptual diagram of circuitry that may be included in sensing circuit 86 shown in FIG. 3 according to one example. Sensing circuit 86 may include a first sensing channel 83, second sensing channel 85 and morphology signal channel 87 according to one example. First sensing channel 83 and second sensing channel 85 may each be selectively coupled via switching circuitry included in sensing circuit 86 to a respective sensing electrode vector including at least one electrode carried by extra-cardiovascular lead 16. First sensing channel 83 may be coupled to a first sensing electrode vector for receiving a first cardiac electrical signal, and second sensing channel 85 may be coupled to a second sensing electrode vector, different than the first sensing electrode vector for receiving a second cardiac electrical signal, different than the first cardiac electrical signal. In some examples, first sensing channel 83 may be coupled to a sensing electrode vector that is a short bipole, having a relatively shorter inter-electrode distance than the sensing electrode vector coupled to the second sensing channel 85 or to morphology signal channel 87. In the example shown, the first sensing channel 83 is coupled to pace/sense electrodes 28 and 30 carried by lead 16. In some examples, first sensing channel 83 may be coupled to a sensing electrode vector that is approximately vertical (when the patient is in an upright position) or approximately aligned with the cardiac axis to increase the likelihood of a relatively high R-wave signal amplitude relative to the P-wave signal amplitude.

The second sensing channel 85 may be coupled to a second sensing electrode vector that is a short bipole or a relatively longer bipole compared to the first sensing electrode vector. The second sensing electrode vector may also be generally vertical or aligned with the cardiac axis. However, the second sensing electrode vector may be orthogonal or transverse relative to the first sensing electrode vector in other examples. In the example shown, the second sensing channel 85 is coupled to pace/sense electrode 30 and housing 15 such that it is a relatively longer bipole that is substantially transverse to the sensing electrode vector coupled to the first sensing channel 83. In other examples, the first or second sensing channels may be coupled to either of pace/sense electrodes 28 or 30 paired with housing 15, either of pace/sense electrodes 28 or 30 paired with coil electrode 24, or either of pace sense electrodes 28 or 30 paired with coil electrode 26, as long as at least one electrode is different between the two sensing electrode vectors. In further examples, either or both of first or second sensing channels 83 or 85 may be coupled to a sensing electrode vector that does not necessarily include one of pace/sense electrodes 28 or 30. For example, a sensing electrode vector may be coupled to sensing channel 83 or sensing channel 85 that includes one or both of coil electrodes 24 or 26 and/or housing 15.

Sensing circuit 86 may include a morphology signal channel 87 for sensing a third cardiac electrical signal in some examples. For instance, morphology signal channel 87 may receive a raw cardiac electrical signal from a third sensing electrode vector, for example from a vector that includes one electrode 24, 26, 28 or 30 carried by lead 16 paired with housing 15. Morphology signal channel 87 may be selectively coupled to a relatively long bipole having an inter-electrode distance or spacing that is greater than the sensing electrode vector coupled to first sensing channel 83 or second sensing channel 85 in some examples. The third sensing electrode vector may be, but not necessarily, approximately orthogonal to at least one of the first channel sensing electrode vector or the second channel sensing electrode vector. In the example shown, coil electrode 26 and housing 15 may be coupled to morphology signal channel 85 to provide the third sensed cardiac electrical signal. The third cardiac electrical signal received by morphology signal channel 87 may be used by control circuit 80 for morphology analysis to determine when morphology-based tachyarrhythmia detection criteria are met. In some examples, the sensing electrode vector coupled to morphology signal channel 87 may provide a relatively far-field or more global cardiac signal compared to a relatively shorter bipole that may be coupled to the first sensing channel 83 or the second sensing channel 85. In other examples, any vector selected from the available electrodes, e.g., electrodes 24, 26, 28, 30 and/or housing 15, may be included in a sensing electrode vector coupled to morphology signal channel 87. The sensing electrode vectors coupled to first sensing channel 83, second sensing channel 85 and morphology signal channel 87 may be different sensing electrode vectors, which may have no common electrodes or only one common electrode but not both. In other examples, however, the sensing electrode vector coupled to one of the first sensing channel 83 or the second sensing channel 85 may be the same sensing electrode vector coupled to the morphology signal channel 87. In this case, a sensing channel 83 or 85 and the morphology signal channel 87 may be combined or include shared components such that a morphology signal and ventricular sensed event signals may be output to control circuit 80 from one sensing channel.

The first sensing channel 83 and the second sensing channel 85 may each receive a cardiac electrical signal for sensing ventricular event signals in response to the cardiac electrical signal crossing an R-wave sensing threshold. The morphology signal channel 87 may receive a third cardiac electrical signal for passing a multi-bit digital ECG signal to control circuit 80 for morphology analysis. In the illustrative example shown in FIG. 4, the signals received by first sensing channel 83, second sensing channel 85 and morphology signal channel 87 are provided as differential input signals to a pre-filter and pre-amplifier 62a, 62b, and 72, respectively. Non-physiological high frequency and DC signals may be filtered by a low pass or bandpass filter included in each of pre-filter and pre-amplifiers 62a, 62b and 72, and high voltage signals may be removed by protection diodes included in pre-filter and pre-amplifiers 62a, 62b and 72. Pre-filter and pre-amplifiers 62a, 62b and 72 may amplify the pre-filtered signal by a gain of between 10 and 100, and in one example a gain of 17, though each channel may have a different gain and filter bandwidth. Pre-filter and pre-amplifiers 62a, 62b and 72 may convert the differential input signal to a single-ended output signal passed to an analog-to-digital converter (ADC) 63a, 63b, and 73, respectively. Pre-filter and pre-amplifiers 62a, 62b and 72 may provide anti-alias filtering and noise reduction prior to digitization.

ADC 63a, ADC 63b and ADC 73, respectively, convert the first cardiac electrical signal, second cardiac electrical signal and third cardiac electrical signal from an analog signal to a digital bit stream, which may be sampled at 128 or 256 Hz, as examples. ADC 63a, ADC 63b and ADC 73 may be sigma-delta converters (SDC), but other types of ADCs may be used. In some examples, the outputs of ADC 63a, ADC 63b and ADC 73 may be provided to decimators (not shown), which function as digital low-pass filters that increase the resolution and reduce the sampling rate of the respective cardiac electrical signals.

The digital outputs of ADC 63a, ADC 63b and ADC 73 are each passed to respective filters 64a, 64b and 74, which may be digital bandpass filters. The bandpass filters 64a, 64b and 74 may have the same or different bandpass frequencies. For example, filters 64a and 64b may have a bandpass of approximately 13 Hz to 39 Hz for passing cardiac electrical signals such as R-waves typically occurring in this frequency range. Filters 64a and 64b may additionally include a notch filter to filter 50 Hz or 60 Hz line noise. Filter 74 of the morphology signal channel 87 may have a relatively wider bandpass of approximately 2.5 to 100 Hz. In some examples, each of sensing channel 83, sensing channel 85 and morphology signal channel 87 may further include a notch filter 67a, 67b, and 76, respectively, to filter 50 Hz and 60 Hz noise signals.

The narrow bandpass and notch-filtered signal in first sensing channel 83 and second sensing channel 85 is passed from respective filter 64a or filter 64b to rectifier 65a or rectifier 65b to produce a filtered, rectified signal output to respective R-wave detectors 66a and 66b. First sensing channel 83 includes an R-wave detector 66a for sensing ventricular event signals in response to the first cardiac electrical signal crossing an R-wave sensing threshold. Second sensing channel 85 includes an R-wave detector 66b for sensing ventricular event signals in response to the second cardiac electrical signal crossing an R-wave sensing threshold, which may be controlled separately from the R-wave sensing threshold controlled by R-wave detector 66a. R-wave detectors 66a and 66b may each include an auto-adjusting sense amplifier, comparator and/or other detection circuitry that compares the incoming filtered and rectified cardiac electrical signal to an R-wave sensing threshold and produces a ventricular sensed event signal 68a or 68b when the respective first or second cardiac electrical signal crosses the respective R-wave sensing threshold outside of a post-sense blanking interval.

The R-wave sensing threshold may be a multi-level sensing threshold, e.g., as disclosed in commonly assigned U.S. Pat. No. 10,252,071 (Cao, et al.), incorporated herein by reference in its entirety. Example multi-level sensing thresholds are described in conjunction with FIG. 7 below. Briefly, the multi-level sensing threshold may have a starting sensing threshold value held for a first drop time interval, which may be equal to a tachycardia detection interval or an expected R-wave to T-wave interval, then drops to a second sensing threshold value held until a second drop time interval expires, which may be 1 to 2.5 seconds long and can be 2.15 seconds (from the ventricular sensed event signal) in one example. The drop to the second sensing threshold may be a direct drop made in a one-step decrement or may be multiple steps or a decaying drop. After the second drop time interval, the sensing threshold drops to a minimum sensing threshold, which may be equal to a programmed sensitivity and is also referred to herein as the "sensing floor" because it represents the minimum amplitude of the cardiac electrical signal that may be sensed as a ventricular event. The drop to the minimum sensing threshold may be a direct drop made in a one-step decrement or may be multiple steps or a decaying drop. The R-wave sensing thresholds used by R-wave detector 66*a* and 66*b* may each be set to a starting value based on a maximum peak amplitude of the respective first or second cardiac electrical signal determined by the R-wave detector 66*a* or 66*b* during the most recent post-sense blanking interval. In some examples, an R-wave peak tracking period may be defined as a portion of the post-sense blanking period during which the maximum peak amplitude is determined. The starting R-wave sensing threshold of each sensing channel 83 and 85 may decrease over time according to one or more stepwise drops and/or linear or non-linear decay rates until reaching the minimum sensing threshold (or until an R-wave sensing threshold crossing by the cardiac electrical signal occurs).

The techniques described herein are not limited to a specific behavior of the sensing threshold or specific R-wave sensing techniques. Instead, other decaying, stepwise adjusted or other automatically adjusted sensing thresholds may be utilized for sensing ventricular event signals from the respective first and second cardiac electrical signals. R-wave detector 66*a* or 66*b* may produce a ventricular sensed event signal 68*a* or 68*b* in response to the respective first cardiac electrical signal or second cardiac electrical signal crossing the R-wave sensing threshold. The ventricular sensed event signal 68*a* or 68*b* is passed to control circuit 80. As described below, control circuit 80 may verify the reliability of a sensing channel 83 or 85 based on analysis of sensed event data determined for associated ventricular sensed event signals received from the given sensing channel. Control circuit 80 may verify the reliability of a cardiac electrical signal received by a sensing channel 83 or 85 when one sensing channel 83 or 85 generates ventricular sensed event signals that result in an NID being reached. A sensing channel, or the cardiac electrical signal sensed by the sensing channel, that is verified as being reliable may be selected by control circuit 80 for cardiac electrical signal processing and analysis for tachyarrhythmia detection as described below.

Referring to morphology signal channel 87, the wideband-filtered, digital cardiac electrical signal 78 output from morphology signal channel 87 may be passed to control circuit 80. In some examples, the digital cardiac electrical signal 78 is passed to rectifier 75 and a rectified wideband filtered signal 79 is passed to control circuit 80 for processing and analysis. In some cases, both the filtered, non-rectified signal 78 and the rectified signal 79 are passed to control circuit 80 from morphology signal channel 87 for use in determining morphology features of the ECG signal. As described below, an ECG signal segment may be buffered in memory 82 by control circuit 80 in response to a sensed event signal received from one of sensing channels 83 or 85 that has been verified as a reliable sensing channel. The ECG signal segment may extend over a time interval, e.g., 300 to 500 ms, that encompasses the time point of a ventricular sensed event signal produced by the selected sensing channel 83 or 85 so that the ECG signal segment includes a signal corresponding to the signal that was sensed by one of the sensing channels 83 or 85. The ECG signal segment may be analyzed by control circuit 80 for determining when various morphology-based rejection rules are met, such as a noise rejection rule, beat-based morphology rejection rule, gross-morphology rejection rule, or an over-sensing rejection rule. Examples of morphology analysis that may be performed in conjunction with the techniques disclosed herein for rejecting or withholding a VT/VF detection when an NID is reached based on RRIs are generally disclosed in U.S. Pat. No. 9,956,423 (Zhang, et al.), U.S. Pat. No. 10,470,681 (Greenhut, et al.), U.S. Pat. No. 10,507,332 (Zhang, et al.), U.S. Pat. No. 10,555,684 (Zhang et al.), U.S. Pat. No. 10,561,332 (Zhang, et al.), and U.S. Pat. No. 10,850,113 (Cao, et al.), all of which are incorporated herein by reference in their entirety.

The configurations of sensing channels 83 and 85 and morphology signal channel 87 as shown in FIG. 4 are illustrative in nature and should not be considered limiting of the techniques described herein. Sensing circuit 86 may include more or fewer components than illustrated and described in FIG. 4 and some components may be shared between sensing channels 83 and 85 and morphology signal channel 87. For example, a common cardiac electrical signal from a selected sensing electrode vector may be received by a prefilter and preamplifier circuit and ADC and subsequently be passed to a narrowband filter in one of sensing channels 83 or 85 and to a wideband filter in morphology signal channel 87. In other examples, sensing circuit 86 may include more than two sensing channels, each configured to produce a ventricular sensed event signal, and/or more than one morphology signal channel. Furthermore, the components for filtering, amplifying, digitizing, rectifying, etc. may be arranged in a different order or combination than shown in FIG. 4.

Figure 5:
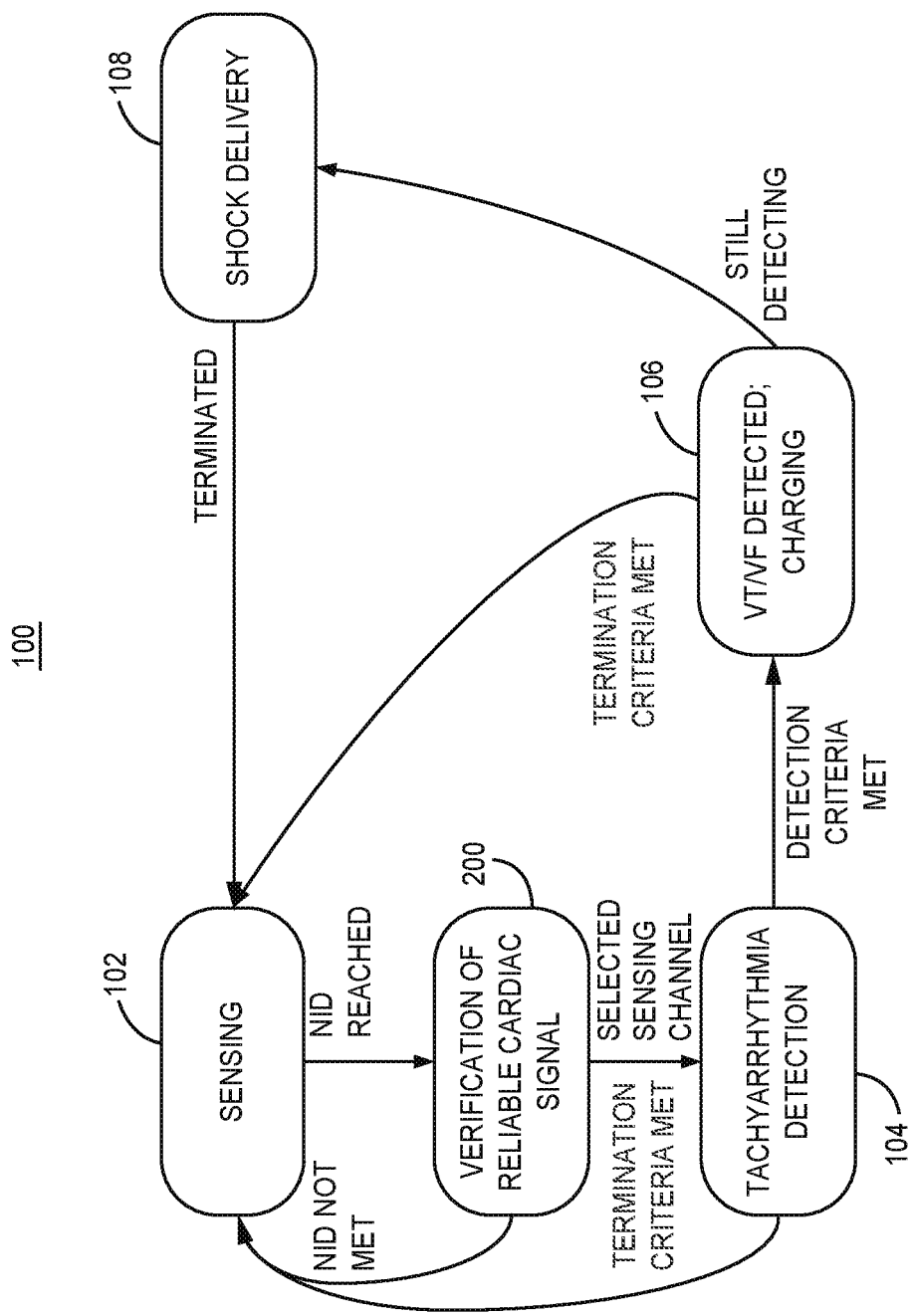
FIG. 5 is a conceptual diagram of tachyarrhythmia detection operating states of an ICD according to one example.

FIG. 5 is a conceptual diagram 100 of tachyarrhythmia detection operating states of ICD 14 according to one example. ICD 14 initially operates in a sensing state at block 102 during which sensing circuit 86 generates ventricular sensed event signals from each sensing channel 83 and 85 in response to R-wave sensing threshold crossings. In response to each ventricular sensed event signal, control circuit 80 may determine sensed event data that is stored in a buffer in memory 82.

For example, control circuit 80 determines RRIs (in-channel sensed event intervals) between consecutively received ventricular sensed event signals from each sensing channel 83 and 85. The RRIs may be stored in a first-in-first-out buffer in memory 82 for each respective sensing channel 83 and 85. For each respective sensing channel 83 and 85, control circuit 80 may update a VT interval counter and a VF interval counter, and in some examples a combined VT/VF interval counter, in response to each RRI for tracking the counts of VT intervals and VF intervals associated with each respective sensing channel 83 and 85. Control circuit 80 remains in the sensing state of block 102, until one of the VT or VF interval counters or the combined VT/VF interval counter has reached a threshold, such as a respective NID. The sensing state of block 102 may be referred to as an "unconcerned" state because the ventricular rate associated with the ventricular sensed event signals being received from sensing circuit 86 is less than a threshold rate (corresponding to VT or VF detection intervals) such that a tachyarrhythmia is unlikely to be occurring.

When a VT or VF interval counter (or combined VT/VF interval count) for either (or both) of the sensing channels 83 or 85 reaches a predetermined threshold, which may be the NID programmed for detecting VT or VF, control circuit 80 may transition to block 200 to verify the reliability of a sensing channel 83 or 85 for use in tachyarrhythmia detection. In various examples, when control circuit 80 determines that the ventricular rate corresponding to RRIs determined from a given sensing channel 83 or 85 is greater than a threshold rate, control circuit 80 may transition to the verification state 200 to verify a reliable sensing channel (and corresponding sensed cardiac electrical signal). In the example shown, detection of the threshold rate that causes transition from the sensing state at block 102 to sensing channel verification at block 200 may be based on an NID being reached by at least one sensing channel. In other examples, a different threshold number of tachyarrhythmia intervals that is less than the NID may cause control circuit 80 to transition to the verification state of block 200.

During the verification state, control circuit 80 analyzes accumulated sensed event data (which may be stored in memory 82) associated with the sensed event signals received from one or both sensing channels for verifying the reliability of a cardiac electrical signal sensed by one of the sensing channels 83 or 85 for use in tachyarrhythmia detection. A sensing channel 83 or 85 that is verified as generating reliable ventricular sensed event signals may be selected by control circuit 80 as the sensing channel that is used in performing tachyarrhythmia detection algorithms in the tachyarrhythmia detection state at block 104. It is to be understood that when a sensing channel 83 or 85 is selected, it is the cardiac electrical signal received by the sensing electrode vector coupled to the sensing channel, that is being selected for tachyarrhythmia detection. Accordingly, "selecting a sensing channel" as used herein also refers to "selecting a cardiac electrical signal" that is sensed by the sensing channel and/or "selecting a sensing electrode vector" that is coupled to the sensing channel that has provided input to control circuit 80 determined to be reliable for tachyarrhythmia detection.

In the verification state of block 200, ventricular sensed event signals may continue to be generated by both sensing channels 83 and 85 to continue to accumulate sensed event data in buffers in memory 82, including RRIs, updating VT and VF interval counters and for other purposes such as resetting pacing escape intervals for bradycardia pacing. However, control circuit 80 may select one sensing channel 83 or 85 from which generated sensed event signals are used for determining RRIs and triggering storage of ECG signal segments from the morphology signal channel 87 that are analyzed according to the tachyarrhythmia detection algorithm.

As described below, control circuit 80 may perform analysis of the sensed event data at block 200 in response to an NID being met by ventricular sensed event signals received from only one of the two sensing channels 83 or 85. When both sensing channels 83 and 85 have reached an NID, that is when both sensing channels have produced ventricular sensed event signals that result in the NID being reached concurrently from both sensing channels, control circuit 80 may advance directly to the tachyarrhythmia detection state at block 104 to perform further cardiac signal analysis and processing for detecting VT/VF. Control circuit 80 may select a default sensing channel, either sensing channel 83 or 85, or the sensing channel 83 or 85 that was most recently selected for providing input for tachyarrhythmia detection. The cardiac electrical signals sensed by sensing channels 83 and 85 may both be considered reliable when a VT or VF interval counter reaches an NID for both sensing channels. It is to be understood that when each sensing channel 83 and 85 reach an NID concurrently, there may be a slight time lag between each NID being reached by the two sensing channels due to slight differences in sensed event signal times. The concurrent NIDs being reached, however, may occur within one RRI of each other, for example. When an NID is reached by both sensing channels 83 and 85, the VT/VF interval count may be deemed valid by control circuit 80. When a single sensing channel 83 or 85 reaches an NID, control circuit 80 may transition to block 200 before advancing to the tachyarrhythmia detection state at block 104. Control circuit 80 performs an analysis of sensed event data for one or both channels for selecting a sensing channel 83 or 85 that is reliable for providing input for tachyarrhythmia detection during the tachyarrhythmia detection state of block 104.

In some cases, the result of that analysis is that the sensing channel that did not reach NID is the reliable sensing channel. The sensing channel that did reach the NID may be oversensing such that the ventricular sensed event intervals that caused the NID to be reached may be invalid. In that case, since the NID is not met by the selected sensing channel, control circuit 80 may return to the "unconcerned" sensing state 102 from the verification state of block 200. Control circuit 80 relies on and uses the lower VT and VF interval counter values associated with the selected sensing channel as input for VT/VF detection in this case. Because those counters have not reached an NID, control circuit 80 may return to the "unconcerned" sensing state of block 102, or remain in the verification state of block 200, but does not advance to the tachyarrhythmia detection state of block 106. Control circuit 80 may continue determining RRIs for counting VT/VF intervals and determining sensed event data for both sensing channels 83 and 85 after returning to the sensing state of block 102 and advance to the verification state of block 200 when either one of the sensing channels 83 or 85 again reaches an NID, which could be as early as the next RRI. In some examples, control circuit 80 may remain in the verification state of block 200 as long as a VT or VF interval counter (or combined VT/VF interval counter) for the non-selected sensing channel meets a respective NID, but the VT and VF interval counters for the selected sensing channel do not meet a respective NID.

The tachyarrhythmia detection state of block 104 may be referred to as a "concerned" state because a fast ventricular rate has been detected as possible evidence of VT/VF that warrants further cardiac signal analysis for detecting VT/VF. During the tachyarrhythmia detection state, control circuit 80 executes the tachyarrhythmia detection algorithm for detecting a shockable VT or VF episode. A "shockable" rhythm is a fast ventricular tachyarrhythmia that is expected to be treatable, e.g., terminated, by delivering a CV/DF shock and may be VT or VF. A non-shockable rhythm may be sinus tachycardia or a supraventricular tachyarrhythmia that originates in the atria, for example, and is conducted to the ventricles, such as rapid atrial fibrillation. When the VT/VF interval count reaches an NID based on RRIs determined from ventricular sensed event signals received from the selected sensing channel 83 or 85, a VT or VF rhythm may be occurring that warrants delivery of a CV/DF shock. As such, control circuit 80 may perform various analyses for detecting a shockable VT/VF by analyzing the morphology of ECG signal segments, which may be relatively short segments, that are each buffered in response to a ventricular sensed event signal received from the selected sensing channel identified as reliable for tachyarrhythmia detection. The ECG signal segments are buffered over a time segment that encompasses the time of one ventricular sensed event signal. The morphology analysis of the ECG signal segments, which may be 180 milliseconds (ms) to 300 ms in duration, as examples, may be referred to as "beat-based" morphology analysis because the analysis is intended to determine if a sensed event signal occurring during the ECG signal segment represents a sinus R-wave or a non-sinus R-wave or a noise signal, for example. In one example, control circuit 80 may perform morphology template matching using a 188 ms ECG signal segment stored in response to receiving a ventricular sensed event signal received from the selected sensing channel. The ECG signal segment may be used by control circuit 80 for determining a morphology matching score between an unknown sensed event signal and a known R-wave template. Control circuit 80 may additionally or alternatively perform morphology analysis using a 360 ms ECG signal segment that is stored in response to a ventricular sensed event signal from the selected sensing channel for determining other morphology features used in detecting VT/VF. Examples of other morphology features that may be determined are described below and may be used for determining if a VT/VF rejection rule is met. Various VT/VF rejection rules may be met when the morphology analysis indicates that the rhythm is likely a supraventricular rhythm or that oversensing of noise or T-waves is occurring, as examples.

If the morphology criteria required for detecting VT/VF are not met, which may include determining that one or more rejection rules are met, control circuit 80 may withhold detecting a shockable rhythm when an NID is met. Various interval counters may be updated according to each new RRI determined from the ventricular sensed event signals received from the selected sensing channel. As long as the NID continues to be met or less than a threshold number of non-VT/VF intervals are detected, control circuit 80 may remain in the tachyarrhythmia detection state of block 104 for making an initial VT/VF detection if VT/VF detection criteria become satisfied.

In some examples, control circuit 80 may determine if termination criteria are met for detecting a spontaneous termination of the fast ventricular rhythm prior to VT/VF detection. For example, if control circuit 80 detects a threshold number of ventricular event intervals, sensed or paced, that are greater than or equal to the VT detection interval (when VT detection is enabled) and/or the VF detection interval (e.g., when VT detection is disabled), after the NID is reached but before VT/VF morphology-related criteria are met (e.g., no rejection rules met), control circuit 80 may detect termination of the fast ventricular rhythm and return to the "unconcerned" sensing state at block 102. Control circuit 80 may not detect VT/VF after the NID is reached by the selected sensing channel if non-VT/VF intervals, e.g., at least three, four, six, eight or other specified number of consecutive non-VT/VF intervals, are detected before morphology criteria for detecting VT/VF are met.

In another example, if a mean, median or other representative metric of the most recent predetermined number of ventricular sensed event intervals is longer than the VT detection interval and/or VF detection interval for a predetermined termination time interval, control circuit 80 may determine termination of the fast ventricular rhythm. Control circuit 80 may return to the "unconcerned" sensing state at block 102 without detecting VT/VF and without delivering a therapy. In an illustrative example, if the median ventricular event interval determined from the most recent twelve ventricular event intervals (including sensed and/or paced intervals) is consistently greater than or equal to the VT detection interval for the most recent 20 seconds, control circuit 80 may return to the "unconcerned" sensing state at block 102 without detecting VT/VF.

In still other examples, control circuit 80 may determine that termination criteria are met during the "concerned" tachyarrhythmia detection state at block 104 when a VT or VF interval counter reset condition is met. Control circuit 80 may be configured to identify normal sinus rhythm (NSR) events during the "concerned" tachyarrhythmia detection state of block 104. NSR events may be identified based on detecting an RRI as an NSR interval and/or determining that the sensed event signal morphology matches an NSR morphology. The reset condition may require that at least X of Y ventricular events sensed by the selected sensing channel are NSR events. In some examples the reset condition may additionally require that at least one (or other threshold number of) the detected NSR events occurs within the most recent two or other predetermined number of consecutively sensed event signals. The reset condition may be determined to be met based on an analysis of RRIs and/or morphology matching scores determined from the cardiac electrical signals sensed from the selected sensing channel. Examples of VT/VF interval counter reset conditions that may be applied during the tachyarrhythmia detection state of block 104 and during the charging state of block 106 that can be implemented in conjunction with the techniques disclosed herein are generally disclosed in U.S. Publication No. 2021/0138243 (Zhang, et al.), incorporated herein by reference in its entirety.

When the NID from the selected sensing channel 83 or 85 and the morphology criteria are met (e.g., no rejection rules met) for detecting a shockable VT/VF rhythm, control circuit 80 detects the shockable rhythm at block 104 and transitions to the charging state at block 106. During the charging state, control circuit 80 controls therapy delivery circuit 84 to charge high voltage capacitors to prepare for shock delivery. Control circuit 80 may control therapy delivery circuit 84 to deliver ATP during or before charging in some examples to attempt to terminate the shockable rhythm and avoid delivering a CV/DF shock. During the charging state of block 106, control circuit 80 continues to perform cardiac signal analysis, using input from the selected sensing channel 83 or 85, in order to determine if the VT/VF episode spontaneously terminates before a shock is delivered. Control circuit 80 may determine if termination criteria are met during the capacitor charging state of block 106, before advancing to the shock delivery state of block 108. Any of the termination criteria described above in conjunction with block 104 may be applied to detect termination of the fast ventricular rhythm during capacitor charging, for example.

When capacitor charging is completed and the shockable VT/VF episode is still being detected (e.g., termination criteria not met), control circuit 80 transitions to the shock delivery state at block 108. Therapy delivery circuit 84 delivers the CV/DF shock. Control circuit 80 may determine if redetection criteria are satisfied following shock delivery and deliver additional shocks as needed until VT/VF is no longer detected. One or more post-shock pacing pulses may be delivered by therapy delivery circuit 84 in the absence of a ventricular sensed event signal received from sensing circuit 86 following shock delivery. When the VT/VF is terminated and not redetected, control circuit 80 returns to the sensing state at block 102 to receive ventricular sensed event signals from sensing circuit 86, including storing associated sensed event data for use the next time the NID (or other threshold number of VT/VF detection intervals) is reached to cause transition to the verification state at block 200.

Figure 6:
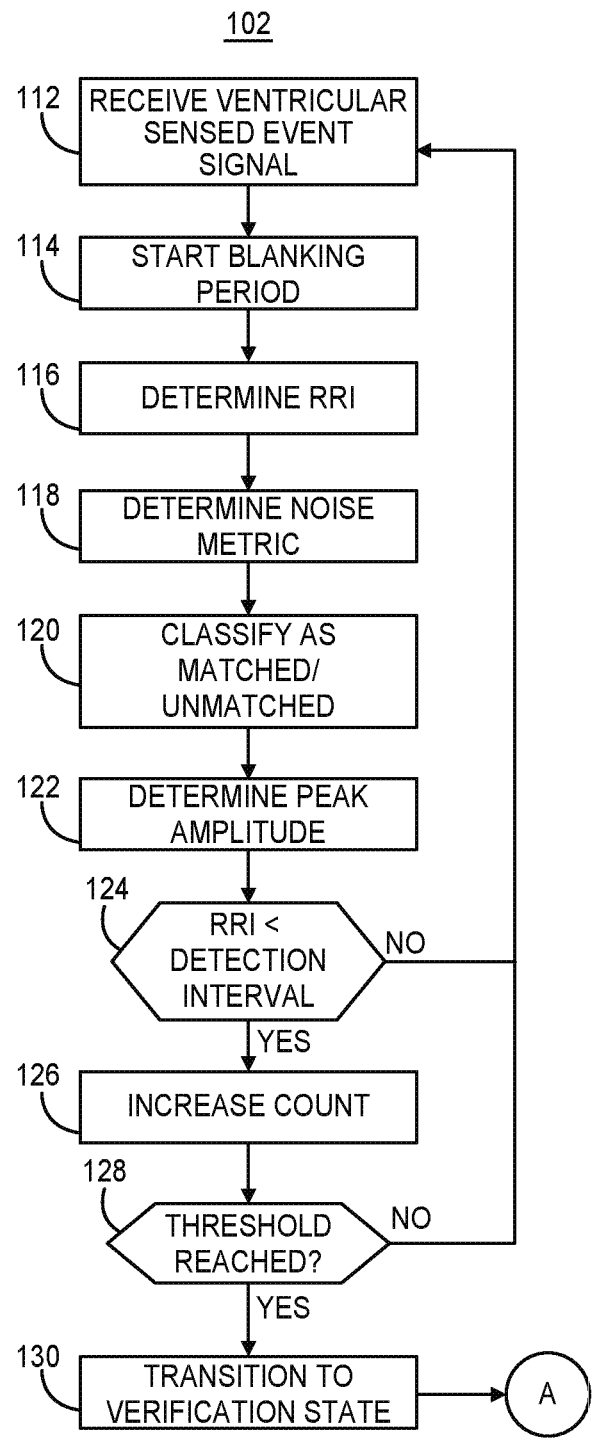
FIG. 6 is a flow chart of a method that may be performed by an ICD during the "unconcerned" sensing state of FIG. 5.

FIG. 6 is a flow chart 102 of a method that may be performed by ICD 14 during the sensing or "unconcerned" state of identically numbered block 102 of FIG. 5. At block 112, control circuit 80 receives a ventricular sensed event signal from sensing circuit 86, from either of sensing channel 83 or sensing channel 85. In response to the ventricular sensed event signal, sensing circuit 86 starts an in-channel blanking period at block 114 that is applied to the received cardiac electrical signal, e.g., to avoid sensing the same signal twice. Control circuit 80 determines an RRI at block 116 as the time interval from the currently received ventricular sensed event signal to the most recent preceding ventricular sensed event signal received from the same sensing channel 83 or 85. The RRI, also referred to herein as a "ventricular sensed event interval," may be buffered in memory 82.

At block 118, control circuit 80 may determine a noise metric from the cardiac electrical signal received by the sensing circuit 83 or 85 that generated the ventricular sensed event signal. The noise metric may be determined by counting a number of signal peaks, zero crossings, determining a mean amplitude, mean slope or other feature of the cardiac electrical signal during the blanking period or another portion of the cardiac signal. One example method for determining a noise metric is described below in conjunction with FIG. 8. The noise metric may be buffered in memory 82 in association with the RRI stored at block 116. In other examples, the noise metric may be compared to a threshold value or range for identifying the sensed event signal as a noisy event. The classification of a noisy or non-noisy event may be buffered in memory 82 at block 118 in association with the RRI stored at block 116 as sensed event data corresponding to the received ventricular sensed event signal.

At block 120, control circuit 80 determines if the ventricular sensed event signal is a matched or unmatched event signal. The ventricular sensed event signal is a matched signal when control circuit 80 receives a ventricular sensed event signal from the other sensing channel 85 or 83 within a predetermined (e.g., preprogrammed) time window of the ventricular sensed event signal received at block 112. In one example, the ventricular sensed event signal received at block 112, e.g., from sensing channel 83, is a matched event signal when it is preceded or followed by a second ventricular sensed event signal received from the other sensing channel, e.g., sensing channel 85, within an 80 ms matching time window (e.g., a 160 ms total time window extending 80 ms earlier and 80 ms later than the current ventricular sensed event signal). Control circuit 80 may determine the cross-channel sensed event interval extending from a current sensed event signal to a preceding sensed event signal received from the other sensing channel. Additionally or alternatively, control circuit 80 may determine the cross-channel sensed event interval extending from the current sensed event signal to a succeeding sensed event signal received from the other sensing channel. The cross channel sensed event interval(s) may be compared to the matching time window, ±80 ms as an example. In some examples, shorter or longer time windows may be used (e.g., 30 to 100 ms). When the cross-channel sensed event interval is within the matching time window, before or after the current sensed event signal, the current sensed event signal is labelled a matched event signal. If another ventricular sensed event signal is not received from the other sensing channel within the predetermined time window extending before and after the current ventricular sensed event signal, control circuit 80 determines that the ventricular sensed signal is an unmatched signal. An example of determining matched and unmatched signals is described below in conjunction with FIG. 9. Control circuit 80 may store the matched or unmatched classification of the received ventricular sensed event signal in memory 82 in conjunction with the RRI and the noise metric.

At block 122, control circuit 80 determines the peak amplitude of the cardiac electrical signal during the blanking period started at block 114. In some examples, R-wave detectors 66a and 66b include a peak track and hold circuit for determining the maximum peak amplitude of the respective cardiac electrical signal following an R-wave sensing threshold crossing, during the in-channel blanking period. The maximum peak amplitude may be determined during an R-wave peak tracking interval that is a portion of the blanking period. Control circuit 80 may receive the peak amplitude of the cardiac electrical signal from sensing circuit 86 and store the peak amplitude in conjunction with the RRI, noise metric, and matched/unmatched classification at block 122. In other examples, control circuit 80 may receive the digitized cardiac electrical signal from the respective sensing channel and determine the maximum peak amplitude within a blanking period or portion thereof, e.g., during a specified R-wave peak tracking period following the R-wave sensing threshold crossing and the time of the received ventricular sensed event signal.

For each ventricular sensed event signal received from each sensing channel 83 and 85, control circuit 80 may determine the RRI, the peak amplitude, a noise metric (which may be a noisy event or non-noisy event classification), and a matched or unmatched classification and store this sensed event data in a buffer in memory 82 for the respective sensing channel. In other examples, other features of the cardiac electrical signal received by the respective sensing channel 83 or 85 may be determined and buffered in memory 82 as sensed event data for use in determining a reliable sensing channel for tachyarrhythmia detection. In addition to or alternatively to the RRI, peak amplitude, noise metric and matched/unmatched classification, examples of other cardiac signal features that may be determined from the cardiac electrical signal received from the sensing channel 83 or 85 include a peak positive slope; peak negative slope; template matching score; signal width of the maximum amplitude pulse following the R-wave sensing threshold crossing; maximum signal width; number of signal pulses having less than a threshold signal width; a sum of pulse widths during the blanking interval (or another baseline portion of the cardiac electrical signal); R-wave sensing threshold amplitude at the time of the R-wave sensing threshold crossing; whether the R-wave sensing threshold crossing occurred during a first drop time interval, during a second drop time interval, or after the second drop time interval following a previously sensed ventricular event signal; or any combination of any of these examples.

At block 124, control circuit 80 compares the RRI to a tachyarrhythmia detection interval, e.g., to a VT detection interval and to a VF detection interval. When the RRI is greater than or equal to the VT detection interval and the VF detection interval, control circuit 80 returns to block 112 to wait for the next ventricular sensed event signal. Control circuit 80 continues the process of determining and storing sensed event data. When the RRI is less than the VT detection interval or the VF detection interval, control circuit 80 updates a respective VT interval counter or VF interval counter at block 126. When the count of VT intervals, VF intervals, or a combined count of both VT and VF intervals is less than a threshold value, as determined by control circuit 80 at block 128, control circuit 80 continues to determine and buffer sensed event data in response to ventricular sensed event signals by returning to block 112.

When the VT interval counter, VF interval counter or the combined count of the VT and VF interval counters reaches a threshold as determined at block 128, control circuit 80 may transition to the verification state (block 200 of FIG. 5) at block 130 for verifying the reliability of one of the cardiac electrical signals received by one of sensing channels for use in tachyarrhythmia detection. The threshold number of VT and/or VF intervals applied at block 128 may be the programmed NID required to detect a shockable VT or VF rhythm. In other examples, the threshold may be less than the programmed NID. As described below, e.g., in conjunction with FIG. 10, control circuit 80 may analyze the buffered sensed event data corresponding to the sensing channels 83 and 85 for determining if at least one of the sensing channels, and corresponding sensed cardiac electrical signal and sensing electrode vector, is reliable for tachyarrhythmia detection in the "concerned" tachyarrhythmia detection state (block 104 of FIG. 5).

Figure 7:
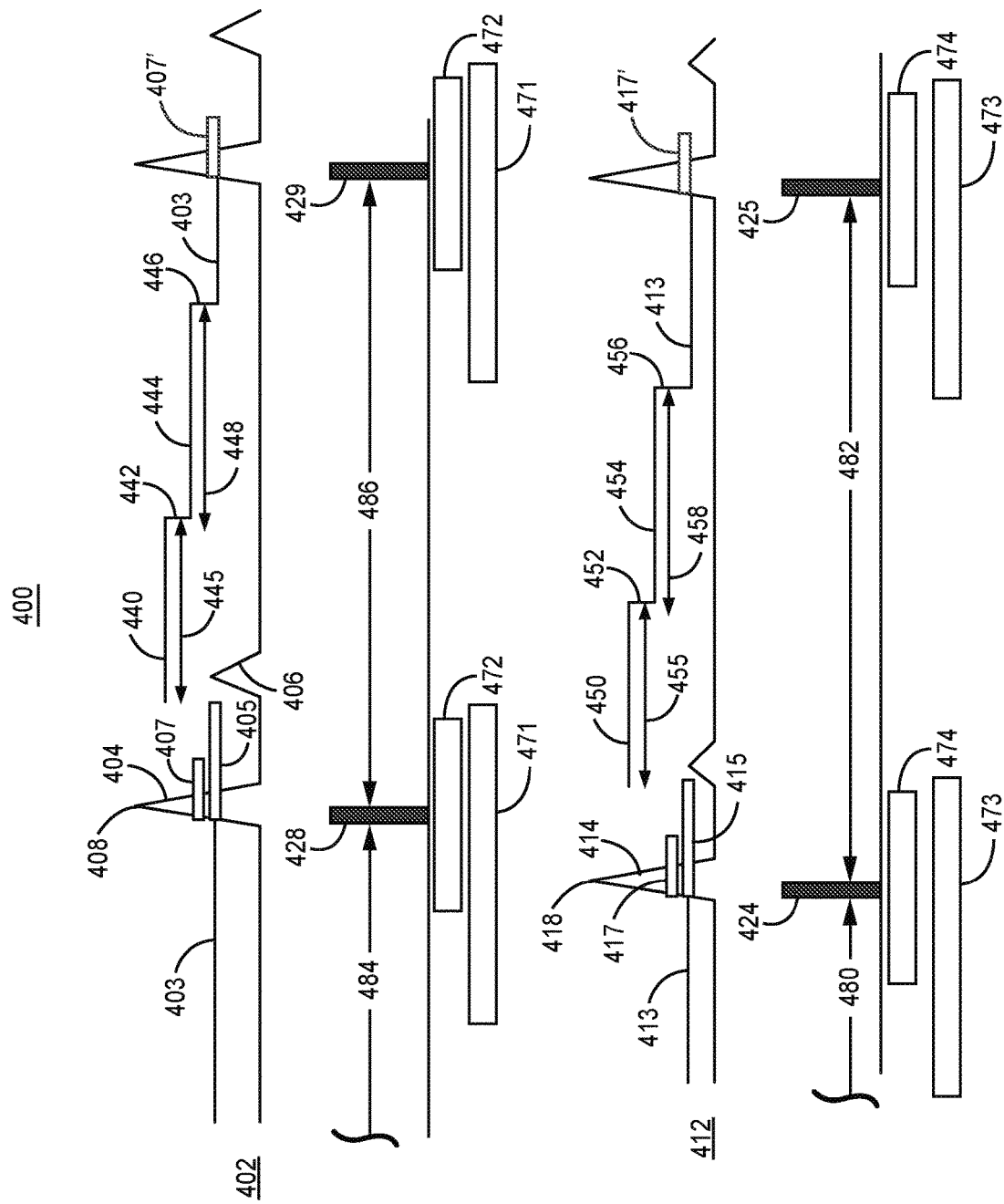
FIG. 7 is a timing diagram depicting time intervals and events associated with a process of sensing ventricular event signals and determining sensed event data for validating the reliability of a sensed cardiac electrical signal for tachyarrhythmia detection according to some examples.

FIG. 7 is a timing diagram 400 depicting time intervals and events associated with a process of sensing ventricular event signals and determining sensed event data that is analyzed by control circuit 80 for validating the reliability of a sensing channel 83 or 85 (and the associated sensed cardiac electrical signal and sensing electrode vector) for tachyarrhythmia detection. With continued reference to sensing circuit 86 shown in FIG. 4, a first cardiac electrical signal 402 that may be received by R-wave detector 66a of the first sensing channel 83 and a second cardiac electrical signal 412 that may be received by R-wave detector 66b of the second sensing channel 85 are illustrated. In this example, the second sensing channel 85 generates a ventricular sensed event signal 424 in response to cardiac electrical signal 412 crossing the R-wave sensing threshold 413, corresponding to a true R-wave 414 in this instance. Control circuit 80 determines the RRI 480 from the current ventricular sensed event signal 424 to the most recent preceding (in-channel) ventricular sensed event signal (not shown) to store the RRI 480 as sensed event data corresponding to ventricular sensed event 424.

The second sensing channel 85 starts an in-channel post-sense blanking period 415 in response to the R-wave sensing threshold crossing by cardiac electrical signal 412. During blanking period 415 no additional ventricular sensed event signals are generated by sensing channel 85. R-wave detector 66b may determine the maximum peak amplitude 418 during the blanking period 415. R-wave detector 66b may determine the maximum peak amplitude 418 during an R-wave peak tracking period 417 that can be a portion of the post-sense blanking period 415 in some examples. For instance, the R-wave peak tracking period 417 may be 100 to 140 ms, or between 125 to 130 ms as an example, and the post-sense blanking period 415 may be set to 140 ms or up to 200 ms. The maximum peak amplitude 418 may be passed to control circuit 80 for storing with sensed event data associated with the received ventricular sensed event signal 424.

Sensing channel 85 may use the maximum peak amplitude 418 for setting the auto-adjusting R-wave sensing threshold to a starting threshold amplitude 450 that is a percentage, e.g., between 40 to 75 percent, or 53% in one example, of the maximum peak amplitude 418. The starting R-wave sensing threshold amplitude 450 is applied to the cardiac electrical signal 412 by sensing channel 85 from the expiration of the blanking period 415. In the example shown, as long as an R-wave sensing threshold crossing is not detected, R-wave detector 66b, under the control of control circuit 80, may adjust the R-wave sensing threshold by a step decrement 452 from the starting threshold amplitude 450 to a second lower threshold amplitude 454 at the expiration of a drop time interval 455. After a second drop time interval 458, R-wave detector 66b may decrease the R-wave sensing threshold by a step decrement 456 to the minimum amplitude 413 or sensing floor, equal to the programmed sensitivity. In other examples, the R-wave sensing threshold may be adjusted according to one or more decay rates over a respective decay interval and/or according to one or more step decrements after a respective drop time interval. In some instances, the starting R-wave sensing threshold amplitude may be set to the minimum amplitude 413 when the maximum peak amplitude 418 is small and the predetermined percentage of the maximum peak amplitude 418 is less than the minimum amplitude 413.

In the example shown, the first sensing channel 83 generates a second, later ventricular sensed event signal 428 in response to the cardiac electrical signal 402 received by the first sensing channel 83 crossing the R-wave sensing threshold 403 applied by R-wave detector 66a. Control circuit 80 determines the RRI 484 from ventricular sensed event signal 428 to a most recent preceding ventricular sensed event signal (not shown). The RRI 484 may be buffered (stored) in memory 82 as sensed event data associated with ventricular sensed event signal 428.

First sensing channel 83 starts an in-channel post-sense blanking period 405 in response to detecting an R-wave sensing threshold crossing (corresponding to true R-wave 404 in this instance). R-wave detector 66a may determine the maximum peak amplitude 408 of the sensed signal during an R-wave peak tracking period 407, which may be a portion of the post-sense blanking period 405. The maximum peak amplitude 408 may be received by control circuit 80 for buffering in memory 82 as sensed event data associated with the ventricular sensed event signal 428.

The R-wave detector 66a of sensing channel 83 may apply an auto-adjusting R-wave sensing threshold amplitude analogous to the R-wave sensing threshold amplitude generally described above for sensing channel 85, which may include a starting threshold amplitude 440 set to a percentage of the maximum peak amplitude 408. The starting threshold amplitude 440 may be decreased by the first sensing channel 83 to a second lower threshold amplitude 444 by a step decrement 442 at the expiration of drop time interval 445. It is noted that the first drop time interval 445 (and 455) may be set to extend past an expected time of T-wave 406 following R-wave 404 to reduce the likelihood of T-wave oversensing. In some examples, the first drop time interval 445 (and 455) may be set to the shortest one of the VT detection interval (when VT detection is enabled) or the VF detection interval. The R-wave sensing threshold applied by sensing channel 83 is adjusted to the minimum amplitude 403 or sensing floor, which may be equal to the programmed sensitivity, by a step decrement 446 at the expiration of a second drop time interval 448. The second lower threshold amplitude 444 (and 454) and the second drop time interval 448 (and 458) may be set to avoid decreasing the R-wave sensing threshold to the minimum amplitude 403 (and 413) before a P-wave is expected to avoid P-wave oversensing. The programmed sensitivities used to set the minimum amplitudes 403 and 413, percentages used to determine starting threshold amplitudes 440 and 450, percentages used to determine second lower threshold amplitudes 444 and 454, and drop time intervals 445, 448, 455 and 458 may be controlled separately by the individual sensing channels 83 and 85 according to unique sensing threshold control parameter values programmed for each sensing channel 83 and 85 under the control of control circuit 80.

In FIG. 7, the first drop time intervals 445 and 455 are shown to begin upon expiration of the blanking periods 405 and 415, respectively. The second drop time intervals 448 and 458 are shown to begin at the expiration of the preceding first drop time interval. It is to be understood that, under the control of control circuit 80, sensing circuit 86 may start all of the blanking periods 405 and 415, first drop time intervals 445 and 455 and second drop time intervals 448 and 458 simultaneously or concurrently upon detecting an R-wave sensing threshold crossing and set each respective time period or interval to expire relative to each other as generally illustrated and described above.

The next ventricular sensed event signal 425 is received by control circuit 80 from the second sensing channel 85 in response to the next sensing threshold crossing by cardiac electrical signal 412. Control circuit 80 determines RRI 482 as the time interval from ventricular sensed event signal 425 to the most recent preceding in-channel ventricular sensed event signal 424. The maximum peak amplitude of the cardiac electrical signal 412 following ventricular event signal 425 during the R-wave peak tracking period 417' can also be determined by sensing circuit 86 or by control circuit 80. The RRI 482 and maximum peak amplitude subsequent to sensed event signal 425 can be stored in memory 82 as sensed event data for ventricular sensed event signal 425. Control circuit 80 compares each RRI 480 and 482 to the VT and VF detection intervals for updating a VT interval counter and a VF interval counter (and optionally a combined VT/VF interval counter) corresponding to the second sensing channel 85.

The next ventricular event signal 429 is received by control circuit 80 from the first sensing channel 83. RRI 486 is determined as the time interval from ventricular sensed event signal 429 to the most recent preceding in-channel ventricular sensed event signal 428 and stored as sensed event data associated with ventricular sensed event signal 429. The maximum peak amplitude of the cardiac electrical signal 402 following ventricular event signal 429 during the R-wave peak tracking period 407' can also be determined by control circuit 80 and stored as sensed event data for ventricular sensed event signal 429. Each RRI 484 and 486 determined for the first sensing channel 83 is compared to the VT and VF detection intervals for updating VT and VF interval counters corresponding to the first sensing channel 83. In some examples, each RRI 480, 482, 484 and 486 may be compared to only a VF counter when VT detection is programmed off (disabled).

In some examples, the amplitude of the auto-adjusting R-wave sensing threshold (also referred to herein as the "auto-adjusting sensing threshold") at the time of the threshold crossing (that results in a ventricular sensed event signal being produced) may be stored in memory 82 in association with the RRI, maximum peak amplitude and any other sensed event data determined by control circuit 80. A ratio of the maximum peak amplitude to the auto-adjusting R-wave sensing threshold amplitude at the time of sensing (e.g., at the time of the R-wave sensing threshold crossing) may be determined as sensed event data by control circuit 80. This ratio may be referred to as the amplitude-to-sense threshold ratio (ASTR). For example, if the maximum peak amplitude 418 following ventricular sensed event signal 424 is 1.5 millivolts (mV) and the auto-adjusting R-wave sensing threshold amplitude 413 at the time of the threshold crossing is 0.3 mV, the ASTR for ventricular sensed event signal 424 may be determined to be 5 by control circuit 80.

The ASTR may be determined for each ventricular sensed event signal 424, 425, 428 and 429 received from each sensing channel 83 and 85 and stored with other sensed event data in memory 82 in some examples. The ASTRs may be used by control circuit 80 in identifying a reliable sensing channel 83 or 85 for input for tachyarrhythmia detection as further described below.

Control circuit 80 may classify each ventricular sensed event signal 424, 425, 428 and 429 as a matched or unmatched signal. For each ventricular sensed event signal received from sensing channel 83 of sensing circuit 86, control circuit 80 determines whether a ventricular sensed event signal is received from the other sensing channel 85 within a match window 472. For each ventricular sensed event signal received from sensing channel 85 of sensing circuit 86, control circuit 80 determines whether a ventricular sensed event signal is received from the other sensing channel 83 within a match window 474. In the example shown, a ventricular sensed event signal 428 is received from the first sensing channel 83 within the match window 474 set to extend before and after ventricular sensed event signal 424. As such, control circuit 80 may determine that the ventricular sensed event signal 424 is a matched signal. Similarly, control circuit 80 receives ventricular sensed event signal 429 from the first sensing channel 83 within the match window 474 extending before and after ventricular sensed event signal 425. Control circuit 80 can classify ventricular sensed event signal 425 as a matched signal. In the example shown, each of the ventricular sensed event signals 424, 425, 428 and 429 are classified as matched signals by control circuit 80 since a ventricular sensed event signal is received from the other sensing channel within the respective match window 472 or 474 that extends earlier and later than each of the ventricular sensed event signals.

The match windows 472 and 474 may be 80 to 250 ms in duration in various examples and may extend equally before and after a ventricular sensed event signal. In one example, the match windows 472 and 474 are 160 ms in duration and extend 80 ms before and 80 ms after a ventricular sensed event signal. In other examples, the match window does not necessarily extend equal intervals before and after the time of the ventricular sensed event signal. For example, the match window may be set to extend less than an expected P-Q or P-R interval, e.g., less than 50 to 120 ms, before the ventricular sensed event signal and/or less than an expected R-T or S-T interval, e.g., less than 80 to 120 ms, after a ventricular sensed event signal. When a ventricular sensed event signal is not received from the other sensing channel within the match window, control circuit 80 may classify the ventricular sensed event signal as an unmatched event signal. Control circuit 80 may store the matched or unmatched event signal classification for each ventricular sensed event signal received from each sensing channel 83 and 85 as sensed event data.

As described below in conjunction with FIG. 8, during each of the respective in-channel blanking periods 405 and 415, control circuit 80 may determine a noise metric in response to each ventricular sensed event signal 424, 425, 428 and 429, respectively. The noise metric may be determined from the respective cardiac electrical signal 402 or 412 that is received as a digitized signal from sensing circuit 86. Control circuit 80 stores the noise metric in association with other sensed event data associated with each respective ventricular sensed event signal 424, 425, 428 and 429, such as the RRI and the peak amplitude determined during the R-wave peak tracking period.

In some examples, each ventricular sensed event signal received from each sensing channel may trigger control circuit 80 to buffer a cardiac electrical signal segment received from morphology signal channel 87. In FIG. 7, a time segment 471, which may be centered or offset from the time of each of ventricular sensed event signals 428 and 429 received from sensing channel 83 represents a time interval over which the cardiac electrical signal from morphology signal channel 87 may be buffered in memory 82 in response to each ventricular sensed event signal received from the first sensing channel 83. The time segment 473 represents a time interval over which the cardiac electrical signal from morphology signal channel 87 may be buffered in memory 82 in response to each ventricular sensed event signal 424 and 425 received from the second sensing channel 85.

As described below in conjunction with FIG. 14, morphology features may be determined from the cardiac electrical signal segments buffered in memory 82 from the morphology signal channel 87 in response to each ventricular sensed event signal from each sensing channel 83 and 85. The cardiac electrical signal segment may be 100 to 500 ms long, as examples. In one example, the buffered segment of the cardiac electrical signal received from the morphology signal channel 87 in response to each ventricular sensed event signal from each sensing channel is at least 48 sample points obtained at a sampling rate of 256 Hz, or approximately 188 ms. The ventricular sensed event signal time may be centered in the buffered segment. According to the example of 48 sample points, 24 sample points may precede and include the sample point at which the ventricular sensed event signal was received and 24 sample points may extend after the sample point at which the ventricular sensed event signal was received. In another example, the cardiac electrical signal from the morphology signal channel 87 is buffered over a 360 ms time interval including 92 sample points sampled at 256 Hz, including 68 samples before and at the time of the ventricular sensed event signal and extending 24 sample points after the ventricular sensed event signal.

Various morphology features may be determined from the buffered cardiac electrical signal segments and stored as morphology data in association with the sensed event data for each ventricular sensed event signal. The morphology features may be representative of the amplitude, width, slope, number of signal pulses, waveform polarity pattern, and/or overall waveform shape, e.g., based on template matching, of the cardiac electrical signal segment, among others. Examples of morphology features that may be determined from the cardiac electrical signal segments are described below in conjunction with FIG. 14. The morphology features may be buffered in memory 82 for use as input to the tachyarrhythmia detection algorithm for detecting a shockable VT/VF rhythm or withholding a shockable VT/VF rhythm detection when the NID is reached by a selected sensing channel.

Using the techniques disclosed herein, control circuit 80 selects a sensing channel 83 or 85 and corresponding cardiac electrical signal sensed by the respective sensing channel 83 or 85 as a reliable sensing channel and cardiac electrical signal for providing input for use in VT/VF detection. Data, such as RRIs and morphology features determined from cardiac electrical signal segments, that is determined based on ventricular sensed event signals received by control circuit 80 from the selected sensing channel is determined to be reliable as input for use in VT/VF detection. As such, the morphology features determined from the cardiac electrical signal segments buffered in response to ventricular sensed event signals received form the selected sensing channel can be used as input to the tachyarrhythmia detection algorithm. For example, morphology features determined from the cardiac electrical signal segments buffered in response to ventricular sensed event signals received from the selected sensing channel may be analyzed for suspected oversensing of noise, T-waves or other signals that are not true R-waves that may coincide in time with the ventricular sensed event signals. The morphology feature analysis may be used for determining whether a tachyarrhythmia detection rejection rule is met. Morphology features may additionally or alternatively be analyzed for determining a normally conducted R-wave morphology is present in the cardiac electrical signal segment coinciding with the ventricular sensed event signal, indicating a supraventricular rhythm. Analysis of the morphology features may determine whether a supraventricular tachycardia (SVT) rejection rule is met, for example. When a rejection rule is met based on the morphology features determined from the cardiac electrical signal segments, control circuit 80 may withhold a shockable VT/VF detection when the NID is reached by the selected sensing channel.

Figure 8:
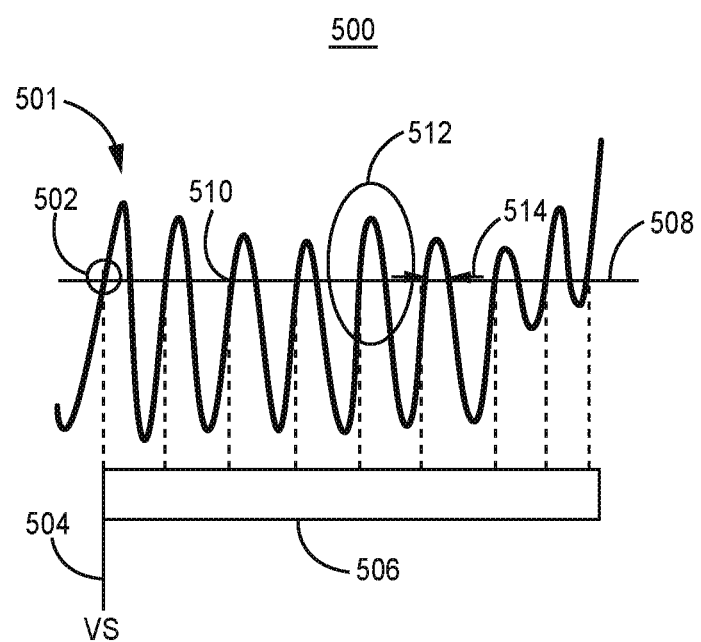
FIG. 8 is a diagram of a cardiac electrical signal during a post-sense blanking period illustrating a method for determining a noise metric as sensed event data according to some examples.

FIG. 8 is a diagram 500 of a cardiac electrical signal 501 during a post-sense blanking period 506 illustrating a method for determining a noise metric by control circuit 80 according to some examples. In this example, the sensed cardiac electrical signal 501 is contaminated by noise pulses, e.g., skeletal muscle myopotential noise. A ventricular sensed event signal 504 is generated by one of sensing channels 83 or 85 of sensing circuit 86 in response to an R-wave sensing threshold crossing 502 by the cardiac electrical signal 501. Sensing circuit 86 starts the post-sense blanking period 506. The R-wave sensing threshold 508 may be at the highest starting threshold amplitude, the second, lower sensing threshold amplitude, or the sensing floor (see FIG. 7) at the time of the R-wave sensing threshold crossing 502.

The cardiac electrical signal 501, which may be a narrowband, notch filtered and rectified signal, received during the blanking period 506 may be analyzed by control circuit 80 for determining a noise metric. In other examples, sensing circuit 86 may be configured to determine the noise metric and pass a noise metric signal to control circuit 80. In one example, control circuit 80 counts each positive going crossing 510 of sensing threshold 508 during the blanking period 506. Each positive going threshold crossing 510 is shown by dashed line in FIG. 8. Each positive going threshold crossing 510 marks a signal pulse that occurs during the blanking period 506 having an amplitude that is greater than the R-wave sensing threshold 508. For example, one signal pulse 512 is counted in response to one positive going R-wave sensing threshold crossing. In other examples, control circuit 80 may count one signal pulse in response to a positive going R-wave sensing threshold crossing followed by a negative going sensing threshold crossing or in response to each negative going threshold crossing.

Control circuit 80 may determine the noise metric by determining the count of signal pulses, which may be a count of positive going (or negative going or pairs of positive followed by negative going) sensing threshold crossings that occur during the blanking period 506. In the example shown the noise metric is determined as a signal pulse count of 8, where each signal pulse has an amplitude equal to or greater than the R-wave sensing threshold 508. The R-wave sensing threshold crossing 502 that starts the blanking period 506 may be excluded from the signal pulse count in some examples. In other examples, the R-wave sensing threshold crossing 502 may be included.

In other examples, a different amplitude threshold than the R-wave sensing threshold amplitude 508 which resulted in a ventricular sensed event signal 504 may be used in identifying and counting signal pulses during the blanking period 506. In some examples, a signal pulse amplitude threshold may be less than or greater than the R-wave sensing threshold amplitude. In some examples, the signal pulse amplitude threshold may be set based on the R-wave sensing threshold 508 at the time of ventricular sensed event signal 504, the programmed sensitivity, the maximum peak amplitude of the cardiac electrical signal 501 during the blanking period 506 or the first peak amplitude following R-wave sensing threshold crossing 502.

Furthermore, it is to be understood that the time interval over which the noise metric is determined may be longer than or shorter than the blanking period 506 that is applied by the respective sensing channel 83 or 85 for sensing R-waves. The time interval over which the noise metric is determined may be set to include an expected QRS width. When a true R-wave is sensed, the number of positive R-wave sensing threshold crossings during the blanking period is expected to be few or none. The time interval for determining the noise metric may be set to promote inclusion of a baseline portion of the cardiac electrical signal for determining the noise metric from a portion(s) of the cardiac electrical signal 501 when, for example, T-waves and/or P-waves are not expected to occur. In other examples, the time interval over which the noise metric is determined may extend from the start of the blanking period to the expiration of the first drop time interval or a portion thereof or from the start of the blanking period to the expiration of the second drop time interval or a portion thereof (see FIG. 7). In still other examples, the noise analysis time interval over which the noise metric is determined may extend earlier and later than the time of the ventricular sensed event signal 504. The time interval over which the cardiac electrical signal 501 is analyzed for determining the noise metric may be programmable by a user in some examples and may be adjustable by control circuit 80 based on the rate of ventricular sensed event signals, e.g., shortened when sensed event intervals are shorter and lengthened when sensed event intervals are longer. The time interval over which the cardiac electrical signal 501 is analyzed for determining the noise metric may be one continuous time interval or multiple discontinuous time intervals.

In addition or alternatively to determining the signal pulse count, control circuit 80 may determine one or more other noise metrics during a time interval associated with each received ventricular sensed event signal. For example, control circuit 80 may determine the pulse width 514 of each signal pulse during the blanking period (or other selected noise analysis time interval). The pulse width 514 may be determined as the time from a positive going threshold crossing to a negative going threshold crossing. The pulse width may alternatively be determined as the time between two maximum peaks, two minimum peaks (or zeros) or other time interval representative of the width of a signal pulse. The pulse widths determined over the blanking period 506 (or other selected time interval) may be summed for determining a noise metric in some examples. The pulse widths of signal pulses having at least a threshold amplitude, e.g., the R-wave sensing threshold or another selected signal pulse threshold amplitude, may be included in the summation with smaller amplitude signal pulses excluded or ignored.

Additionally or alternatively, a count of signal pulses having a pulse width less than a threshold width may be determined as a noise metric by control circuit 80 in some examples. The number of signal pulses, the cumulative signal width, and the number of "narrow" signal pulses having less than a threshold pulse width may each be positively correlated to the number of noise pulses in the cardiac electrical signal 501, which may lead to unreliable oversensing of noise signal pulses. Additionally or alternatively, the maximum signal pulse width and/or the minimum signal pulse width may be determined by control circuit 80 as a noise metric. The maximum pulse width may be inversely correlated to noise contamination because a relatively wide signal pulse may be evidence of a true R-wave or fibrillation wave in the cardiac electrical signal. Control circuit 80 may determine if the last pulse during the noise analysis time interval has the maximum signal pulse width or the minimum signal pulse width of the signal pulses during the noise analysis time interval and/or whether the last signal pulse in the noise analysis time interval falls below the threshold amplitude 508 before the end of the noise analysis time interval. A relatively large (high amplitude and/or wide signal width) signal pulse during or near the end of the noise analysis time interval may be a true R-wave or fibrillation wave within the noise analysis time interval and may be a contrary (negative) indication of a noisy cycle.

Figure 9:
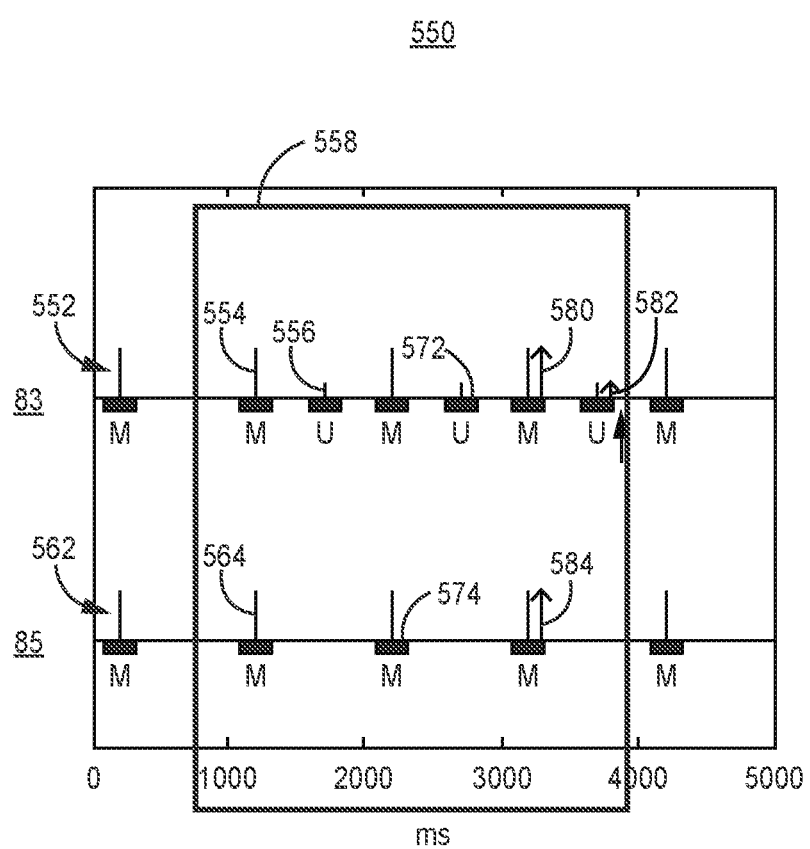
FIG. 9 is a timing diagram of ventricular sensed event signals that may be classified as matched and unmatched event signals for buffering as sensed event data according to some examples.

FIG. 9 is a timing diagram 550 of ventricular sensed event signals received by control circuit 80 from sensing channels 83 and 85 that may be classified as time-based matched and unmatched event signals according to one example. Ventricular sensed event signals 552 received from sensing channel 83 are shown along the top row of timing diagram 550. Ventricular sensed event signals 562 received from sensing channel 85 are shown along the bottom row of timing diagram 550.

As described above in conjunction with block 120 of FIG. 6, control circuit 80 may classify each ventricular sensed event signal received from sensing channel 83 as a time-based matched (M) or unmatched (U) event signal. In response to each ventricular event signal 552 received from first sensing channel 83, control circuit 80 may determine whether a ventricular sensed event signal is received from sensing channel 85 within a match window 572. As described above in conjunction with FIG. 7, the match window 572 may extend before and after a ventricular sensed event signal. Likewise, control circuit 80 may classify each ventricular sensed event signal received from sensing channel 85 as a matched or unmatched event signal based on whether a ventricular sensed event signal is received from sensing channel 83 within the match window 574 extending before and after each respective ventricular sensed event signal received from sensing channel 85.

In the example shown, each of ventricular sensed event signals 562 received from sensing channel 85 are classified by control circuit 80 as a matched event signal (M) because a ventricular sensed event signal 554 is received from sensing channel 83 within the match window 574 of each individual ventricular event signal 564 received from sensing channel 85. The corresponding event signals 554 from sensing channel 83 are also classified by control circuit 80 as matched event signals because a ventricular event signal 564 from sensing channel 85 is received within the match window 572 extending before and after the individual ventricular event signals 554. However, ventricular sensed event signals 552 received from sensing channel 83 include unmatched event signals (U) 556 that are received by control circuit 80 in the absence of a ventricular sensed event signal being received from sensing channel 85 within the match window 572. The unmatched event signals 556 may be oversensed P-waves, oversensed T-waves, oversensed skeletal muscle myopotential signals or other noise. In other instances, the unmatched event signals 556 from sensing channel 83 may be a true R-wave that is undersensed by the other sensing channel 85. The matched or unmatched classification of each ventricular sensed event signal received from each sensing channel 83 and 85 may be buffered in memory 82 as sensed event data.

During the verification of a reliable sensing channel at block 200 of FIG. 5, control circuit 80 may determine a matched events ratio for each sensing channel 83 and sensing channel 85 as the ratio of matched ventricular sensed event signals to all ventricular sensed event signals that occur over a time window 558 for the individual sensing channel 83 or 85. The time window 558 may be a predetermined interval of time, which may be one second, two seconds, or three seconds as examples. Control circuit 80 may store matched and unmatched event classifications in a sensed event buffer for each sensing channel 83 and 85. When a threshold number of tachyarrhythmia detection intervals is reached by at least one sensing channel 83 or 85 for transitioning to verification of a reliable sensing channel at block 200 as shown in FIG. 5, control circuit 80 may determine the ratio of matched sensed events to the count of all sensed event classifications buffered over the most recent time window 558.

In the example shown in FIG. 9, the matched events ratio for sensing channel 83 is 0.5 during time window 558 because there are three matched event signals 554 out of a total of six ventricular sensed event signals. The matched events ratio for sensing channel 85 is 1 since there are three matched sensed event signals 564 out of a total of three ventricular sensed event signals during the time window 558. As described below in conjunction with FIG. 10, control circuit 80 may determine and use the matched events ratio(s) for verifying a sensing channel 83 or 85 (and the associated sensed cardiac electrical signal and sensing electrode vector), as being reliable for tachyarrhythmia detection.

In addition or alternatively to determining a matched events ratio for each sensing channel 83 and 85 during the verification state, control circuit 80 may be configured to determine a representative amplitude of matched events and a representative amplitude of unmatched events from the buffered sensed event data. Control circuit 80 may determine an amplitude ratio of the matched events amplitude to the unmatched events amplitude. As described in conjunction with FIG. 7, the maximum peak amplitude of the cardiac electrical signal following an R-wave sensing threshold crossing may be determined and stored for each ventricular sensed event signal as the event amplitude. Control circuit 80 may determine the mean, median, maximum, minimum or other representative amplitude from the peak amplitudes stored for all matched event signals during the time window 558 for each sensing channel 83 and 85. Control circuit 80 may determine the mean, median, maximum, minimum or other representative amplitude from the peak amplitudes stored for all unmatched event signals during the time window 558 for each sensing channel 83 and 85. The ratio of the matched events amplitude to the unmatched events amplitude during time window 558 can then be determined by control circuit 80.

In the diagram of FIG. 9, a determined matched events amplitude 580 and a determined unmatched events amplitude 582 for sensing channel 83 are shown conceptually next to a matched ventricular event signal and an unmatched ventricular sensed event signal, respectively. While the amplitudes of the matched and unmatched ventricular sensed event signals are shown to be different in FIG. 9 for the sake of illustration, it is to be understood that the ventricular sensed event signals 552 received from sensing channel 83 may all be equivalent because each represents detection of an R-wave sensing threshold crossing, prior to determining a peak amplitude of matched/unmatched classification. However, control circuit 80 may receive the corresponding maximum peak amplitude determined by the sensing channel R-wave detector 68a with each sensed event signal in order to store sensed event data and subsequently determine a representative amplitude of matched event signals and a representative amplitude of unmatched event signals.

In an illustrative example, control circuit 80 determines that the median of the peak amplitudes stored in conjunction with matched event signals 554 is 1.5 mV during the time window 558 and the median of the peak amplitudes stored in conjunction with the unmatched event signals 556 is 0.4 mV. In this example, control circuit 80 determines that the matched to unmatched amplitude ratio is 3.75 for sensing channel 83. For sensing channel 85, since there are no unmatched event signals in time window 558, the amplitude ratio may be set to a default value, e.g., zero, by control circuit 80. As described below in conjunction with FIG. 10, control circuit 80 may use the matched to unmatched amplitude ratio determined for a given sensing channel to verify its reliability for tachyarrhythmia detection.

Figure 10:
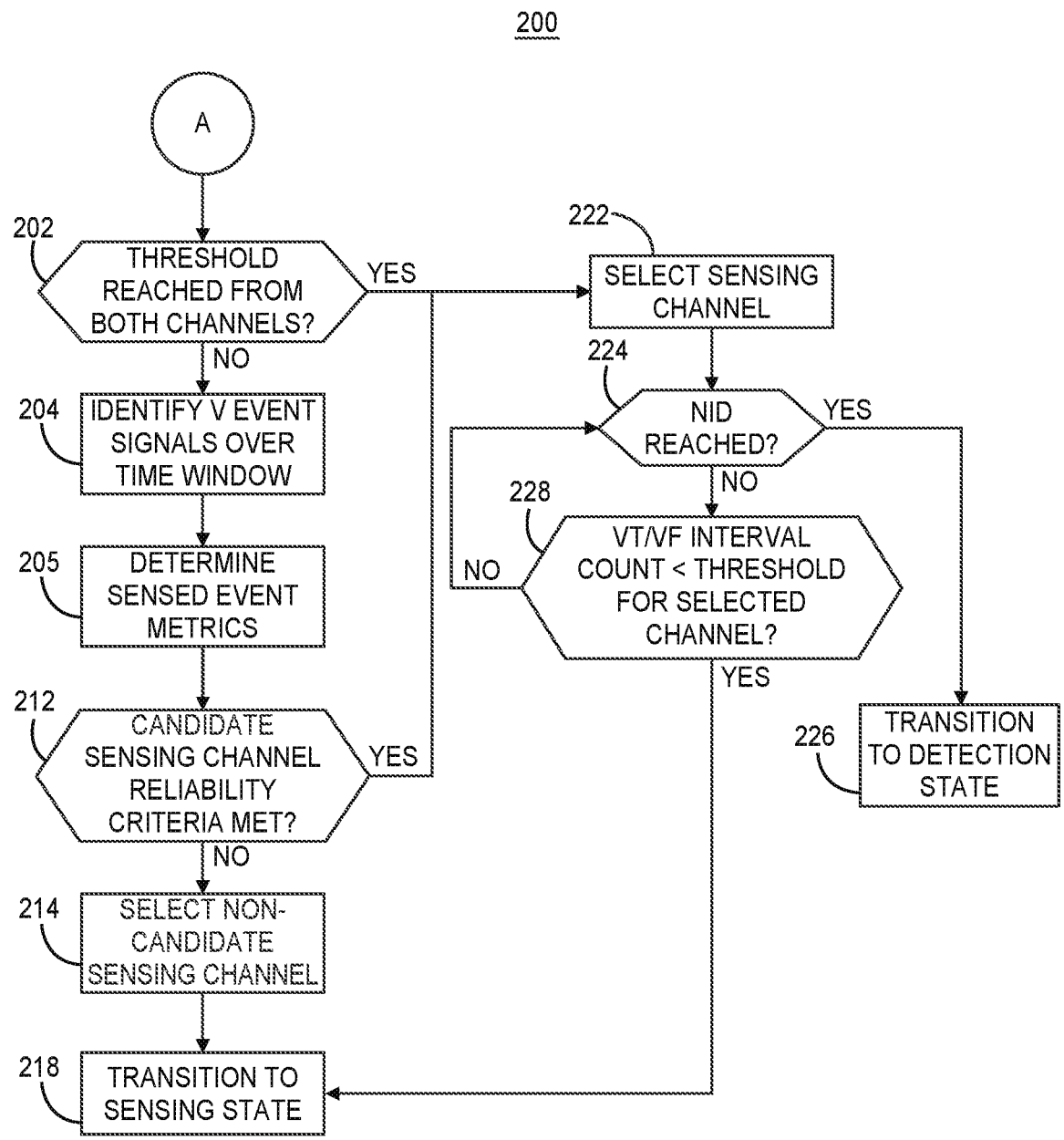
FIG. 10 is a flow chart of a method that may be performed by an ICD during the verification state of FIG. 5.

FIG. 10 is a flow chart 200 of a method that may be performed by ICD 14 during the verification state of identically numbered block 200 of FIG. 5 for verifying a reliable sensing channel for tachyarrhythmia detection according to some examples. Control circuit 80 transitions to the verification state 200 when a threshold number of tachyarrhythmia intervals is reached based on analysis of RRIs determined from ventricular sensed event signals from sensing channel 83 or based on RRIs determined from ventricular sensed event signals from sensing channel 85. In some examples, the threshold number of tachyarrhythmia intervals is equal to the NID for detecting VT or VF. When RRIs determined for at least one of the sensing channels 83 or 85 reaches the NID required to reach VT (when VT detection is enabled) or VF, control circuit 80 transitions to the verification state and advances from the process of flow chart 102 of FIG. 6 to the process of flow chart 200 of FIG. 10, as indicated by the connector "A."

When VT/VF intervals have reached the NID (or other predetermined threshold) for both sensing channels 83 and 85, control circuit 80 may select a default sensing channel, either sensing channel 83 or 85, at block 222. The cardiac electrical signals sensed by sensing channels 83 and 85 may both be considered reliable when a VT/VF interval counter reaches an NID for both sensing channels concomitantly. A predetermined default sensing channel may be selected at block 222 to provide cardiac electrical signal and/or ventricular sensed event signal input for processing and analysis for tachyarrhythmia detection. The default sensing channel may be selected at block 222 as a sensing channel that was previously determined to be a reliable sensing channel based on sensed event data analysis. Control circuit 80 may transition directly to the "concerned" tachyarrhythmia detection state at block 226 because the NID is already reached for both sensing channels 83 and 85 ("yes" branch of block 224). As described above in conjunction with FIG.

5, when the NID is reached by both sensing channels concomitantly, the process of analyzing the sensed event data for validating the reliability of a sensing channel for tachyarrhythmia detection may be skipped, and control circuit 80 may transition directly to the "concerned" tachyarrhythmia detection state.

In some examples, when the threshold number of tachyarrhythmia detection intervals required to transition to the verification state is less than the NID, and both sensing channels 83 and 85 have reached that threshold as determined at block 202, control circuit 80 selects a predetermined default sensing channel (or a previously validated sensing channel) out of the sensing channels 83 and 85 at block 222 and continues to determine RRIs based on ventricular sensed event signals received from the selected sensing channel until the NID is reached at block 224. When the NID is reached based on ventricular sensed event signals from the selected sensing channel ("yes" branch of block 224), control circuit 80 transitions to the "concerned" tachyarrhythmia detection state at block 226.

As long as the tachyarrhythmia interval count for both sensing channels 83 and 85 continues to meet the threshold requirement, control circuit 80 remains in the verification state until an NID is reached by the selected sensing channel. If the tachyarrhythmia interval count for both of the sensing channels 83 and 85 is less than the NID and falls below the threshold required to remain in the verification state at block 228, control circuit 80 may transition back to the sensing state at block 218. The threshold tachyarrhythmia interval count applied at block 228 to transition back to the "unconcerned" sensing state may be equal to or different than the threshold required to transition to the verification state. For example, the threshold applied at block 228 to return to the sensing state at block 218 may be greater than the threshold required to enter the verification state to promote remaining in the verification state when a fast rate of ventricular sensed event signals returns.

When control circuit 80 determines that only one of the sensing channels 83 or 85 but not both has reached the NID (or other threshold number of VT/VF intervals) required to transition to the verification state ("no" branch of block 202), control circuit 80 may advance to block 204 to analyze the stored sensed event data for selecting one of the two sensing channels 83 or 85 as the reliable sensing channel for detecting tachyarrhythmia. At block 204, control circuit 80 identifies the ventricular sensed events and associated buffered sensed event data that occur over a most recent predetermined validation time interval, e.g., a three second interval 558 as shown in FIG. 9. Since a varying number of ventricular sensed event signals may be received from each sensing channel 83 and 85 during a predetermined time interval, control circuit 80 identifies the ventricular event signals buffered in memory 82 for each sensing channel 83 and 85 that extend over the most recent n-seconds defining the validation time interval, e.g., by summing the stored RRIs for a given sensing channel until the n-seconds are reached.

For example, if each RRI determined from ventricular sensed event signals received from sensing channel 83 is 200 ms, 15 ventricular sensed event signals are identified from the sensed event data buffered in memory 82 for the first sensing channel 83 to obtain a 3-second time interval of sensed events. If each RRI determined from ventricular sensed event signals received from sensing channel 85 is 300 ms, 10 ventricular sensed event signals are identified from the sensed event data by control circuit 80 to obtain a 3-second time interval of sensed events for the second sensing channel 85. In some examples, memory 82 is configured to buffer sensed event data for at least 20 to 30 ventricular sensed event signals for each sensing channel, e.g., when the predetermined validation time interval is two or three seconds in length, to promote storage of sensed event data for at least an n-second time interval of ventricular sensed event signals during fast VT or VF. In one example, the FIFO buffer in memory 82 can be configured to store sensed event data for the most recent 20 to 25 or, in one example, 22 ventricular sensed event signals from each sensing channel 83 and 85.

The sensed event data stored for each ventricular sensed event signal may include the matched or unmatched classification, the RRI, the peak amplitude determined during an R-wave peak tracking period, the ASTR, and a noise metric such as the signal pulse count during the blanking period as described above in conjunction with FIG. 8. It is to be understood that additional features may be determined by control circuit 80 from the cardiac electrical signals sensed by sensing channel 83 and sensing channel 85 and stored in association with respective ventricular sensed event signals that are used for other purposes, e.g., for tachyarrhythmia detection once a sensing channel 83 or 85 is selected based on the verification process. For example, control circuit 80 may determine a morphology matching score and/or other signal morphology features from the cardiac electrical signal received from morphology signal channel 87 for storing in association with each ventricular sensed event signal received from both sensing channels 83 and 85 for use in tachyarrhythmia detection algorithms once a sensing channel 83 or 85 is selected.

At block 205 of FIG. 10, control circuit 80 determines at least one sensed event metric from the buffered sensed event data for at least one of sensing channels 83 and 85. A sensed event metric is a metric of sensed event data stored for a given sensing channel over the predetermined validation time interval that is representative of the corresponding data. The sensed event metric(s) can be compared to sensing channel reliability criteria at block 212 for selecting one of sensing channels 83 or 85 as the reliable sensing channel for VT/VF detection.

Figure 11:
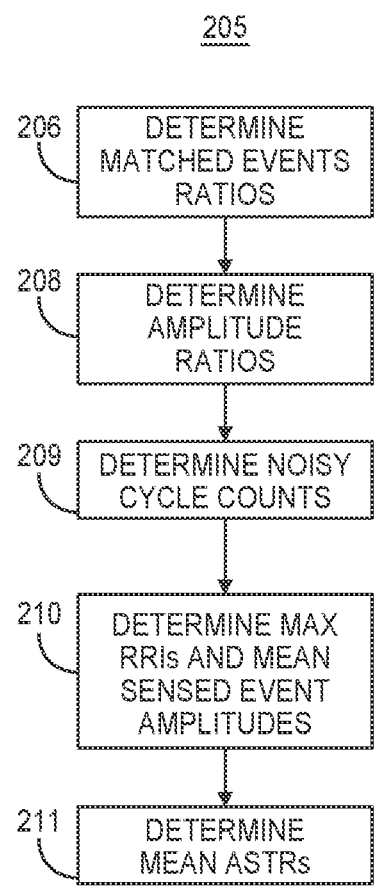
FIG. 11 is a flow chart of a method for determining sensed event metrics from sensed event data for use in selecting a reliable sensing channel and sensed cardiac electrical signal for use in tachyarrhythmia detection.

FIG. 11 is a flow chart 205 of a method for determining sensed event metrics that may be performed by control circuit 80 at identically numbered block 205 of FIG. 10. In this example, at block 206, control circuit 80 determines the matched events ratio for each sensing channel 83 and 85 based on the matched/unmatched classifications of the ventricular event signals that were identified at block 204 (FIG. 10) as spanning a predetermined validation time interval for each respective sensing channel 83 and 85. As described in conjunction with FIG. 9 above, the ratio of the number of cross-channel, time-matched ventricular sensed event signals to the number of all in-channel ventricular sensed event signals received from a given sensing channel 83 or 85 may be determined at block 206 as the matched events ratio for the most recent validation time interval. This matched events ratio is a sensed event metric that represents the portion of all ventricular sensed event signals received from a sensing channel 83 or 85 that are classified as matched event signals.

At block 208, control circuit 80 may determine the amplitude ratio for each sensing channel 83 and 85 as the ratio of the matched sensed event amplitude to the unmatched sensed event amplitude determined during the validation time interval. As described above in conjunction with FIG. 9, a representative amplitude of matched event signals may be determined from maximum peak amplitudes buffered for the matched event signals. A representative amplitude of the unmatched event signals may be determined from the maximum peak amplitudes buffered for the unmatched event signals. The amplitude ratio is a sensed event metric that represents the amplitude of matched sensed event signals relative to the amplitude of the unmatched sensed event signals. When all ventricular sensed event signals are matched event signals, the amplitude ratio may be determined to be a default value, e.g., zero.

At block 209, control circuit 80 may determine a noisy cycle count for each sensing channel 83 and 85 by counting the number of ventricular sensed event signals during the predetermined time interval that are associated with a stored signal pulse count that is greater than a noise threshold. For instance, when the signal pulse count during a given blanking period (or other predetermined noise analysis time interval) is greater than 3 (or other specified threshold), the associated ventricular sensed event signal is determined as a noisy cycle. Control circuit 80 may store the signal pulse count and/or the classification of a noisy cycle or non-noisy cycle based on the comparison of the signal pulse count to the noise threshold for each ventricular sensed event signal as sensed event data. At block 209, control circuit 80 determines a sensed event metric as a count of how many of the ventricular sensed event signals identified over the predetermined validation time interval are determined as noisy cycles (having a signal pulse count greater than the noise threshold). The number of noisy cycles during the validation time interval is a sensed event metric representing the noise content of the sensed cardiac electrical signal and can be an indication of the likelihood of sensed event signals being noise.

At block 210, control circuit 80 determines a maximum RRI during the predetermined time interval for each sensing channel. The maximum RRI is a sensed event metric that represents the minimum rate of ventricular sensed event signals received from the respective sensing channel during the predetermined time interval. Control circuit 80 may determine a mean sensed event amplitude at block 210. The mean sensed event amplitude is the mean of the peak amplitudes buffered for all ventricular sensed event signals spanning the validation time interval. The mean sensed event amplitude is a sensed event metric that is representative of the amplitudes of the signals sensed as ventricular events by each sensing channel. In other examples, a representative value of the amplitudes of the signals sensed as ventricular events may be determined as a median, maximum, minimum, range, predetermined percentile or other value.

At block 211, control circuit 80 may determine a mean value of the ASTRs stored for each sensing channel 83 and 85 during the validation time interval. As described above in conjunction with FIG. 7, the ASTR is the ratio of the maximum peak amplitude of a sensed signal to the amplitude of the auto-adjusting R-wave sensing threshold crossed by the sensed signal. In other examples, a representative value of the ASTRs may be determined at block 211 as the median, maximum, minimum, range, predetermined percentile or other value.

The metrics of the sensed event data that are described in conjunction with blocks 206, 208, 209, 210 and 211 of FIG. 11 as being determined from data buffered over a predetermined validation time interval, e.g., a three-second time interval. The validation time interval may include all or a portion of the currently buffered sensed event data for each sensing channel 83 and 85. It is to be understood, however, that in other examples, some or all of the metrics of sensed event data determined at block 205 of FIG. 10 may be determined from the sensed event data buffered in memory 82 for a specified number of ventricular sensed event signals or all of the ventricular sensed event signals for which sensed event data is buffered in memory 82. The metrics of sensed event data determined for each sensing channel 83 and 85 from all or a portion of the buffered sensed event data may include the matched events ratio, matched to unmatched amplitude ratio, noisy cycle count and/or other metrics of the buffered sensed event data, such as a maximum, minimum, mean, median or other representative RRI, the maximum, minimum, mean median or other representative sensed event amplitude and/or the maximum, minimum, mean, median or other representative ASTR as examples. While the sensed event metrics are shown to be determined in a particular order in FIG. 11, it is to be understood that control circuit 80 may determine the sensed event metrics in any order or in parallel processing of the sensed event data. In some examples, the sensed event metrics may be determined on a beat by beat basis as new data is stored in memory 82 in response to each ventricular sensed event signal received from a given sensing channel 83 or 85. In this way, the sensed event metrics may be updated beat-by-beat such that the metrics are available for comparison to sensing channel reliability criteria at block 212 of FIG. 10 when an NID (or other threshold) is reached by one sensing channel for making a selection of a reliable sensing channel for tachyarrhythmia detection with minimum processing delay.

Referring again to FIG. 10, at block 212, control circuit 80 determines whether sensing channel reliability criteria are met by the sensed event data for selecting one of the sensing channels 83 or 85 for VT/VF detection. The reliability criteria may include one or more combinations of thresholds or other required values to be met by the sensed event metrics determined at block 205 in order for control circuit 80 to select a sensing channel for tachyarrhythmia detection. The one or more combinations of thresholds or other required values applied by control circuit 80 enable control circuit 80 to select a reliable sensing channel 83 or 85 that is likely to be sensing true R-waves without significant oversensing of P-waves, T-waves or noise or undersensing true R-waves.

In some examples, at block 212 control circuit 80 may compare the matched events ratio, amplitude ratio and/or noisy cycle count determined for one or both sensing channels at block 212 to reliability criteria for determining which one of the sensing channels 83 or 85 is reliable for VT/VF detection. Control circuit 80 may evaluate other sensed event data, such as the RRIs, sensed event amplitudes, and/or ASTRs buffered for one or both sensing channels 83 and 85 for selecting a sensing channel for VT/VF detection. When only one sensing channel 83 or 85 has reached the threshold number of VT/VF intervals as determined at block 202, one of the two sensing channels 83 or 85 may be oversensing and/or one of the two sensing channels 83 or 85 may be undersensing. Before transitioning to the tachyarrhythmia detection state for detecting VT/VF, control circuit 80 selects one of the two sensing channels to rely on for detecting VT/VF based on reliability criteria being met to eliminate a sensing channel 83 or 85 that may be over- or undersensing.

The sensing channel 83 or 85 that has reached the threshold number of VT/VF intervals that caused the transition to the verification state may be referred to as the "candidate sensing channel" for the sake of convenience. The other sensing channel 85 or 83 that has not reached the threshold number of VT/VF intervals upon transitioning to the verification state (as determined at block 202) may be referred to as the "non-candidate sensing channel." Either of the candidate sensing channel or the non-candidate sensing channel, however, may be determined to be the reliable sensing channel selected for use in VT/VF detection in some examples. For instance, the candidate sensing channel may be determined to meet criteria at block 212 that is evidence of oversensing, causing the threshold number of VT/VF intervals to be reached by the candidate sensing channel due to false ventricular sensed event signals. In this case the non-candidate sensing channel may be selected as the reliable sensing channel for VT/VF detection. In other instances, the non-candidate sensing channel may be determined to meet criteria that is evidence of undersensing. In this case, the candidate sensing channel may be selected as the reliable sensing channel for VT/VF detection because the non-candidate sensing channel is likely to be undersensing R-waves.

As described below in conjunction with FIG. 12, control circuit 80 may evaluate one or more combinations of criteria at block 212 for determining whether sensing channel reliability criteria are met for selecting one of the sensing channels 83 or 85 for VT/VF detection. For example, the matched events ratio, the amplitude ratio, and/or the noisy cycle count may each be compared to respective thresholds defined by the reliability criteria. The candidate sensing channel may generally be determined reliable when the matched events ratio is relatively high (most or all ventricular sensed event signals are matched event signals), the amplitude ratio is relatively low (e.g., close to 1 indicating the amplitude of matched and unmatched event signals is similar), and/or the noisy cycle count is relatively low based on the methods for determining each of these sensed event metrics as described in conjunction with FIG. 11.

Additionally or alternatively, the candidate sensing channel may be determined to be reliable when the non-candidate sensing channel meets criteria that is evidence of likely undersensing by the non-candidate sensing channel. Likely undersensing by the non-candidate sensing channel may be generally determined when the maximum RRI is relatively long (indicating an intervening R-wave may be undersensed) and/or the mean sensed event amplitude is relatively low, e.g., near the sensing floor, indicating that some R-waves or fibrillation waves could have a peak amplitude below the sensing floor. Examples of criteria that may be applied at block 212 for determining a reliable sensing channel for VT/VF detection are described below in conjunction with FIG. 12.

When reliability criteria are met for selecting the candidate sensing channel for VT/VF detection ("yes" branch of block 212), control circuit 80 may select the candidate sensing channel at block 222. After selecting the candidate sensing channel for VT/VF detection, control circuit 80 may determine when the NID is reached (if not already reached) by the selected sensing channel at block 224. In some instances, the selected sensing channel may be the candidate sensing channel that has already reached the NID when the NID is used as the threshold for transitioning to the verification state. As such, control circuit 80 may transition directly to the "concerned" tachyarrhythmia detection state at block 226 after selecting the candidate sensing channel.

In some examples, a threshold count of VT/VF intervals that is lower than the NID may be used for transitioning into the verification state in which case the candidate sensing channel may not have yet reached the NID when selected at block 222. Control circuit 80 may remain in the verification state until the NID is reached at block 224 by the selected sensing channel. When the NID has not been met by the selected sensing channel ("no" branch of block 224), control circuit 80 may advance to block 228 to determine whether the VT/VF interval counts for the selected sensing channel has fallen to below a threshold number of VT/VF intervals for remaining in the verification state waiting for the NID to be met. If not, control circuit 80 may return to block 224 to wait for the NID to be reached based on VT/VF interval counts determined from ventricular sensed event signals received from the selected sensing channel. If the VT/VF interval count for the selected sensing channel is less than a predetermined threshold number of VT/VF intervals at block 228, which may be less than the NID, control circuit 80 may transition back to the "unconcerned" sensing state at block 218. As described above, in the sensing state, control circuit 80 monitors RRIs determined from ventricular sensed event signals received from both sensing channels 83 and 85 and stores sensed event data for each of the sensing channels 83 and 85 until a threshold number of VT/VF intervals is reached again for transitioning to the verification state.

When the NID is met by the selected sensing channel ("yes" branch of block 224), control circuit 80 transitions to the tachyarrhythmia detection state at block 226 (shown as block 104 in FIG. 5) to determine if all tachyarrhythmia detection criteria are met for detecting VT/VF. During the "concerned" tachyarrhythmia detection state, the RRIs determined for the selected sensing channel may continue to be monitored for updating VT/VF interval counts and/or determining if termination criteria are met based on a threshold number of non-tachyarrhythmia ventricular event intervals is reached, a median RRI being consistently greater than a detection interval and/or VT/VF interval counter reset conditions being met as described above in conjunction with FIG. 5. Other processing and analysis of the cardiac electrical signal received from the selected one of sensing channels 83 or 85 and/or the cardiac electrical signal received from the morphology signal channel 87 is performed to determine if tachyarrhythmia detection criteria are met after transitioning to the "concerned" tachyarrhythmia detection state at block 226.

In various examples, the selected sensing channel may be used during the "concerned" tachyarrhythmia detection state for determining RRIs and updating VT/VF interval counters and/or non-tachyarrhythmia interval counters. The ventricular sensed event signals received from the selected sensing channel may be used for setting time segments over which morphology features are determined from the cardiac electrical signal received from the morphology signal channel 87. For example, a segment of the cardiac electrical signal received from the morphology signal channel 87 may be buffered in memory 82. When a ventricular sensed event signal is received from the selected sensing channel, a time segment of the cardiac electrical signal received from the morphology signal channel 87 that extends earlier and later than the ventricular sensed event signal may be processed and analyzed by the control circuit 80 for determining various signal morphology features used for tachyarrhythmia detection. Example methods for detecting VT/VF during the "concerned" tachyarrhythmia detection state are described below in conjunction with FIG. 14.

Referring again to block 212, when the candidate sensing channel reliability criteria are not met, the non-candidate sensing channel may be selected at block 214. Control circuit 80 does not transition to the "concerned" tachyarrhythmia detection state when the non-candidate sensing channel is selected. In this case, control circuit 80 may return to the "unconcerned" sensing state at block 218 because the non-candidate sensing channel determined to be the reliable sensing channel has not reached an NID (or other threshold number of VT/VF intervals).

Figure 12:
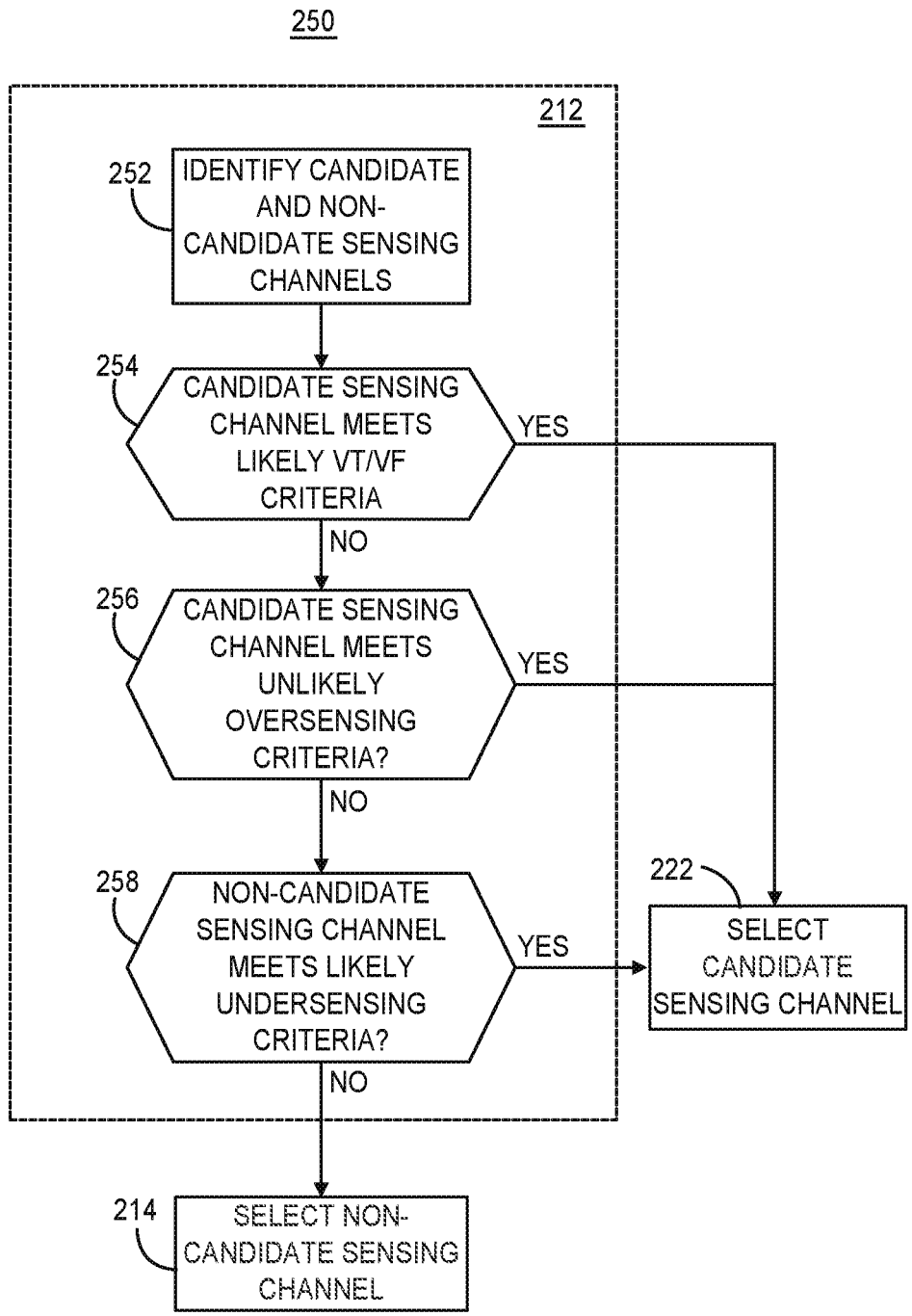
FIG. 12 is a flow chart of a method for determining whether various sensing channel reliability criteria are met for selecting a sensing channel and sensed cardiac electrical signal for use in tachyarrhythmia detection according to some examples.

FIG. 12 is a flow chart 250 of a method for determining whether sensing channel reliability criteria are met for selecting the candidate sensing channel or the non-candidate sensing channel for VT/VF detection according to some examples. Blocks 252, 254, 256 and 258 may correspond to analysis of sensed event data that may be performed at block 212 of FIG. 10 for determining if sensing channel reliability criteria for selecting the candidate sensing channel are met. Block 222 in FIG. 12 corresponds to identically numbered block 222 of FIG. 10 where control circuit 80 selects the candidate sensing channel for VT/VF detection in response to reliability criteria being met in at least one of the analyses performed at blocks 254, 256 or 258. Block 214 in FIG. 12 corresponds to identically numbered block 214 of FIG. 10 where control circuit 80 selects the non-candidate sensing channel in response to none of the criteria for selecting the candidate sensing channel being met at blocks 254, 256 and 258 as described below.

At block 252, control circuit 80 may identify the candidate sensing channel and the non-candidate sensing channel based on the respective VT/VF interval count for each respective sensing channel. In one example, the sensing channel 83 or 85 associated with the highest VT/VF interval count is selected as the candidate sensing channel. The candidate sensing channel may be the sensing channel for which the NID is reached for detecting VT or VF. In the example shown, three different combinations of reliability criteria are applied to the sensed event metrics of one or both sensing channels at decision blocks 254, 256 and 258 for determining if the candidate sensing channel can be selected for VT/VF detection.

The first combination of reliability criteria that control circuit 80 may apply to the sensed event metrics at block 254 can be likely VT/VF criteria. The likely VT/VF criteria may include one or more thresholds or other required values to be met by one or more sensed event metrics determined for at least the candidate sensing channel that indicate that a fast ventricular rhythm is highly likely. In one example, the likely VT/VF criteria may include a criterion applied to the matched events ratio and a criterion applied to the maximum RRI determined for the candidate sensing channel. For instance, when the matched events ratio is greater than or equal to a threshold ratio and the maximum RRI is less than a threshold interval, control circuit 80 may determine that the likely VT/VF criteria are met by the sensed event metrics for the candidate sensing channel. Control circuit 80 may select the candidate sensing channel at block 222. When the NID is reached (or is already reached) by the selected sensing channel, control circuit 80 may transition to the "concerned" tachyarrhythmia detection state as described above in conjunction with FIG. 5.

Referring still to block 254, in one example, control circuit 80 may compare the matched events ratio to a threshold ratio of 0.8, 0.9, or 1.0, as examples, for determining if the likely VT/VF criteria are met. The matched events ratio threshold can be representative of the percentage of oversensed events that can be tolerated during tachyarrhythmia detection. For instance, when VF is detected based on an NID of 30 out of 40 most recent RRIs being VF intervals, control circuit 80 may compare the matched events ratio for the candidate sensing channel to a threshold ratio of 0.9 indicating that up to 10% of the ventricular events sensed by the candidate sensing channel may be unmatched, oversensed events. That percentage of oversensed events may be tolerable, however, in achieving a desired sensitivity to detecting VF. The threshold ratio may be programmable by a user and/or may depend on the programmed NID for VT/VF detection. In some examples, the threshold ratio may be different for when both VT detection and VF detection are enabled (e.g., programmed on) than when VT detection is disabled (e.g., programmed off) and only VF detection is enabled. The threshold ratio applied when the VT interval counter has reached the NID may be different than the threshold ratio applied when the VF interval counter has reached the NID. When the matched events ratio for the candidate sensing channel is less than the threshold ratio, control circuit 80 may determine that the reliability criteria corresponding to likely VT/VF are unmet at block 254. A high percentage of unmatched events may indicate likely oversensing by the candidate sensing channel instead of likely VT/VF.

Additionally or alternatively at block 254, the likely VT/VF criteria may include a threshold interval applied to the maximum RRI determined for the candidate sensing channel. The threshold interval may be set to the longest of the programmed (and enabled) VT or VF detection intervals plus an offset. The offset used to set the threshold interval may be 0 ms, 20 ms, 40 ms or any other predetermined (e.g., programmable) value. When the maximum RRI that is buffered in memory 82 over the most recent validation time interval for the given sensing channel is less than the threshold interval, a fast ventricular rhythm that is a true tachyarrhythmia may be present. The fast intervals may represent a concerning, potentially shockable heart rhythm warranting further analysis of the cardiac electrical signals for VT/VF detection. The VF detection interval may be 280 to 360 ms and the threshold interval may be 300 to 400 ms, as examples. In an illustrative example, the VF detection interval can be 320 ms and the threshold interval can be 360 ms. If the maximum RRI is less than 360 ms, control circuit 80 may determine that the likely VT/VF criteria are met at block 254. In other examples, the threshold interval applied at block 254 may be a predetermined interval that is not necessarily set based on the programmed VT/VF intervals and may be between 350 and 500 ms as examples. When the maximum RRI determined for the candidate sensing channel is greater than or equal to the threshold interval, the likely VT/VF criteria may be determined to be unmet at block 254 by control circuit 80. In other examples, rather than (or in addition to) comparing the maximum RRI to a threshold interval, control circuit 80 may compare another RRI metric determined from the validation time interval, e.g., a mean, median or specified percentile or nth longest RRI, to a threshold interval at block 254.

In one example, when the maximum RRI buffered during the validation time interval for the candidate sensing channel is less than the VF detection interval plus an offset or less than the VT detection interval plus an offset (when VT detection is enabled) and the matched events ratio is greater than a respective threshold, control circuit 80 may determine that the reliability criteria are met for the candidate sensing channel. The combination of a matched events ratio being greater than a threshold ratio and a maximum RRI (or other RRI metric) being less than a threshold interval for the candidate sensing channel can be evidence that a true VT or VF is occurring. In this case, the candidate sensing channel is deemed reliable for detecting VT or VF. The candidate sensing channel (and associated cardiac electrical signal and sensing electrode vector) may be selected as the sensing channel for VT/VF detection at block 222. When a high matched sensed event ratio is accompanied by all (or a high percentage of) RRIs being less than the RRI threshold, the fast rate and high percentage of matched ventricular sensed event signals from the candidate sensing channel warrants transition to the "concerned" tachyarrhythmia detection state to promote a high sensitivity to VT/VF detection.

When the likely VT/VF criteria are not met at block 254, control circuit 80 may apply a second combination of reliability criteria to the sensed event metrics at block 256. The second combination of reliability criteria may indicate unlikely oversensing by the candidate sensing channel. If the candidate sensing channel is oversensing, the threshold number of VT/VF intervals reached by the candidate sensing channel causing a transition into the verification state may include false VT/VF intervals. If the candidate sensing channel is unlikely to be oversensing, the threshold number of VT/VF intervals reached by the candidate sensing channel is likely valid, warranting a transition to the "concerned" tachyarrhythmia detection state for further processing and analysis of the sensed cardiac electrical signals for VT/VF detection.

The unlikely oversensing criteria applied at block 256 to the sensed event data by control circuit 80 may include a comparison of the noisy cycle count of the candidate sensing channel to a signal noise threshold. The noisy cycle count can be representative of the noise present in the cardiac electrical signal sensed by the candidate sensing channel. When the noisy cycle count for the candidate sensing channel is greater than the signal noise threshold, the cardiac electrical signal sensed via the sensing electrode vector coupled to the candidate sensing channel may be too noisy to be reliable for VT/VF detection. The signal noise threshold may represent the percentage of ventricular sensed event signals due to oversensed noise that may be tolerated during VT/VF detection.

In one example, the signal noise threshold is 0 such that all ventricular sensed event signals during the most recent validation time interval for the candidate sensing channel are required to have an associated signal pulse count that is less than a specified noise threshold, e.g., less than 4 signal pulses. If any of the ventricular sensed event signals during the most recent validation time interval are associated with a signal pulse count that is greater than or equal to the noise threshold, e.g., greater than or equal to 4, the noisy cycle count is greater than the signal noise threshold of 0 such that the unlikely oversensing criteria are unmet at block 256 in some examples. In other examples, the signal noise threshold may be higher than 0, e.g., 1, 2, 3 or more, and may depend in part on the duration of the predetermined validation time interval and/or the number of ventricular sensed event signals occurring during the validation time interval. The signal noise threshold may be expressed as a percentage of all ventricular sensed event signals during the validation time interval rather than a fixed number. For example, when more than 5% or 10% of the ventricular event signals are determined to be noisy cycles, the signal noise threshold may be met. The signal noise threshold may be programmable by a user. When the signal noise threshold is met, oversensing by the candidate sensing channel can be likely rather than unlikely, leading to a negative decision at block 256.

Control circuit 80 may additionally or alternatively compare the amplitude ratio determined for the candidate sensing channel to a threshold amplitude ratio at block 256. The lower the amplitude ratio, the more similar the sensed event peak amplitudes are of the matched and unmatched events sensed by the candidate sensing channel. The more similar the sensed event peak amplitudes, the less likely unmatched events are oversensed P-wave, T-waves or noise and more likely that all are true R-waves or fibrillation waves (of similar amplitude). The threshold amplitude ratio may be set between 0.8 to 1.4, as examples. In one example, the threshold amplitude ratio can be 1.3 and may be programmable by a user. When the amplitude ratio between matched and unmatched events is greater than the threshold amplitude ratio for the candidate sensing channel, the unmatched events generally have an amplitude lower than the matched events. Unmatched events having relatively low amplitude compared to the amplitude of the matched events may be low amplitude oversensed P-waves, T-waves, or myopotential noise, for instance. An amplitude ratio determined as the representative amplitude of matched events to the representative amplitude of unmatched events that is greater than the threshold amplitude ratio, therefore, may indicate that the candidate sensing channel is unreliable for tachyarrhythmia detection due to likely oversensing.

Still referring to block 256, additionally or alternatively, control circuit 80 may compare the amplitude ratio and/or a representative metric (e.g., mean, median, minimum, maximum, etc.) of the amplitudes of sensed event signals determined for the candidate sensing channel to the amplitude ratio and/or a representative sensed event amplitude metric determined for the non-candidate sensing channel. In one example, the median sensed event amplitude determined from all sensed event data stored for the candidate sensing channel over the most recent predetermined validation time interval is compared to the median sensed event amplitude determined from all sensed event data stored for the non-candidate sensing channel over the same validation time interval. When the mean sensed event amplitude determined for the candidate sensing channel is greater than the mean sensed event amplitude determined for the non-candidate sensing channel, control circuit 80 may determine that the sensing channel reliability criteria are met based on the unlikely oversensing criteria being met at block 256.

In some instances, a comparison of the mean sensed event amplitudes of the candidate sensing channel and the non-candidate sensing channel may lead to a false confirmation of unlikely oversensing. The sensitivity of each sensing channel 83 and 85 can be independently programmable. In some cases, the candidate sensing channel may be programmed to a relatively lower sensitivity setting than the non-candidate sensing channel. The candidate sensing channel may be reliably sensing relatively low amplitude R-waves or fibrillation waves having peak amplitudes consistently greater than the programmed sensitivity. The mean sensed event amplitude for the candidate sensing channel may be relatively low. The non-candidate sensing channel may be undersensing some R-waves or fibrillation waves due to the higher sensitivity setting. The peak amplitudes of the sensed R-waves or fibrillation waves, however, may be relatively high resulting in a relatively higher mean sensed event amplitude for the non-candidate sensing channel than the candidate sensing channel.

In an illustrative example, the candidate sensing channel may have a programmed sensitivity setting of 0.15 mV with reliable sensing of R-waves having a mean sensed event amplitude of 0.2 mV. The non-candidate sensing channel may have a programmed sensitivity setting of 0.45 mV with some undersensing of R-waves having a mean sensed event amplitude of close to 0.45 mV. In this situation, a comparison of the mean sensed event amplitudes yields the result of the candidate sensing channel having a mean sensed event amplitude that is less than the non-candidate sensing channel, which could cause the criteria at block 256 to be unmet.

As such, control circuit 80 may determine a mean ASTR for each sensing channel to account for differences in the programmed sensitivity settings of each sensing channel relative to the sensed event peak amplitudes.

In some examples, the criteria applied at block 256 relating to reliable sensing by the candidate sensing channel with unlikely oversensing may include a comparison of the mean ASTR of the candidate sensing channel to the mean ASTR of the non-candidate sensing channel. A difference or a ratio (or other quantitative relationship) of the mean ASTRs may be compared to a threshold. In an example, the ratio of the mean ASTR determined from the sensed event data stored for the candidate sensing channel to the mean ASTR determined from the sensed event data stored for the non-candidate sensing channel may be compared to a threshold value. The threshold value may be between 0.7 and 1.2 and is 0.9 in an example. When the ratio of mean ASTRs is greater than the specified threshold value, control circuit 80 may determine that the candidate sensing channel is reliable for use in detecting VT/VF ("yes" branch of block 256).

When the unlikely oversensing criteria are met at block 256 based on sensed event metrics determined for at least the candidate sensing channel, control circuit 80 may select the candidate sensing channel at block 222. Because the candidate sensing channel reached the threshold number of VT/VF intervals to cause transition to the verification state, which may be the NID for detecting VT or VF, and oversensing by the candidate sensing channel is unlikely based on the criteria applied at block 256, further processing and analysis of the sensed cardiac electrical signals for VT/VF detection is warranted.

In some examples, when likely VT/VF criteria are not met ("no" branch of block 254) and/or unlikely oversensing criteria are not met ("no" branch of block 256), the reliability criteria for selecting the candidate sensing channel may still be met when the sensed event metrics determined for at least the non-candidate sensing channel meet likely undersensing criteria as determined at block 258. In the examples described in conjunction with blocks 254 and 256, sensed event data determined for the candidate sensing channel may be compared to thresholds or other required values for determining if the candidate sensing channel meets reliability criteria for being selected as the sensing channel used for VT/VF detection. In other examples, the reliability criteria may include analysis of the sensed event data stored for the non-candidate sensing channel as an indication that the non-candidate sensing channel is not reliable. When the non-candidate sensing channel is found unreliable based on likely undersensing criteria, for example, the candidate sensing channel may be selected as the reliable sensing channel for VT/VF detection.

The non-candidate sensing channel may not reach the threshold number of VT/VF intervals required to transition to the verification state because undersensing is occurring in the non-candidate sensing channel. When the non-candidate sensing channel is undersensing R-waves, the candidate sensing channel that has reached a threshold number of VT/VF intervals may be deemed reliable based on the likely undersensing criteria being met at block 258 by the sensed event metrics determined for the non-candidate sensing channel.

The likely undersensing criteria applied at block 258 may include one or more thresholds or other values required to be met by sensed event metrics buffered during the validation time interval that are evidence of undersensing by the non-candidate sensing channel. For example, evidence of undersensing may include relatively low sensed event amplitudes which may be an indication that some true R-waves or true fibrillation waves may have a peak amplitude that is less than the R-wave sensing threshold. Evidence of undersensing may include relatively long RRIs which may correspond to the sum of two true RRIs with an undersensed R-wave or one or more fibrillation waves occurring during the relatively long RRI. Evidence of undersensing may include a relatively high matched events ratio, e.g., all ventricular sensed event signals produced by the non-candidate sensing channel being matched in time to a ventricular sensed event signal produced by the candidate sensing channel. By default, the candidate sensing channel may be determined to be reliable when the non-candidate sensing channel is likely to be undersensing based on the likely undersensing criteria being met at block 258. In this case, reliability criteria may be met at block 258 for selecting the candidate sensing channel for VT/VF detection when the non-candidate sensing channel sensed event data meets likely undersensing criteria applied at block 258.

In an illustrative example, the likely undersensing criteria may be determined to be met by control circuit 80 when the maximum RRI (or another RRI metric) determined for the non-candidate sensing channel is greater than an undersensing RRI threshold interval. The undersensing RRI threshold interval may be set to a relatively long interval that is a multiple or percentage of the VT or VF detection interval or a specified interval such as 1 second, 1.2 seconds, or 1.5 seconds as examples. For instance, when the maximum RRI for the non-candidate sensing channel is at least 1500 milliseconds, control circuit 80 may determine that likely undersensing criteria are met. In some examples, the undersensing RRI threshold interval may be set based on a median or mean RRI determined from the sensed event data of the candidate sensing channel. For example, if the maximum RRI of the non-candidate sensing channel is greater than a percentage, e.g., 70%, 80%, or 90%, of twice the median or mean RRI of the candidate sensing channel, the non-candidate sensing channel may be undersensing R-waves. Control circuit 80 may determine that the likely undersensing criteria are met at block 258.

Additionally or alternatively, control circuit 80 may compare a representative sensed event amplitude determined for the non-candidate sensing channel to an amplitude threshold at block 258. The amplitude threshold may be a predetermined multiple of the sensing floor (e.g., a multiple of the programmed sensitivity). The predetermined multiple of the sensing floor may be 2, 3, or 4 as examples. The predetermined multiple may represent a minimum safety margin for sensing R-waves for reliably detecting VT/VF. In one example, when the mean sensed event amplitude (or median, maximum, minimum, specified percentile or other metric of the sensed event amplitudes) determined for the non-candidate sensing channel is less than three times the programmed sensitivity, the likely undersensing criteria may be determined to be met by control circuit 80.

In one example, when the mean sensed event amplitude is less than three times the programmed sensitivity and the maximum RRI is greater than 1500 ms for the non-candidate sensing channel, the reliability criteria for selecting the candidate sensing channel for VT/VF detection are met at block 258. The candidate sensing channel may be deemed reliable based on the likelihood of undersensing in the non-candidate sensing channel.

The reliability criteria applied by control circuit 80 to the sensed event data buffered in memory 82 may include one or more combinations of criteria or thresholds that when met in at least one combination, e.g., as shown by blocks 254, 256 and 258 in FIG. 12, may satisfy the reliability criteria for selecting the candidate sensing channel at block 212 of FIG. 10. In various examples, one combination of criteria that verifies likely VT/VF (block 254 of FIG. 12), a second combination of criteria that verifies reliable sensing (and unlikely oversensing) by the candidate sensing channel (block 256 of FIG. 12), and/or a third combination of criteria that verifies likely undersensing by the non-candidate sensing channel (block 258 of FIG. 12) may be included in the reliability criteria applied at block 212 of FIG. 10. Fewer than or more than three combinations of criteria applied to the sensed event metrics of one or both sensing channels may be included in the reliability criteria for verifying the likelihood of a true fast ventricular rhythm, the reliable sensing with unlikely oversensing by the candidate sensing channel, and/or the likely undersensing of the non-candidate sensing channel in various examples.

Furthermore, in any of the examples of reliability criteria applied for selecting the candidate sensing channel, all sensed event metrics or any combination of the sensed event metrics determined for the candidate sensing channel may be compared to the analogous sensed event metrics determined for the non-candidate sensing channel. Control circuit 80 may determine that the sensed event metrics determined for the candidate sensing channel relative to the sensed event metrics determined for the non-candidate sensing channel indicate that the candidate sensing channel is more reliable than the non-candidate sensing channel for VT/VF detection. For example, a relatively higher matched events ratio, a relatively lower matched to unmatched event amplitude ratio, a relatively lower noisy cycle count, a relatively higher representative sensed event amplitude, and/or a relatively shorter maximum RRI may all be relative indications of greater reliability of the candidate sensing channel compared to the non-candidate sensing channel. When these relative comparisons for indicating that the candidate sensing channel is more reliable are not met, the non-candidate sensing channel may be selected as the reliable sensing channel.

Figure 13:
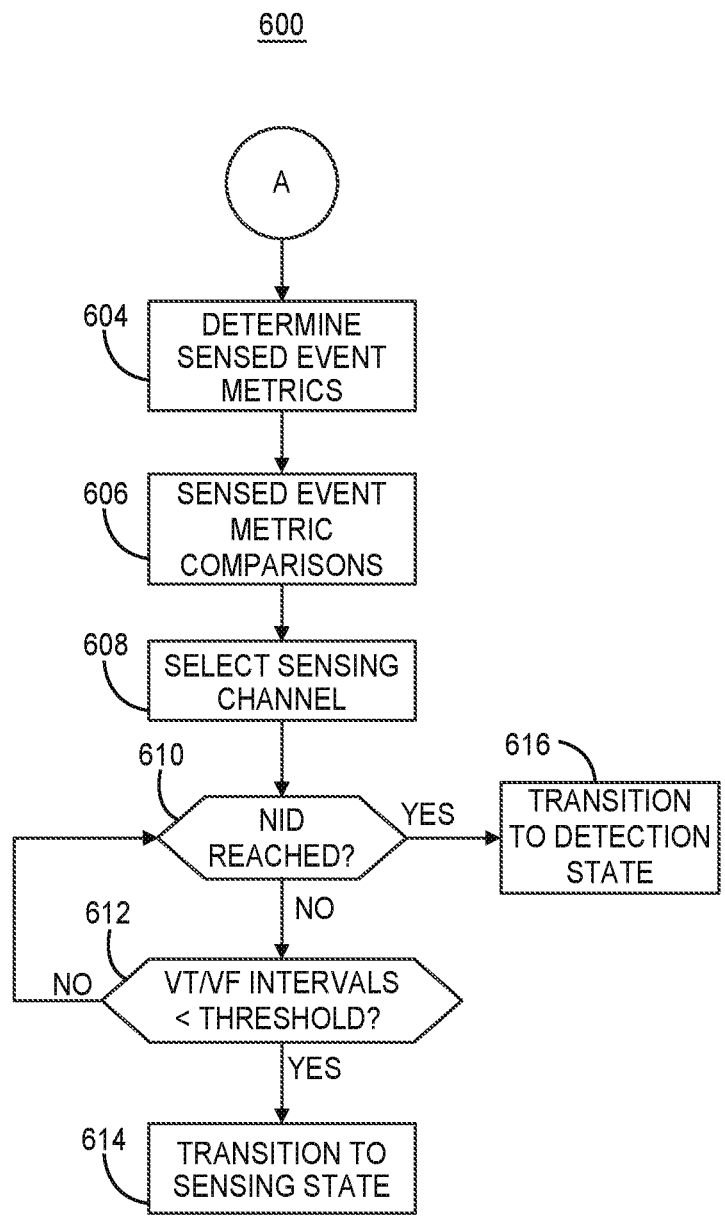
FIG. 13 is a flow chart of a method for selecting a sensing channel and sensed cardiac electrical signal for use in tachyarrhythmia detection according to another example.

FIG. 13 is a flow chart 600 of a method for selecting a sensing channel for VT/VF detection according to another example. The method of flow chart 600 may be performed during the verification state of block 200 shown in FIG. 5 in some examples. As such, when RRIs determined for at least one of the sensing channels 83 or 85 are determined to be tachyarrhythmia intervals and an NID is reached (or other predetermined threshold), control circuit 80 may transition to the verification state and advance from the process of flow chart 102 of FIG. 6 to the process of flow chart 600 of FIG. 13, as indicated by the connector "A." As indicated previously, the process of verifying a reliable sensing channel may be performed when only one sensing channel, not both, reach an NID. As such, the flow chart 600 may be performed when a single sensing channel reaches the NID first. When both sensing channels reach the NID concurrently, control circuit 80 may advance directly to the "concerned" tachyarrhythmia detection state and select a default sensing channel or a sensing channel previously selected based on a prior analysis of reliability criteria. In still other examples, the process of FIG. 13 may be performed when one or both sensing channels 83 and 85 have reached the NID.

At block 604, control circuit 80 determines sensed event metrics for each sensing channel 83 and 85. The sensed event metrics may be determined from the buffered sensed event data that is stored in memory 82. The sensed event metrics may include any of the examples listed herein, including but not limited to any combination of the matched events ratio, amplitude ratio, noisy cycle count, ASTR metrics such as the mean, median, maximum or minimum ASTR, RRI metrics such as the mean, median, maximum or minimum RRI, and/or sensed event amplitude metrics such as the mean, median, maximum or minimum sensed event amplitude.

Control circuit 80 can perform a comparative analysis of the sensed event metrics determined for each sensing channel 83 and 85 at block 606 to select a sensing channel at block 608 for VT/VF detection. The comparative analysis may include comparisons of one or more of the sensed event metrics determined for sensing channel 83 to the respective sensed event metrics determined for sensing channel 85. The comparative analysis may additionally or alternatively include comparisons of one or more of the sensed event metrics determined for each sensing channel 83 and/or 85 to predefined selection criteria that verifies the reliability of a given sensing channel 83 or 85, which may include criteria for verifying that oversensing and/or undersensing by the sensing channel is unlikely.

In some examples, any of the example criteria described above in conjunction with FIG. 12 may be applied to the sensed event metrics using each combination of sensing channel 83 identified as the candidate sensing channel and sensing channel 85 identified as the non-candidate sensing channel. In some examples, the analysis described in conjunction with FIG. 12 could be repeated with sensing channel 83 identified as the non-candidate sensing channel and sensing channel 85 identified as the candidate sensing channel. In some instances, one sensing channel may reach the NID and the other sensing channel may have reached a lower threshold count of VT/VF intervals but not yet reached the NID. In this case, both sensing channels may be evaluated as a candidate sensing channel. When at least one of the criteria are met for selecting a sensing channel as described above in conjunction with FIG. 12, the selected sensing channel output may be used for VT/VF detection. In some cases, reliability criteria may be met for selecting both sensing channels 83 and 85, e.g., at least one combination of criteria of decision blocks 254, 256 and 258 being met when sensing channel 83 is the candidate sensing channel and when sensing channel 83 is the non-candidate sensing channel. In this case, a default sensing channel may be selected or additional comparisons, e.g., between sensed event metrics determined from each sensing channel, may be made for selecting the sensing channel for VT/VF detection.

In addition to or instead of one or all of the combinations of criteria described in conjunction with FIG. 12, control circuit 80 may perform comparisons between sensed event metrics determined for each sensing channel 83 and 85 to identify the sensing channel 83 or 85 having the lowest amplitude ratio between matched events and unmatched events, the highest matched events ratio between the number of matched events and the total number of ventricular sensed event signals during the validation time interval, and/or the lowest noisy cycle count. One sensing channel 83 or 85 may be identified as the more reliable sensing channel based on one or more of the matched events ratio, amplitude ratio and/or noisy cycle count or a comparison of all three of these sensed event metrics between the two sensing channels. For example, when one sensing channel (e.g., 83 or 85) has at least one of the matched events ratio, amplitude ratio or noisy cycle count having a value that corresponds to higher reliability (lower likelihood of oversensing and/or undersensing), that sensing channel may be selected at block 608.

In order to select a sensing channel at block 608, control circuit 80 may require that the sensing channel 83 or 85 identified as the more reliable sensing channel based on the matched events ratio, amplitude ratio, and/or noisy cycle count also meet one or more additional selection criteria such as the maximum RRI being less than an RRI threshold and/or the mean sensed event amplitude being greater than or equal to a predetermined multiple of the programmed sensitivity (sensing floor) for that channel. In some examples, a tiered process of comparing sensed event metrics between sensing channels may be performed. To illustrate, control circuit 80 may first select the sensing channel having the highest matched events ratio. Control circuit 80 may then verify that the sensing channel with highest matched events ratio meets one or more secondary requirements such as a low noisy cycle count, a maximum RRI less than a threshold interval, and/or a minimum sensed event peak amplitude that is greater than a predetermined multiple of the sensitivity. If any or all of the secondary criteria are not met, control circuit 80 may select the other sensing channel and verify that the secondary criteria are met for the other sensing channel, in an example. The secondary criteria may be defined according to predefined thresholds or defined based on relative comparisons to the sensed event metrics determined for the non-candidate sensing channel, e.g., any of the relative comparisons described above.

Based on the comparative analysis of the sensed event metrics, control circuit 80 selects the sensing channel 83 or 85 that is determined to be the more reliable sensing channel at block 608 and transitions to the "concerned" tachyarrhythmia detection state at block 616, if the NID has been reached (block 610) by the VT/VF interval counters associated with the selected sensing channel. When the NID has not been reached by the VT/VF interval counters for the selected sensing channel ("no" branch of block 610), control circuit 80 may remain in the verification state until the NID is reached for the selected sensing channel or return to the "unconcerned" sensing state at block 614. In some examples, control circuit 80 may return to the "unconcerned" sensing state after the VT/VF interval counts for at least the selected sensing channel or both sensing channels fall below a threshold count as determined at block 612.

In some examples, the threshold VT/VF interval count for transitioning to the verification state may be the NID and if the selected sensing channel is the channel that reached the NID to cause transition to the verification state, control circuit 80 transitions directly to the "concerned" tachyarrhythmia detection state at block 616 upon selecting the sensing channel. In other examples, the sensing channel selected at block 608 may not have reached the NID required to transition to the "concerned" tachyarrhythmia detection state at block 616 such that control circuit 80 may remain in the verification state by waiting for the NID to be reached by the selected sensing channel at block 610 or for the VT/VF interval count for the selected sensing channel (or both sensing channels) to fall below a threshold for transitioning back to the "unconcerned" sensing state. As described above, the threshold applied to the VT/VF interval counters for one or both sensing channels at block 612 for transitioning back to the sensing state may be less than the NID and may be different than the threshold required to transition to the verification state.

In the example of FIG. 13, control circuit 80 may always select one of the sensing channels 83 or 85 identified as the more reliable sensing channel for VT/VF detection in the tachyarrhythmia detection state. While the reliability criteria are intended to avoid selecting the output of a sensing channel for input to the tachyarrhythmia detection algorithm that may include oversensing or undersensing, in some instances the selected sensing channel may be oversensing or undersensing resulting in inaccurate VT/VF interval counts. However, once in the tachyarrhythmia detection state, control circuit 80 may perform cardiac signal morphology analysis or apply other VT/VF detection criteria that enables control circuit 80 to detect a shockable VT/VF rhythm even when the NID is not reached due to undersensing and/or withhold a shockable VT/VF rhythm detection even when the NID is reached due to oversensing by the selected sensing channel.

Figure 14:
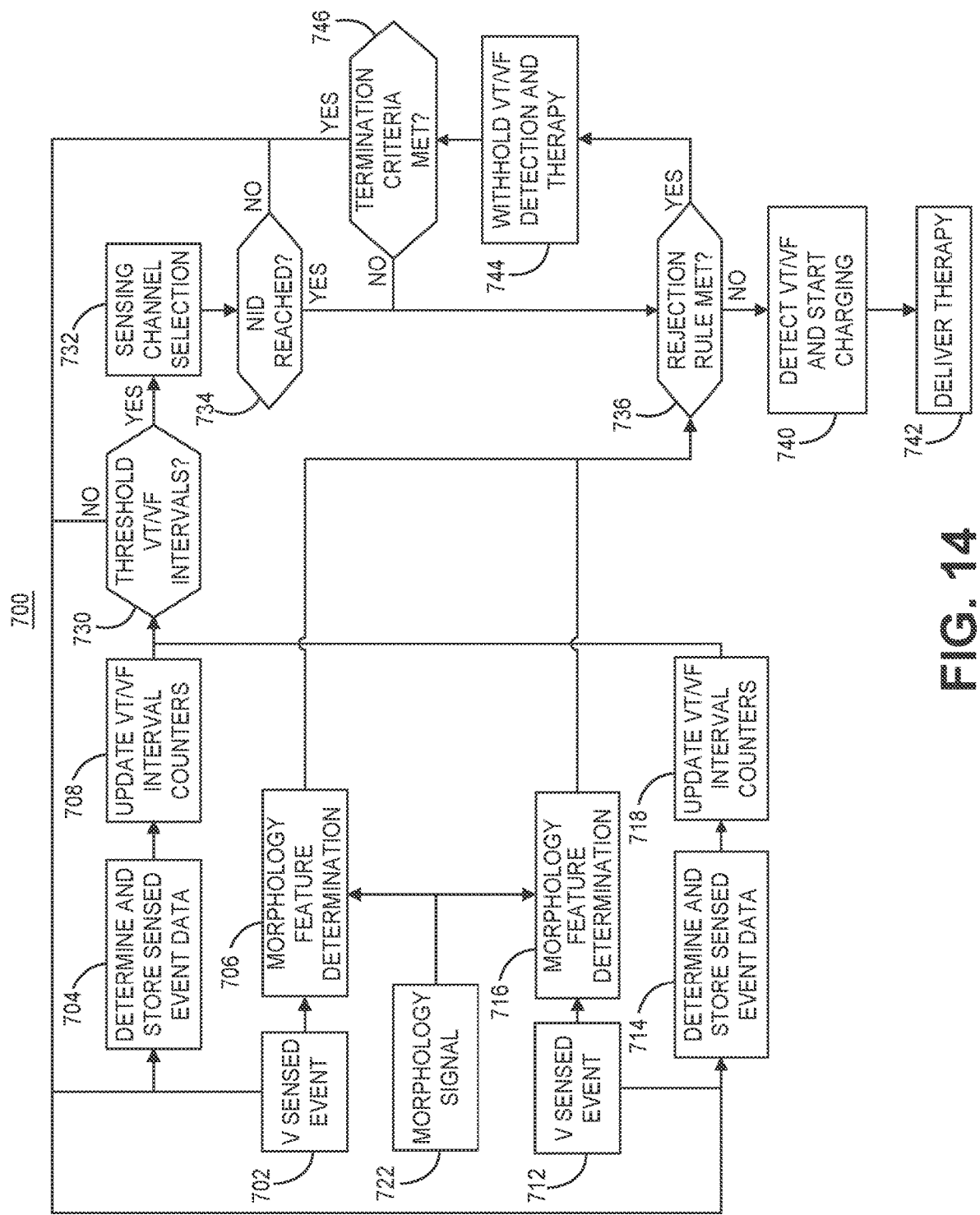
FIG. 14 is a flow chart of a method for detecting ventricular tachyarrhythmia according to some examples.

FIG. 14 is a flow chart 700 of a method that may be performed by a medical device for detecting a shockable VT/VF rhythm according to some examples. Control circuit 80 receives ventricular sensed event signals from each of sensing channels 83 and 85 at blocks 702 and 712. The ventricular sensed event signals are received as they are generated by each sensing channel 83 and 85 and may or may not be cross-channel, time-matched ventricular sensed event signals. In response to each ventricular sensed event signal, control circuit 80 may determine and buffer sensed event data in memory 82 corresponding to ventricular sensed event signals received from sensing channel 83 at block 704 and corresponding to ventricular sensed event signals received from sensing channel 85 at block 714. As described above, the sensed event data determined and stored for each ventricular sensed event signal may include, but is not limited to, a time-based, cross-channel matched or unmatched event classification, the RRI, the sensed event peak amplitude, the ASTR, and the signal pulse count (during a noise analysis time interval). The sensed event data, such as the sensed event peak amplitude and the signal pulse count, can be determined from the cardiac electrical signal sensed by the respective sensing channel 83 or 85 that generated the ventricular sensed event signal. In some examples, however, additional sensed event data may be determined from a segment of the cardiac electrical signal received from the morphology signal channel 87.

At block 708, control circuit 80 updates a VT interval counter, a VF interval counter, and/or a combined VT/VF interval counter based on the RRIs determined at block 704 for ventricular sensed event signals received from sensing channel 83. At block 718, control circuit 80 updates a VT interval counter, a VF interval counter, and/or a combined VT/VF interval counter based on the RRIs determined at block 714 for ventricular sensed event signals received from sensing channel 85.

At block 722, control circuit 80 receives the cardiac electrical signal, referred to hereafter as the "morphology signal," sensed by the morphology signal channel 87. Upon receiving a ventricular sensed event signal from either sensing channel 83 or 85, at blocks 706 and 716 respectively, control circuit 80 may determine one or more morphology features from the morphology signal. As described above in conjunction with FIG. 7, the morphology features determined at blocks 706 and 716 may be determined from a time segment (e.g., time segments 471 and 473 shown in FIG. 7) of the morphology signal that includes the time of the ventricular sensed event signal and may have a total duration between 150 to 500 ms, as examples. The duration of the morphology signal segment may encompass an expected QRS waveform width or at least an expected R-wave width such that when the ventricular sensed event signal corresponds to a true R-wave, the R-wave is within the morphology signal segment. Morphology features determined at blocks 706 and 716 can correspond to features of one "beat," or one ventricular depolarization, as represented by the sensed signal. Some morphology features may be determined over a portion of the morphology signal segment and are representative of the morphology of the sensed signal. Such features may be referred to as "beat" morphology features. In some examples, the morphology signal segment may have a duration that is longer than the expected QRS width so that the morphology signal segment extends before and/or after the sensed signal and may include a baseline portion of the morphology signal. Morphology features determined from sample points spanning the entire morphology signal segment may be referred to as "gross" morphology features because such features are representative of the morphology signal that is not necessarily limited to the waveform of the sensed signal, which may or may not be an R-wave. The gross morphology features, for example, may be correlated to noise present in the morphology signal. The morphology features may be buffered in memory 82 for each sensing channel 83 and 85 and in conjunction with a respective ventricular sensed event signal and associated sensed event data.

The morphology features determined at blocks 706 and 716 may include a morphology template matching score determined by comparing the morphology signal segment (or portion thereof) to a morphology template stored in memory 82, which may correspond to a normal sinus rhythm R-wave or QRS waveform during a supraventricular rhythm. The morphology template may be previously established by control circuit 80 from one or more R-waves in the morphology signal. The morphology matching score may be determined by comparing wavelet transform coefficients determined from the morphology signal segment to wavelet transform coefficients of the previously established morphology template stored in memory 82. Other waveform template comparisons can be made for determining a morphology matching score between the waveform of the morphology signal that coincides in time with the ventricular sensed event signal.

Morphology features determined from the cardiac electrical signal segment received from the morphology signal channel 87 may include a muscle noise pulse count, a normalized mean rectified amplitude (NMRA), and a maximum pulse width. The NMRA may be determined by determining an average sample point amplitude (e.g., by summing all sample point amplitudes and dividing by the number of sample points in the cardiac electrical signal segment) and dividing the average sample point amplitude by the maximum sample point amplitude of the entire signal segment. In some examples, control circuit 80 may divide the cardiac signal segment into multiple sub-segments and determine the NMRA for each subsegment. A NMRA of the entire cardiac signal segment may then be determined by control circuit 80 as the average of the NMRAs determined for the sub-segments.

Morphology features that may be determined at blocks 706 and 716 may include a polarity pattern. Control circuit 80 may identify the waveform in the morphology signal segment as being biphasic having a positive peak followed by a negative peak; biphasic having a negative peak followed by a positive peak; monophasic having a positive dominant peak, or monophasic having a negative dominant peak. Another example morphology feature that may be determined is a peak time interval determined as the time interval between the maximum peak and the minimum peak of the morphology signal segment.

Yet another example of a morphology feature that may be determined at blocks 706 and 716 is a signal width. In one example, the signal width is determined as a normalized signal width determined by dividing the signal area by the absolute maximum peak amplitude. For instance, the morphology signal segment may be rectified and all sample point amplitudes in the signal segment (or portion thereof) may be summed to obtain an area defined by the signal segment. The area of the rectified morphology signal segment (or portion thereof) may be divided by the largest absolute peak amplitude of the morphology signal segment to obtain the normalized signal width. Various examples of morphology features that may be determined at blocks 706 and 716 are described in the above-incorporated U.S. Pat. No. 9,956,423 (Zhang, et al.), U.S. Pat. No. 10,470,681 (Greenhut, et al.), U.S. Pat. No. 10,507,332 (Zhang, et al.), U.S. Pat. No. 10,555,684 (Zhang et al.), U.S. Pat. No. 10,561,332 (Zhang, et al.), and U.S. Pat. No. 10,850,113 (Cao, et al.).

As described above, when a VT or VF (or combined VT/VF) interval counter reaches a threshold number of VT/VF intervals (which may be an NID required to detect VT or VF) at block 730, control circuit 80 may analyze the sensed event data for selecting a sensing channel for providing input for detecting a tachyarrhythmia at block 732. Control circuit 80 may transition to a verification state for selecting a sensing channel for VT/VF detection at block 732 as generally described above in conjunction with FIG. 5. Any of the techniques described above for selecting a sensing channel may be performed at block 732. By selecting a sensing channel based on the sensed event data, e.g., by applying reliability criteria to the sensed event data, control circuit 80 selects the cardiac electrical signal and associated data from which input will be received and used for tachyarrhythmia detection. For example, the RRIs determined from the selected cardiac electrical signal sensed by the selected sensing channel and morphology features determined from time segments of the morphology signal buffered in response to ventricular sensed event signals from the selected sensing channel can be used as input for tachyarrhythmia detection.

As such, if the NID is not met at block 734 by the selected sensing channel (e.g., when the non-candidate sensing channel is selected as described above in conjunction with FIG. 12), control circuit 80 may return to the "unconcerned" sensing state by returning to blocks 704 and 714 and continue determining sensed event data buffered in memory 82 as ventricular sensed event signals are received (as indicated at blocks 702 and 704). When the NID is reached by RRIs determined for the selected sensing channel ("yes" branch of block 734), control circuit 80 analyzes the morphology features determined at one of block 706 or block 716 from morphology signal segments corresponding to sensed event signals received from the selected sensing channel. When sensing channel 83 is selected, for example, control circuit 80 analyzes the morphology features determined at block 706 from morphology signal segments and/or cardiac electrical signal segments received from sensing channel 83 that are buffered in response to ventricular sensed event signals from sensing channel 83. When sensing channel 85 is selected, control circuit 80 analyzes the morphology features determined at block 716 from the morphology signal segments and/or cardiac electrical signal segments received from sensing channel 85. The VT/VF interval counts and morphology features stored for the non-selected sensing channel may be ignored for the purposes of tachyarrhythmia detection in some examples.

The morphology features buffered for the selected sensing channel may be analyzed according to one or more rejection rules at block 736. In order for control circuit 80 to detect a shockable VT/VF rhythm at block 740, the VT/VF interval count for the selected sensing channel is required to reach an NID. However, when a rejection rule is satisfied at block 736 based on analysis of morphology features buffered in response to ventricular sensed event signals generated by the selected sensing channel, control circuit 80 may withhold a shockable VT/VF detection based only on the NID being reached by the selected sensing channel at block 744. Control circuit 80 may return to blocks 704/714 without detecting VT/VF based only on the NID being reached by the selected sensing channel.

A rejection rule may be satisfied at block 736 when the morphology feature analysis results in less than a threshold number of confirmed R-waves, when T-wave oversensing criteria are met, when noise detection criteria are met, and/or when supraventricular rhythm criteria are met based on the morphology features, as examples. Various rejection rules and associated morphology features analyzed to determine when a rejection rule is met are disclosed in the above-incorporated U.S. Pat. No. 10,555,684 (Zhang, et al.), U.S. Pat. No. 10,561,332 (Zhang, et al.), U.S. Pat. No. 10,470,681 (Greenhut, et al.), U.S. Pat. No. 10,850,113 (Cao, et al.) and U.S. Pat. No. 9,956,423 (Zhang, et al.). When control circuit 80 determines that a rejection rule is satisfied based on morphology features buffered in response to ventricular sensed event signals generated by the selected sensing channel, control circuit 80 rejects or withholds a VT/VF detection based on or in response to the NID being reached by the selected sensing channel at block 744. A VT/VF therapy is withheld when the NID is reached by the selected sensing channel but a rejection rule is met. Thus, control circuit 80 does not advance to the detected VT/VF state and may not begin charging high voltage capacitors for therapy delivery in some examples when a rejection rule is met. Control circuit 80 may remain in the "concerned" tachyarrhythmia detection state (shown in FIG. 5) and continue to receive cardiac electrical signal and data input based on the selected sensing channel and associated cardiac electrical signal for processing and analysis for tachyarrhythmia detection.

Control circuit 80 may determine if termination criteria are met at block 746. Termination criteria may be met based on a threshold number of consecutive RRIs being greater than a threshold interval, the median RRI consistently being longer than a threshold interval for a termination time interval, and/or VT/VF interval counter reset conditions being met. Example termination criteria are described above in conjunction with FIG. 5. Control circuit 80 may transition back to the "unconcerned" sensing state by returning to blocks 704 and 714 in response to termination criteria being met.

As long as the termination criteria are not met at block 746 during the "concerned" tachyarrhythmia detection state, control circuit 80 continues to analyze the morphology features determined from buffered morphology signal segments for each ventricular sensed event signal received from the selected sensing channel at block 736 for determining the status of one or more rejection rules. When the NID is met by the selected sensing channel and no rejection rules are met at block 736 based on morphology signal feature analysis, control circuit 80 may detect a shockable VT/VF at block 740. The VT/VF interval counts associated with the non-selected sensing channel and any morphology signal features determined from morphology signal segments buffered in response to ventricular sensed event signals received from the non-selected sensing channel may be ignored by control circuit 80 for the purposes of detecting a shockable rhythm once one sensing channel is selected for providing input to the tachyarrhythmia detection algorithm.

Control circuit 80 transitions to the detected VT/VF and charging state of block 106 as shown in FIG. 5 in response to detecting a shockable VT/VF. Therapy delivery circuit 84 may begin charging the high voltage capacitors for delivering a CV/DF shock at block 742 in response to the shockable VT/VF detection. Control circuit 80 delivers one or more therapies at block 742 to terminate the detected VT/VF. Therapy delivery circuit 84 may deliver ATP at block 742 during or before capacitor charging for shock delivery in an attempt to terminate the detected VT/VF prior to delivering a shock. When the shockable VT/VF is still being detected upon completion of capacitor charging, control circuit 80 may deliver a CV/DF shock at block 742.

After delivering a therapy at block 742, control circuit 80 may determine if the therapy is successful in terminating the VT/VF episode. For example control circuit 80 may determine if redetection criteria are met by the RRIs and/or morphology signal features determined for the selected sensing channel at block 742. When redetection criteria are met, one or more additional therapies may be delivered by therapy delivery circuit 84 at block 742. When the VT/VF episode is no longer being detected based on the ventricular sensed event signals received from the selected sensing channel and/or associated morphology features determined from the morphology signal, control circuit 80 may return to the "unconcerned" sensing state by returning to blocks 704 and 714 (not shown explicitly in FIG. 14 for the sake of clarity) after therapy delivery at block 742.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single circuit or unit for purposes of clarity, it should be understood that the techniques of this disclosure may be performed by a combination of units or circuits associated with, for example, a medical device.

In one or more examples, the functions described may be implemented in hardware, software, firmware, or any combination thereof. If implemented in software, the functions may be stored as one or more instructions or code on a computer-readable medium and executed by a hardware-based processing unit. Computer-readable media may include computer-readable storage media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPLAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

Thus, a medical device has been presented in the foregoing description with reference to specific examples. It is to be understood that various aspects disclosed herein may be combined in different combinations than the specific combinations presented in the accompanying drawings. It is appreciated that various modifications to the referenced examples may be made without departing from the scope of the disclosure and the following claims.

What is claimed is:

1. A medical device comprising:
a sensing circuit configured to:
receive a plurality of cardiac electrical signals;
sense first ventricular event signals from a first cardiac electrical signal of the plurality of cardiac electrical signals; and
sense second ventricular event signals from a second cardiac electrical signal of the plurality of cardiac electrical signals;
a control circuit configured to:
determine sensed event data in response to each one of the first ventricular event signals and the second ventricular event signals sensed by the sensing circuit;
detect a first threshold number of tachyarrhythmia intervals from one of the first cardiac electrical signal or the second cardiac electrical signal;
in response to detecting the first threshold number of tachyarrhythmia intervals, select based on the sensed event data one of the first cardiac electrical signal or the second cardiac electrical signal for providing input for tachyarrhythmia detection by:
identifying a candidate signal as one of the first cardiac electrical signal and the second cardiac electrical signal;
identifying a non-candidate signal as a second one of the first cardiac electrical signal and the second cardiac electrical signal;
determining when reliability criteria are met based on the sensed event data; and
selecting one of the first cardiac electrical signal or the second cardiac electrical signal for providing the input for the tachyarrhythmia detection by one of:
selecting the candidate signal for providing the input for the tachyarrhythmia detection in response to the reliability criteria being met; or
selecting the non-candidate signal for providing the input for the tachyarrhythmia detection in response to the reliability criteria not being met; and
detect a tachyarrhythmia based on the selected one of the first cardiac electrical signal or the second cardiac electrical signal; and
a therapy delivery circuit configured to deliver an electrical stimulation therapy in response to the control circuit detecting the tachyarrhythmia.

2. The medical device of claim 1, wherein the control circuit is further configured to determine the sensed event data by:
setting a first match window in response to each of the first ventricular event signals;
determining whether one of the second ventricular event signals is sensed from the second cardiac electrical signal within the first match window;
classifying each of the first ventricular event signals as one of:
a time-based matched event signal in response to one of the second ventricular event signals being sensed from the second cardiac electrical signal within the first match window; or
a time-based unmatched event signal in response to none of the second ventricular event signals being sensed from the second cardiac electrical signal within the first match window;
setting a second match window in response to each of the second ventricular event signals;
determining whether one of the first ventricular event signals is sensed from the first cardiac electrical signal within the second match window;
classifying each of the second ventricular event signals as one of:
a time-based matched event signal in response to one of the first ventricular event signals being sensed from the first cardiac electrical signal within the second match window; or
a time-based unmatched event signal in response to none of the first ventricular event signals being sensed from the first cardiac electrical signal within the second match window.

3. The medical device of claim 2, wherein the control circuit is further configured to:
determine, for the candidate signal, that the classified time-based matched event signals are at least a predetermined percentage of the respective first ventricular event signals or the second ventricular event signals sensed from the candidate signal; and
select the candidate signal for providing the input for the tachyarrhythmia detection at least in response to the classified time-based matched event signals being at least the predetermined percentage of the respective first ventricular event signals or the second ventricular event signals sensed from the candidate signal.

4. The medical device of claim 3, wherein the control circuit is further configured to:
determine the sensed event data by:
determining first peak amplitudes from the candidate signal, the first peak amplitudes associated with the time-based matched event signals; and
determining second peak amplitudes from the candidate signal, the second peak amplitudes associated with the time-based unmatched event signals;
determine a ratio from the first peak amplitudes and the second peak amplitudes;
determine that the ratio meets a threshold ratio; and
select one of the first cardiac electrical signal or the second cardiac electrical signal for providing the input for the tachyarrhythmia detection by selecting the candidate signal in response to the ratio meeting the threshold ratio.

5. The medical device of claim 1, wherein the control circuit is further configured to determine the sensed event data by:
determining first peak amplitudes from the first ventricular event signals; and
determining second peak amplitudes from the second ventricular event signals.

6. The medical device of claim 5, wherein:
the sensing circuit is further configured to:
sense each of the first ventricular event signals from the first cardiac electrical signal by determining a crossing of a first auto-adjusting sensing threshold by the first cardiac electrical signal;
sense each of the second ventricular event signals from the second cardiac electrical signal by determining a crossing of a second auto-adjusting sensing threshold by the second cardiac electrical signal; and
the control circuit is further configured to:

determine the sensed event data by:
  determining a first sensing threshold amplitude for each of the first sensed event signals by determining an amplitude of the first auto-adjusting sensing threshold at the crossing of the first auto-adjusting sensing threshold; and
  determining second sensing threshold amplitudes by determining, for each of the second sensed event signals, an amplitude of the second auto-adjusting sensing threshold at the crossing of the second auto-adjusting sensing threshold;
determine from the first peak amplitudes and the first sensing threshold amplitudes a first amplitude-to-sense threshold ratio associated with the first ventricular event signals;
determine from the second peak amplitudes and the second sensing threshold amplitudes a second amplitude-to-sense threshold ratio associated with the second ventricular event signals; and
select one of the first cardiac electrical signal or the second cardiac electrical signal for providing the input for the tachyarrhythmia detection based on at least the first amplitude-to-sense threshold ratio and the second amplitude-to-sense threshold ratio.

7. The medical device of claim 5, wherein the control circuit is further configured to:
  determine an amplitude metric from the peak amplitudes determined from the non-candidate signal;
  determine that the amplitude metric is less than a threshold amplitude; and
  select one of the first cardiac electrical signal or the second cardiac electrical signal for providing the input for the tachyarrhythmia detection by selecting the candidate signal at least in response to the amplitude metric being less than the threshold amplitude.

8. The medical device of claim 1, wherein the control circuit is further configured to:
  determine the sensed event data by:
    applying a noise analysis time interval to the candidate signal in response to each of the first sensed event signals or the second sensed event signals that are sensed from the candidate signal; and
    determining a signal pulse count from the candidate signal sensed during the noise analysis time interval;
  determine that less than a threshold number of the signal pulse counts are greater than a noisy cycle threshold; and
  select one of the first cardiac electrical signal or the second cardiac electrical signal for providing the input for the tachyarrhythmia detection by selecting the candidate signal at least in response to less than the threshold number of the signal pulse counts being greater than the noisy cycle threshold.

9. The medical device of claim 1, wherein the control circuit is further configured to:
  determine the sensed event data by:
    determining first RR intervals from the first ventricular event signals sensed from the first cardiac electrical signal; and
    determining second RR intervals from the second ventricular event signals sensed from the second cardiac electrical signal;
  determine that the RR intervals determined from the candidate signal are less than an RR interval threshold; and
  select one of the first cardiac electrical signal or the second cardiac electrical signal for providing the input for the tachyarrhythmia detection by selecting the candidate signal at least in response to the RR intervals determined from the candidate signal being less than the RR interval threshold.

10. The medical device of claim 1, wherein the control circuit is further configured to:
  determine the sensed event data by:
    determining first RR intervals from the first ventricular event signals sensed from the first cardiac electrical signal; and
    determining second RR intervals from the second ventricular event signals sensed from the second cardiac electrical signal;
  determine that a maximum RR interval of one of the first RR intervals or the second RR intervals that are associated with the non-candidate signal is greater than an undersensing RR interval threshold; and
  select one of the first cardiac electrical signal or the second cardiac electrical signal for providing the input for the tachyarrhythmia detection by selecting the candidate signal at least in response to the maximum RR interval associated with the non-candidate signal being greater than the undersensing RR interval threshold.

11. The medical device of claim 1, wherein the control circuit is further configured to:
  identify the candidate signal as one of the first cardiac electrical signal and the second cardiac electrical signal that is associated with the detected first threshold number of tachyarrhythmia intervals; and
  identify the non-candidate signal as a second one of the first cardiac electrical signal and the second cardiac electrical signal that is not associated with the detected first threshold number of tachyarrhythmia intervals.

12. The medical device of claim 1, further comprising a memory,
  wherein the control circuit is further configured to detect the tachyarrhythmia based on the selected one of the first cardiac electrical signal or the second cardiac electrical signal by:
    detecting a detection threshold number of tachyarrhythmia intervals from the selected one of the first cardiac electrical signal or the second cardiac electrical signal;
    buffering, in the memory, time segments of a third cardiac electrical signal of the plurality of cardiac electrical signals received by the sensing circuit, each of the time segments being buffered in the memory in response to the first ventricular event signals or the second ventricular event signals that are sensed from the selected one of the first cardiac electrical signal or the second cardiac electrical signal;
    determining at least one morphology feature from time segments of the third cardiac electrical signal; and
    detecting the tachyarrhythmia based on the detection threshold number of tachyarrhythmia intervals detected from the selected one of the first cardiac electrical signal or the second cardiac electrical signal and the at least one morphology feature.

13. A method comprising:
  receiving a plurality of cardiac electrical signals;
  sensing first ventricular event signals from a first cardiac electrical signal of the plurality of cardiac electrical signals;
  sensing second ventricular event signals from a second cardiac electrical signal of the plurality of cardiac electrical signals;

determining sensed event data in response to each one of the first ventricular event signals and the second ventricular event signals;

detecting a first threshold number of tachyarrhythmia intervals from one of the first cardiac electrical signal or the second cardiac electrical signal;

in response to detecting the first threshold number of tachyarrhythmia intervals, selecting based on the sensed event data one of the first cardiac electrical signal or the second cardiac electrical signal for providing input for tachyarrhythmia detection by:
  identifying a candidate signal as one of the first cardiac electrical signal and the second cardiac electrical signal;
  identifying a non-candidate signal as a second one of the first cardiac electrical signal and the second cardiac electrical signal;
  determining when reliability criteria are met based on the sensed event data; and
  selecting one of the first cardiac electrical signal or the second cardiac electrical signal for providing the input for the tachyarrhythmia detection by one of:
    selecting the candidate signal for providing the input for the tachyarrhythmia detection in response to the reliability criteria being met; or
    selecting the non-candidate signal for providing the input for the tachyarrhythmia detection in response to the reliability criteria not being met;

detecting a tachyarrhythmia based on the input from the selected one of the first cardiac electrical signal or the second cardiac electrical signal; and delivering an electrical stimulation therapy in response to detecting the tachyarrhythmia.

14. The method of claim 13, wherein determining the sensed event data comprises:
  setting a first match window in response to each of the first ventricular event signals;
  determining whether one of the second ventricular event signals is sensed from the second cardiac electrical signal within the first match window;
  classifying each of the first ventricular event signals as one of:
    a time-based matched event signal in response to one of the second ventricular event signals being sensed from the second cardiac electrical signal within the first match window; or
    a time-based unmatched event signal in response to none of the second ventricular event signals being sensed from the second cardiac electrical signal within the first match window;
  setting a second match window in response to each of the second ventricular event signals;
  determining whether one of the first ventricular event signals is sensed from the first cardiac electrical signal within the second match window;
  classifying each of the second ventricular event signals as one of:
    a time-based matched event signal in response to one of the first ventricular event signals being sensed from the first cardiac electrical signal within the second match window; or
    a time-based unmatched event signal in response to none of the first ventricular event signals being sensed from the first cardiac electrical signal within the second match window.

15. The method of claim 14, wherein selecting, based on the sensed event data, one of the first cardiac electrical signal or the second cardiac electrical signal for providing input for tachyarrhythmia detection comprises:
  determining, for the candidate signal, that the classified time-based matched event signals are at least a predetermined percentage of the respective first ventricular event signals or the second ventricular event signals sensed from the candidate signal; and
  selecting one of the first cardiac electrical signal or the second cardiac electrical signal for providing the input for the tachyarrhythmia detection by selecting the candidate signal at least in response to the classified time-based matched event signals being at least the predetermined percentage of the respective first ventricular event signals or the second ventricular event signals sensed from the candidate signal.

16. The method of claim 15, further comprising:
  determining the sensed event data by:
    determining first peak amplitudes from the candidate signal, the first peak amplitudes associated with time-based matched event signals; and
    determining second peak amplitudes from the candidate signal, the second peak amplitudes associated with the time-based unmatched event signals;
  determining a ratio from the first peak amplitudes and the second peak amplitudes;
  determining that the ratio meets a threshold ratio; and
  selecting one of the first cardiac electrical signal or the second cardiac electrical signal for providing the input for the tachyarrhythmia detection by selecting the candidate signal in response to the ratio meeting the threshold ratio.

17. The method of claim 13, wherein determining the sensed event data comprises:
  determining first peak amplitudes from the first ventricular event signals; and
  determining second peak amplitudes from the second ventricular event signals.

18. The method of claim 17, further comprising:
  sensing each of the first ventricular event signals from the first cardiac electrical signal by determining a crossing of a first auto-adjusting sensing threshold by the first cardiac electrical signal;
  sensing each of the second ventricular event signals from the second cardiac electrical signal by determining a crossing of a second auto-adjusting sensing threshold by the second cardiac electrical signal;
  wherein determining the sensed event data further comprises:
    determining a first sensing threshold amplitude for each of the first sensed event signals by determining an amplitude of the first auto-adjusting sensing threshold at the crossing of the first auto-adjusting sensing threshold; and
    determining a second sensing threshold amplitude for each of the second sensed event signals by determining an amplitude of the second auto-adjusting sensing threshold at the crossing of the second auto-adjusting sensing threshold;
  determining from the first peak amplitudes and the first sensing threshold amplitudes a first amplitude-to-sense threshold ratio associated with the first ventricular event signals;
  determining from the second peak amplitudes and the second sensing threshold amplitudes a second amplitude-to-sense threshold ratio associated with the second ventricular event signals; and selecting one of the first cardiac electrical signal or the second cardiac electrical signal for providing the input for the tachyarrhythmia detection based on at least the first amplitude-to-sense threshold ratio and the second amplitude-to-sense threshold ratio.

19. The method of claim 17, further comprising:
determining an amplitude metric from the peak amplitudes determined from the non-candidate signal;
determining that the amplitude metric is less than a threshold amplitude; and
selecting one of the first cardiac electrical signal or the second cardiac electrical signal for providing the input for the tachyarrhythmia detection by selecting the candidate signal at least in response to the amplitude metric being less than the threshold amplitude.

20. The method of claim 13, further comprising:
determining the sensed event data by:
applying a noise analysis time interval to the candidate signal in response to each of the first sensed event signals or the second sensed event signals that are sensed from the candidate signal; and
determining a signal pulse count from the candidate signal sensed during the noise analysis time interval;
determining that less than a threshold number of the signal pulse counts are greater than a noisy cycle threshold; and
selecting one of the first cardiac electrical signal or the second cardiac electrical signal for providing the input for the tachyarrhythmia detection by selecting the candidate signal at least in response to less than the threshold number of the signal pulse counts being greater than the noisy cycle threshold.

21. The method of claim 13, further comprising:
determining the sensed event data by:
determining first RR intervals from the first ventricular event signals sensed from the first cardiac electrical signal; and
determining second RR intervals from the second ventricular event signals sensed from the second cardiac electrical signal;
determining that the RR intervals determined from the candidate signal are less than an RR interval threshold; and
selecting one of the first cardiac electrical signal or the second cardiac electrical signal for providing the input for the tachyarrhythmia detection by selecting the candidate signal at least in response to the RR intervals determined from the candidate signal being less than the RR interval threshold.

22. The method of claim 13, further comprising:
determining the sensed event data by:
determining first RR intervals from the first ventricular event signals sensed from the first cardiac electrical signal; and
determining second RR intervals from the second ventricular event signals sensed from the second cardiac electrical signal;
determining that a maximum RR interval of one of the first RR intervals or the second RR intervals that are associated with the non-candidate signal is greater than an undersensing RR interval threshold; and
selecting one of the first cardiac electrical signal or the second cardiac electrical signal for providing the input for the tachyarrhythmia detection by selecting the candidate signal at least in response to the maximum RR interval associated with the non-candidate signal being greater than the undersensing RR interval threshold.

23. The method of claim 13, further comprising:
identifying the candidate signal as one of the first cardiac electrical signal and the second cardiac electrical signal that is associated with the detected first threshold number of tachyarrhythmia intervals; and
identifying the non-candidate signal as a second one of the first cardiac electrical signal and the second cardiac electrical signal that is not associated with the detected first threshold number of tachyarrhythmia intervals.

24. The method of claim 13, further comprising detecting the tachyarrhythmia based on the selected one of the first cardiac electrical signal or the second cardiac electrical signal by:
detecting a detection threshold number of tachyarrhythmia intervals from the selected one of the first cardiac electrical signal or the second cardiac electrical signal;
buffering time segments of a third cardiac electrical signal of the plurality of cardiac electrical signals, each of the time segments being buffered in response to the first ventricular event signals or the second ventricular event signals that are sensed from the selected one of the first cardiac electrical signal or the second cardiac electrical signal;
determining at least one morphology feature from time segments of the third cardiac electrical signal; and
detecting the tachyarrhythmia based on the detection threshold number of tachyarrhythmia intervals detected from the selected one of the first cardiac electrical signal or the second cardiac electrical signal and the at least one morphology feature.

25. A non-transitory computer readable medium storing instructions that, when executed by a control circuit of a medical device, cause the medical device to:
receive a plurality of cardiac electrical signals;
sense first ventricular event signals from a first cardiac electrical signal of the plurality of cardiac electrical signals;
sense second ventricular event signals from a second cardiac electrical signal of the plurality of cardiac electrical signals;
determine sensed event data in response to each one of the first ventricular event signals and the second ventricular event signals;
detect a threshold number of tachyarrhythmia intervals from one of the first cardiac electrical signal or the second cardiac electrical signal;
in response to detecting the threshold number of tachyarrhythmia intervals, select based on the sensed event data one of the first cardiac electrical signal or the second cardiac electrical signal for providing input for tachyarrhythmia detection by:
identifying a candidate signal as one of the first cardiac electrical signal and the second cardiac electrical signal that is associated with the detected threshold number of tachyarrhythmia intervals;
identifying a non-candidate signal as a second one of the first cardiac electrical signal and the second cardiac electrical signal that is not associated with the detected threshold number of tachyarrhythmia intervals;
determining when reliability criteria are met based on the sensed event data; and
selecting one of the first cardiac electrical signal or the second cardiac electrical signal for providing the input for the tachyarrhythmia detection by one of:

selecting the candidate signal for providing the input for the tachyarrhythmia detection in response to the reliability criteria being met; or selecting the non-candidate signal for providing the input for the tachyarrhythmia detection in response to the reliability criteria not being met;

detect a tachyarrhythmia based on the input from the selected one of the first cardiac electrical signal or the second cardiac electrical signal; and deliver an electrical stimulation therapy in response to detecting the tachyarrhythmia.

\* \* \* \* \*